US011327451B2

(12) United States Patent
Park et al.

(10) Patent No.: US 11,327,451 B2
(45) Date of Patent: May 10, 2022

(54) BUILDING SMART ENTITY SYSTEM WITH AGENT BASED COMMUNICATION AND CONTROL

(71) Applicant: Johnson Controls Technology Company, Auburn Hills, MI (US)

(72) Inventors: Youngchoon Park, Brookfield, WI (US); Sudhi R. Sinha, Milwaukee, WI (US); Vaidhyanathan Venkiteswaran, Brookfield, WI (US); Erik S. Paulson, Madison, WI (US); Vijaya S. Chennupati, Brookfield, WI (US); Kelsey Carle Schuster, Wauwatosa, WI (US)

(73) Assignee: JOHNSON CONTROLS TECHNOLOGY COMPANY, Auburn Hills, MI (US)

( * ) Notice: Subject to any disclaimer, the term of this patent is extended or adjusted under 35 U.S.C. 154(b) by 98 days.

(21) Appl. No.: 16/533,493

(22) Filed: Aug. 6, 2019

(65) Prior Publication Data

US 2019/0361411 A1  Nov. 28, 2019

Related U.S. Application Data

(63) Continuation-in-part of application No. 16/036,685, filed on Jul. 16, 2018, which is a continuation-in-part
(Continued)

(51) Int. Cl.
*G06F 15/16* (2006.01)
*G05B 15/02* (2006.01)
(Continued)

(52) U.S. Cl.
CPC ............ *G05B 15/02* (2013.01); *G06F 16/288* (2019.01); *G06N 5/043* (2013.01); *H04L 41/046* (2013.01); *H04L 67/12* (2013.01)

(58) Field of Classification Search
CPC ...... G05B 15/02; G06F 16/288; G06N 5/043; H04L 41/046; H04L 12/2803; H04L 12/2816
See application file for complete search history.

(56) References Cited

U.S. PATENT DOCUMENTS 5,301,109 A   4/1994  Landauer et al.
5,812,962 A   9/1998  Kovac
(Continued)

FOREIGN PATENT DOCUMENTS

AU   2019226217 A1   11/2020
AU   2019226264 A1   11/2020
(Continued)

OTHER PUBLICATIONS

Priyadarshana, et al.; Multi-agent controlled building management system; Apr. 21, 2017; IEEE; 5 pages (Year: 2017).*
(Continued)

*Primary Examiner* — Oleg Survillo
(74) *Attorney, Agent, or Firm* — Foley & Lardner LLP

(57) ABSTRACT

A building management system of a building includes one or more memory devices configured to store instructions thereon, that, when executed by one or more processors, cause the one or more processors to generate agents, each agent of the agents paired with one entity of a plurality of entities of an entity database, wherein the entity database includes relationships between the entities, wherein the entities represent physical building entities of the building comprising building equipment or building spaces. The instructions cause the one or more processors to communicate, by the plurality of agents, data of the physical building entities via a plurality of agent communication channels and perform, by the plurality of agents, one or more operations for the plurality of entities based on the data.

20 Claims, 25 Drawing Sheets

Related U.S. Application Data of application No. 16/143,243, filed on Sep. 26, 2018, now Pat. No. 10,515,098, and a continuation-in-part of application No. 15/644,519, filed on Jul. 7, 2017, now Pat. No. 10,095,756, said application No. 16/143,243 is a continuation-in-part of application No. 15/644,560, filed on Jul. 7, 2017, now Pat. No. 10,417,245, said application No. 16/143,243 is a continuation-in-part of application No. 15/644,581, filed on Jul. 7, 2017, now Pat. No. 10,169,486.

(60) Provisional application No. 62/457,654, filed on Feb. 10, 2017, provisional application No. 62/611,984, filed on Dec. 29, 2017, provisional application No. 62/611,974, filed on Dec. 29, 2017, provisional application No. 62/564,247, filed on Sep. 27, 2017, provisional application No. 62/533,581, filed on Jul. 17, 2017.

(51) Int. Cl.
*G06N 5/04* (2006.01)
*H04L 41/046* (2022.01)
*G06F 16/28* (2019.01)
*H04L 67/12* (2022.01)

(56) References Cited

U.S. PATENT DOCUMENTS

| | | |
|---|---|---|
| 6,487,457 B1 | 11/2002 | Hull et al. |
| 6,493,755 B1 | 12/2002 | Hansen et al. |
| 6,816,811 B2 | 11/2004 | Seem |
| 6,986,138 B1 | 1/2006 | Sakaguchi et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,917,570 B2* | 3/2011 | Ishii .................... H04W 40/246 709/200 |
| 7,996,488 B1 | 8/2011 | Casabella et al. |
| 8,078,330 B2 | 12/2011 | Brickfield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,503,330 B1* | 8/2013 | Choong ................ H04W 24/02 370/254 |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,800,648 B2* | 10/2017 | Agarwal ................ H04L 67/42 |
| 9,811,249 B2 | 11/2017 | Chen et al. |
| 9,886,478 B2 | 2/2018 | Mukherjee |
| 9,948,359 B2 | 4/2018 | Horton |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,170,123 B2 | 1/2019 | Orr et al. |
| 10,171,297 B2 | 1/2019 | Stewart et al. |
| 10,171,586 B2 | 1/2019 | Shaashua et al. |
| 10,187,258 B2 | 1/2019 | Nagesh et al. |
| 10,389,742 B2 | 8/2019 | Devi Reddy et al. |
| 10,536,295 B2 | 1/2020 | Fairweather et al. |
| 10,564,993 B2 | 2/2020 | Deutsch et al. |
| 10,630,706 B2 | 4/2020 | Devi Reddy et al. |
| 10,760,815 B2 | 9/2020 | Janakiraman et al. |
| 10,762,475 B2 | 9/2020 | Song et al. |
| 10,798,175 B1 | 10/2020 | Knight et al. |
| 10,824,120 B2 | 11/2020 | Ahmed |
| 10,845,771 B2 | 11/2020 | Harvey |
| 10,921,760 B2 | 2/2021 | Harvey |
| 10,969,133 B1 | 4/2021 | Harvey |
| 11,041,650 B2 | 6/2021 | Li et al. |
| 11,042,144 B2* | 6/2021 | Park .................... G05B 19/0421 |
| 11,054,796 B2 | 7/2021 | Holaso |
| 2002/0016639 A1 | 2/2002 | Smith et al. |
| 2003/0073432 A1 | 4/2003 | Meade, II |
| 2003/0171851 A1* | 9/2003 | Brickfield ................ H02J 3/14 700/286 |
| 2003/0200059 A1 | 10/2003 | Ignatowski et al. |
| 2004/0128314 A1 | 7/2004 | Katibah et al. |
| 2005/0055308 A1 | 3/2005 | Meyer et al. |
| 2005/0154494 A1 | 7/2005 | Ahmed |
| 2005/0283337 A1 | 12/2005 | Sayal |
| 2006/0095521 A1 | 5/2006 | Patinkin |
| 2006/0140207 A1* | 6/2006 | Eschbach ............ H04L 12/1836 370/432 |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0261062 A1 | 11/2007 | Bansal et al. |
| 2007/0273497 A1 | 11/2007 | Kuroda et al. |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0100825 A1 | 4/2012 | Sherman et al. |
| 2012/0101637 A1 | 4/2012 | Imes et al. |

(56) References Cited

U.S. PATENT DOCUMENTS

| | | | |
|---|---|---|---|
| 2012/0135759 A1 | 5/2012 | Imes et al. | |
| 2012/0136485 A1* | 5/2012 | Weber | H05B 47/19 |
| | | | 700/275 |
| 2012/0158633 A1 | 6/2012 | Eder | |
| 2012/0259583 A1 | 10/2012 | Noboa et al. | |
| 2012/0278051 A1 | 11/2012 | Jiang et al. | |
| 2013/0007063 A1 | 1/2013 | Kalra et al. | |
| 2013/0038430 A1* | 2/2013 | Blower | H04W 72/082 |
| | | | 340/12.22 |
| 2013/0097706 A1 | 4/2013 | Titonis et al. | |
| 2013/0103221 A1 | 4/2013 | Raman et al. | |
| 2013/0167035 A1 | 6/2013 | Imes et al. | |
| 2013/0204836 A1 | 8/2013 | Choi et al. | |
| 2013/0246916 A1 | 9/2013 | Reimann et al. | |
| 2013/0247205 A1 | 9/2013 | Schrecker et al. | |
| 2013/0275174 A1 | 10/2013 | Bennett et al. | |
| 2013/0298244 A1 | 11/2013 | Kumar et al. | |
| 2013/0331995 A1 | 12/2013 | Rosen | |
| 2013/0338970 A1 | 12/2013 | Reghetti | |
| 2013/0339292 A1 | 12/2013 | Park et al. | |
| 2014/0032506 A1 | 1/2014 | Hoey et al. | |
| 2014/0081652 A1 | 3/2014 | Klindworth | |
| 2014/0135952 A1 | 5/2014 | Maehara | |
| 2014/0172184 A1 | 6/2014 | Schmidt et al. | |
| 2014/0189861 A1 | 7/2014 | Gupta et al. | |
| 2014/0205155 A1 | 7/2014 | Chung et al. | |
| 2014/0207282 A1 | 7/2014 | Angle et al. | |
| 2014/0269614 A1 | 9/2014 | Maguire et al. | |
| 2014/0277765 A1* | 9/2014 | Karimi | G05B 15/02 |
| | | | 700/276 |
| 2014/0278461 A1 | 9/2014 | Artz | |
| 2014/0327555 A1 | 11/2014 | Sager et al. | |
| 2015/0019174 A1 | 1/2015 | Kiff et al. | |
| 2015/0042240 A1 | 2/2015 | Aggarwal et al. | |
| 2015/0105917 A1 | 4/2015 | Sasaki et al. | |
| 2015/0112763 A1 | 4/2015 | Goldschneider | |
| 2015/0145468 A1 | 5/2015 | Ma et al. | |
| 2015/0156031 A1 | 6/2015 | Fadell et al. | |
| 2015/0172300 A1 | 6/2015 | Cochenour | |
| 2015/0178421 A1* | 6/2015 | Borrelli | G06F 30/20 |
| | | | 703/7 |
| 2015/0185261 A1 | 7/2015 | Frader-Thompson et al. | |
| 2015/0186777 A1 | 7/2015 | Lecue et al. | |
| 2015/0204563 A1 | 7/2015 | Imes et al. | |
| 2015/0241895 A1 | 8/2015 | Lu et al. | |
| 2015/0244730 A1 | 8/2015 | Vu et al. | |
| 2015/0244732 A1 | 8/2015 | Golshan et al. | |
| 2015/0261863 A1 | 9/2015 | Dey et al. | |
| 2015/0263900 A1 | 9/2015 | Polyakov et al. | |
| 2015/0286969 A1 | 10/2015 | Warner et al. | |
| 2015/0295796 A1 | 10/2015 | Hsiao et al. | |
| 2015/0304193 A1 | 10/2015 | Ishii et al. | |
| 2015/0316918 A1 | 11/2015 | Schleiss et al. | |
| 2015/0341212 A1 | 11/2015 | Hsiao et al. | |
| 2015/0348417 A1 | 12/2015 | Ignaczak et al. | |
| 2015/0356419 A1 | 12/2015 | Shircliff et al. | |
| 2016/0033946 A1 | 2/2016 | Zhu et al. | |
| 2016/0065601 A1 | 3/2016 | Gong et al. | |
| 2016/0070736 A1 | 3/2016 | Swan et al. | |
| 2016/0078229 A1 | 3/2016 | Gong et al. | |
| 2016/0119434 A1 | 4/2016 | Dong et al. | |
| 2016/0139752 A1 | 5/2016 | Shim et al. | |
| 2016/0163186 A1 | 6/2016 | Davidson et al. | |
| 2016/0170390 A1 | 6/2016 | Xie et al. | |
| 2016/0171862 A1 | 6/2016 | Das et al. | |
| 2016/0179315 A1 | 6/2016 | Sarao et al. | |
| 2016/0179342 A1 | 6/2016 | Sarao et al. | |
| 2016/0179990 A1 | 6/2016 | Sarao et al. | |
| 2016/0195856 A1 | 7/2016 | Spero | |
| 2016/0212165 A1 | 7/2016 | Singla et al. | |
| 2016/0239660 A1 | 8/2016 | Azvine et al. | |
| 2016/0239756 A1 | 8/2016 | Aggour et al. | |
| 2016/0247129 A1 | 8/2016 | Song et al. | |
| 2016/0260063 A1 | 9/2016 | Harris et al. | |
| 2016/0277374 A1 | 9/2016 | Reid et al. | |
| 2016/0313751 A1 | 10/2016 | Risbeck et al. | |
| 2016/0313752 A1 | 10/2016 | Przybylski | |
| 2016/0350364 A1 | 12/2016 | Anicic et al. | |
| 2016/0357521 A1 | 12/2016 | Zhang et al. | |
| 2016/0357828 A1 | 12/2016 | Tobin et al. | |
| 2016/0358432 A1 | 12/2016 | Branscomb et al. | |
| 2016/0363336 A1 | 12/2016 | Roth et al. | |
| 2016/0370258 A1 | 12/2016 | Perez | |
| 2016/0378306 A1 | 12/2016 | Kresl et al. | |
| 2016/0379326 A1 | 12/2016 | Chan-Gove et al. | |
| 2017/0006135 A1 | 1/2017 | Siebel | |
| 2017/0011318 A1 | 1/2017 | Vigano et al. | |
| 2017/0017221 A1 | 1/2017 | Lamparter et al. | |
| 2017/0039255 A1 | 2/2017 | Raj et al. | |
| 2017/0052536 A1 | 2/2017 | Warner et al. | |
| 2017/0053441 A1 | 2/2017 | Nadumane et al. | |
| 2017/0063894 A1 | 3/2017 | Muddu et al. | |
| 2017/0068409 A1 | 3/2017 | Nair | |
| 2017/0070775 A1 | 3/2017 | Taxier et al. | |
| 2017/0084168 A1 | 3/2017 | Janchookiat | |
| 2017/0090437 A1 | 3/2017 | Veeramani et al. | |
| 2017/0091277 A1 | 3/2017 | Zoch | |
| 2017/0093700 A1 | 3/2017 | Gilley et al. | |
| 2017/0093915 A1 | 3/2017 | Ellis et al. | |
| 2017/0098086 A1 | 4/2017 | Hoernecke et al. | |
| 2017/0103327 A1 | 4/2017 | Penilla et al. | |
| 2017/0103403 A1 | 4/2017 | Chu et al. | |
| 2017/0118236 A1 | 4/2017 | Devi Reddy et al. | |
| 2017/0118237 A1 | 4/2017 | Devi Reddy et al. | |
| 2017/0118240 A1 | 4/2017 | Devi Reddy et al. | |
| 2017/0123389 A1 | 5/2017 | Baez et al. | |
| 2017/0134415 A1 | 5/2017 | Muddu et al. | |
| 2017/0180147 A1 | 6/2017 | Brandman et al. | |
| 2017/0188216 A1 | 6/2017 | Koskas et al. | |
| 2017/0212482 A1 | 7/2017 | Boettcher et al. | |
| 2017/0212668 A1 | 7/2017 | Shah et al. | |
| 2017/0220641 A1 | 8/2017 | Chi et al. | |
| 2017/0235817 A1 | 8/2017 | Deodhar et al. | |
| 2017/0251182 A1 | 8/2017 | Siminoff et al. | |
| 2017/0277769 A1 | 9/2017 | Pasupathy et al. | |
| 2017/0278003 A1 | 9/2017 | Liu | |
| 2017/0315522 A1* | 11/2017 | Kwon | H04L 61/2007 |
| 2017/0315697 A1 | 11/2017 | Jacobson et al. | |
| 2017/0322534 A1 | 11/2017 | Sinha et al. | |
| 2017/0323389 A1 | 11/2017 | Vavrasek | |
| 2017/0329289 A1* | 11/2017 | Kohn | F24F 11/62 |
| 2017/0336770 A1 | 11/2017 | Macmillan | |
| 2017/0345287 A1 | 11/2017 | Fuller et al. | |
| 2017/0351957 A1 | 12/2017 | Lecue et al. | |
| 2017/0357225 A1 | 12/2017 | Asp et al. | |
| 2017/0357490 A1 | 12/2017 | Park et al. | |
| 2017/0357908 A1 | 12/2017 | Cabadi et al. | |
| 2018/0012159 A1 | 1/2018 | Kozloski et al. | |
| 2018/0013579 A1 | 1/2018 | Fairweather et al. | |
| 2018/0039238 A1 | 2/2018 | Gartner et al. | |
| 2018/0069932 A1* | 3/2018 | Tiwari | G01S 5/0252 |
| 2018/0114140 A1 | 4/2018 | Chen et al. | |
| 2018/0119975 A1 | 5/2018 | Park et al. | |
| 2018/0137288 A1 | 5/2018 | Polyakov | |
| 2018/0157930 A1 | 6/2018 | Rutschman et al. | |
| 2018/0162400 A1 | 6/2018 | Abdar | |
| 2018/0176241 A1 | 6/2018 | Manadhata et al. | |
| 2018/0203961 A1 | 7/2018 | Aisu et al. | |
| 2018/0232423 A1 | 8/2018 | Park et al. | |
| 2018/0239982 A1 | 8/2018 | Rutschman et al. | |
| 2018/0276962 A1 | 9/2018 | Butler et al. | |
| 2018/0292797 A1 | 10/2018 | Lamparter et al. | |
| 2018/0309818 A1 | 10/2018 | Park et al. | |
| 2018/0336785 A1 | 11/2018 | Ghannam et al. | |
| 2018/0356775 A1 | 12/2018 | Harvey | |
| 2018/0359111 A1 | 12/2018 | Harvey | |
| 2019/0003297 A1 | 1/2019 | Brannigan et al. | |
| 2019/0005025 A1 | 1/2019 | Malabarba | |
| 2019/0037135 A1 | 1/2019 | Hedge | |
| 2019/0088106 A1 | 3/2019 | Grundstrom | |
| 2019/0094824 A1 | 3/2019 | Xie et al. | |
| 2019/0096217 A1 | 3/2019 | Pourmohammad et al. | |
| 2019/0102840 A1 | 4/2019 | Perl et al. | |
| 2019/0121801 A1 | 4/2019 | Jethwa et al. | |

(56) References Cited

U.S. PATENT DOCUMENTS

| | | |
|---|---|---|
| 2019/0138512 A1 | 5/2019 | Pourmohammad et al. |
| 2019/0163152 A1 | 5/2019 | Worrall et al. |
| 2019/0258620 A1 | 8/2019 | Itado et al. |
| 2019/0268178 A1 | 8/2019 | Fairweather et al. |
| 2019/0310979 A1 | 10/2019 | Masuzaki et al. |
| 2019/0377306 A1 | 12/2019 | Harvey |
| 2020/0285203 A1 | 9/2020 | Thakur et al. |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0042299 A1 | 2/2021 | Migliori |
| 2021/0043221 A1 | 2/2021 | Yelchuru et al. |
| 2021/0044957 A1 | 2/2021 | Norp et al. |
| 2021/0325070 A1 | 10/2021 | Endel et al. |
| 2021/0342961 A1 | 11/2021 | Winter et al. |

FOREIGN PATENT DOCUMENTS

| | | |
|---|---|---|
| AU | 2019351573 A1 | 5/2021 |
| CN | 106204392 A | 12/2016 |
| CN | 106406806 A | 2/2017 |
| CN | 106960269 A | 7/2017 |
| CN | 107147639 A | 9/2017 |
| CN | 107598928 A | 1/2018 |
| EP | 3 268 821 B1 | 1/2018 |
| JP | 2008-107930 A | 5/2008 |
| KR | 2016/0102923 A | 8/2016 |
| WO | WO-2009/020158 A1 | 2/2009 |
| WO | WO-2011/100255 A2 | 8/2011 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/132112 A1 | 7/2018 |
| WO | WO-2020/061621 A1 | 4/2020 |

OTHER PUBLICATIONS

International Search Report and Written Opinion on PCT/US2017/052633, dated Oct. 23, 2017, 9 pages.
International Search Report and Written Opinion on PCT/US2017/052829, dated Nov. 27, 2017, 24 pages.
International Search Report and Written Opinion on PCT/US2018/024068, dated Jun. 15, 2018, 22 pages.
International Search Report and Written Opinion on PCT/US2018/052974, dated Dec. 19, 2018, 13 pages.
International Search Report and Written Opinion on PCT/US2018/052975, dated Jan. 2, 2019, 13 pages.
International Search Report and Written Opinion on PCT/US2018/052994, dated Jan. 7, 2019, 15 pages.
Li et al., Event Stream Processing with Out-of-Order Data Arrival, International Conferences on Distributed Computing Systems, 2007, 8 pages.
Wei Su et al., "Development and Implementation of Software Gateways of Fire Fighting Subsystem Running on EBI," Control, Automation and Systems Engineering, Jul. 2009. IITA International Conference on, IEEE, pp. 9-12.
Balaji et al., "Brick: Towards a Unified Metadata Schema for Buildings," dated Nov. 16-17, 2016, 10 pages.
Balaji et al., Brick: Metadata schema for portable smart building applications, dated Sep. 25, 2017, 20 pages.
Balaji et al., Demo Abstract: Portable Queries Using the Brick Schema for Building Applications, dated Nov. 16-17, 2016, 2 pages.
Bhattacharya et al., Short Paper: Analyzing Metadata Schemas for Buildings—The Good, The Bad and The Ugly, ACM, Nov. 4-5, 2015, 4 pages.
Brick: Towards a Unified Metadata Schema For Buildings, dated Nov. 16, 2016, 46 pages.
Building Blocks for Smart Buildings, BrickSchema.org, Mar. 2019, 17 pages.
Fierro et al., Beyond a House of Sticks: Formalizing Metadata Tags with Brick, dated Nov. 13-14, 2019, 10 pages.
Fierro et al., Dataset: An Open Dataset and Collection Tool for BMS Point Labels, dated Nov. 10, 2019, 3 pages.
Fierro et al., Design and Analysis of a Query Processor for Brick, dated Jan. 2018, 25 pages.
Fierro et al., Design and Analysis of a Query Processor for Brick, dated Nov. 8-9, 2017, 10 pages.
Fierro et al., Mortar: An Open Testbed for Portable Building Analytics, dated Nov. 7-8, 2018, 10 pages.
Fierro et al, Why Brick is a Game Changer for Smart Buildings, Memoori Webinar, 2019, 67 pages.
Fierro, Writing Portable Building Analytics with the Brick Metadata Schema, UC Berkeley ACM E-Energy, 2019, 39 pages.
Gao et al., A large-scale evaluation of automated metadata inference approaches on sensors from air handling units, dated May 1, 2018, pp. 14-30.
International Search Report and Written Opinion on PCT/US2017/052060, dated Oct. 5, 2017, 11 pages.
Koh et al., "Scrabble: Transferrable Semi-Automated Semantic Metadata Normalization using Intermediate Representation," Nov. 7-8, 2018, 10 pages.
Koh et al., Plaster: An Integration, Benchmark, and Development Framework for Metadata Normalization Methods, dated Nov. 7-8, 2018, 10 pages.
Koh et al., Who can Access What, and When?, dated Nov. 13-14, 2019, 4 pages.
Metadata Schema for Buildings, 3 pages, Brickschema.org (Cannot confirm date.).
Brick: Metadata schema for portable smart building applications, dated Sep. 15, 2018, 3 pages, (Abstract).
Extended European Search Report issued in EP Application No. 18196948.6 dated Apr. 10, 2019, 9 pages.
International Search Report and Written Opinion for PCT/US2017/013831, dated Mar. 31, 2017, 14 pages.
International Search Report and Written Opinion for PCT/US2017/035524, dated Jul. 24, 2017, 14 pages.
International Search Report and Written Opinion on PCT/US2018/052971, dated Mar. 1, 2019, 19 pages.
International Search Report and Written Opinion on PCT/US2019/015481, dated May 17, 2019, 78 pages.
Results of the Partial International Search for PCT/US2018/052971, dated Jan. 3, 2019, 3 pages.

* cited by examiner

BUILDING SMART ENTITY SYSTEM WITH AGENT BASED COMMUNICATION AND CONTROL

CROSS-REFERENCE TO RELATED APPLICATIONS

This application is a continuation-in-part of U.S. patent application Ser. No. 16/036,685 filed Jul. 16, 2018 which claims the benefit of, and priority to, U.S. Provisional Patent Application No. 62/533,581 filed Jul. 17, 2017. This application is also a continuation-in-part of U.S. patent application Ser. No. 16/143,243 filed Sep. 26, 2018 which claims the benefit of and priority to U.S. Provisional Patent Application No. 62/564,247 filed Sep. 27, 2017, U.S. Provisional Patent Application No. 62/611,974 filed Dec. 29, 2017, and U.S. Provisional Patent Application No. 62/611,984 filed Dec. 29, 2017. U.S. patent application Ser. No. 16/143,243 filed Sep. 26, 2018 is also a continuation-in-part of U.S. patent application Ser. No. 15/644,519 filed Jul. 7, 2017, which claims the benefit of and priority to U.S. Provisional Patent Application No. 62/457,654 filed Feb. 10, 2017. U.S. patent application Ser. No. 16/143,243 filed Sep. 26, 2018 is also a continuation-in-part of U.S. patent application Ser. No. 15/644,581 filed Jul. 7, 2017, which claims the benefit of and priority to U.S. Provisional Patent Application No. 62/457,654 filed Feb. 10, 2017. U.S. patent application Ser. No. 16/143,243 filed Sep. 26, 2018 also a continuation-in-part of U.S. patent application Ser. No. 15/644,560 filed Jul. 7, 2017, which claims the benefit of and priority to U.S. Provisional Patent Application No. 62/457,654 filed Feb. 10, 2017. The entire disclosure of each of these patent applications is incorporated by reference herein.

BACKGROUND

The present disclosure relates generally to the field of a building management platform that is communicatively connected to one or more building management systems in a smart building environment. A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

A BMS can collect data from objects associated with a building, such as other BMSs, building subsystems, devices, sensors and other types of building equipment. Building management platforms are utilized to register and manage the objects, gather and analyze data produced by the objects, and provide recommendations or results based on the collected data. As the number of buildings transitioning to a smart building environment increases, the amount of data being produced and collected has been increasing exponentially. Accordingly, effective analysis of a plethora of collected data is desired.

SUMMARY

Agent-Entity Based Communication and Control

One implementation of the present disclosure is a building management system of a building including one or more memory devices configured to store instructions thereon, that, when executed by one or more processors, cause the one or more processors to generate agents, each agent of the agents paired with one entity of entities of an entity database, wherein the entity database includes relationships between the entities, wherein the entities represent physical building entities of the building including building equipment or building spaces. The instructions cause the one or more processors to communicate, by the agents, data of the physical building entities via agent communication channels and perform, by the agents, one or more operations for the entities based on the data.

In some embodiments, the instructions cause the one or more processors to query, by a first agent of the agents, the entity database to identify a communication channel associated with the first agent, update, by the first agent, one or more communication configurations of the first agent causing the first agent to communicate on the communication channel, and communicate, by the first agent, on the communication channel.

In some embodiments, the instructions cause the one or more processors to generate the agent communication channels based on the entities, identify one or more agents of the agents associated with each agent communication channel of the agent communication channels based on the entities and the relationships, instantiate the agent communication channels, and cause the agents to communicate on the agent communication channels.

In some embodiments, the instructions cause the one or more processors to generate a channel configuration for each of the agents causing each of the agents to perform at least one of publishing information to one or more agent communication channels of the agent communication channels or subscribing to the one or more agent communication channels and communicate the channel configuration of each of the agents to each of the agents.

In some embodiments, the building information management system further includes devices, wherein each of the devices is configured to run one of the agents, wherein the devices are at least one of a sensor, an actuator, or a controller.

In some embodiments, instructions cause the one or more processors to run each of the agents.

In some embodiments, the instructions cause the one or more processors to receive an update to the entity database, the update including a new entity and an entity type for the new entity, identify whether the entity type of the new entity is a particular entity type of entity types, and instantiate a second agent communication channel associated with the new entity in response to a determination that the entity type of the new entity is the particular entity type.

In some embodiments, the update to the entity database includes one or more new relationships to one or more existing entities of the entity database, wherein each of the one or more existing entities are associated with an existing agent. In some embodiments, the instructions cause the one or more processors to identify the one or more existing entities based on the one or more new relationships, identify the existing agent associated with each of the one or more existing entities, and cause the existing agent associated with each of the one or more existing entities to communicate on the second agent communication channel.

In some embodiments, the agents include a first agent and a second agent, wherein the first agent is associated with a first entity of the entities and the second agent is associated with a second entity of the entities.

In some embodiments, the instructions cause the one or more processors to generate an agent communication channel for a third entity of the entities and identify the first agent and the second agent by identifying a first relationship between the first entity and the third entity and a second relationship between the second entity and the third entity based on the relationships.

In some embodiments, the instructions cause the one or more processors to generate the agent communication channel for the third entity of the entities by determining that an entity type of the third entity is a particular entity type of different entity types.

In some embodiments, the particular entity type is a space type defining at least one of a room, a zone, or the building.

Another implementation of the present disclosure is a method of agent management for a building. The method includes generating, by one or more processing circuits, agents, each agent of the agents paired with one entity of entities of an entity database, wherein the entity database includes relationships between the entities, wherein the entities represent physical building entities of the building including building equipment or building spaces. The method includes communicating, by the one or more processing circuits via the agents, data of the physical building entities via agent communication channels and performing, by the one or more processing circuits via the agents, one or more operations for the entities based on the data.

In some embodiments, the method includes generating, by the one or more processing circuits, the agent communication channels based on the entities. In some embodiments, the method includes identifying, by the one or more processing circuits, one or more agents of the agents associated with each agent communication channel of the agent communication channels based on the entities and the relationships. In some embodiments, the method includes instantiating, by the one or more processing circuits, the agent communication channels and causing, by the one or more processing circuits, the agents to communicate on the agent communication channels.

The method includes generating, by the one or more processing circuits, a channel configuration for each of the agents causing each of the agents to perform at least one of publishing information to one or more agent communication channels of the agent communication channels or subscribing to the one or more agent communication channels and communicating, by the one or more processing circuits, the channel configuration of each of the agents to each of the agents.

In some embodiments, the agents include a first agent and a second agent, wherein the first agent is associated with a first entity of the entities and the second agent is associated with a second entity of the entities.

In some embodiments, the method includes generating, by the one or more processing circuits, an agent communication channel for a third entity of the entities. In some embodiments, the method includes identifying, by the one or more processing circuits, the first agent and the second agent by identifying a first relationship between the first entity and the third entity and a second relationship between the second entity and the third entity based on the relationships.

In some embodiments, the method includes generating, by the one or more processing circuits, the agent communication channel for the third entity of the entities by determining that an entity type of the third entity is a particular entity type of different entity types.

In some embodiments, the particular entity type is a space type defining at least one of a room, a zone, or the building.

Another implementation of the present disclosure is an information management system including one or more memory devices configured to store instructions and one or more processors configured to execute the instructions to generate agents, each agent of the agents paired with one entity of entities of an entity database, wherein the entity database includes relationships between the entities, wherein the entities represent physical entities. The one or more processors are configured to execute the instructions to communicate, by the agents, data of the physical entities via agent communication channels and perform, by the agents, one or more operations for the entities based on the data.

Agent-Entity Based Data Ingestion and Entity Creation Using Time Series Data

Another implementation of the present disclosure is a building management system including one or more memory devices configured to store instructions thereon, that, when executed by one or more processors, cause the one or more processors to receive a publication by an agent on an agent communication channel, the publication including timeseries data, identify, based on the publication, an object entity of an entity database associated with the agent, wherein the entity database includes one or more object entities and relationships between the one or more object entities and one or more data entities, identify a data entity related to the object entity based on a relationship of the relationships relating the object entity and the data entity, and ingest the timeseries data into the data entity.

In some embodiments, the instructions cause the one or more processors to receive, by a second agent, the publication by the agent on the agent communication channel and operate a physical building entity represented by the object entity based on the timeseries data.

In some embodiments, the instructions cause the one or more processors to receive, by a second agent, the publication by the agent on the agent communication channel, generate, by the second agent, one or more configuration updates for the agent based on the timeseries data, and ingest the one or more configuration updates into the entity database.

In some embodiments, the instructions cause the one or more processors to receive, by a second agent, the publication by the agent on the agent communication channel, identify, by the second agent, the data entity related to the object entity based on the relationship of the relationships relating the object entity and the data entity, and ingest, by the second agent, the timeseries data into the data entity.

In some embodiments, the agent is associated with the object entity, wherein the publication includes an author identifier identifying the agent. In some embodiments, the instructions cause the one or more processors to identify, based on the publication, the object entity by identifying that the agent is associated with the object entity based on the author identifier.

In some embodiments, the building management system further includes a device, wherein the device is configured to run the agent, wherein the device is at least one of a sensor, an actuator, or a controller.

In some embodiments, the instructions cause the one or more processors to run the agent.

In some embodiments, the instructions cause the one or more processors to cause the agent to monitor the agent communication channel for second timeseries data, the second timeseries data including abnormal data, retrieve, from the entity database, third timeseries data, and analyze the second timeseries data and the third timeseries data to detect the abnormal data.

In some embodiments, the instructions cause the one or more processors to receive second timeseries data via the agent communication channel, the second timeseries data published on the agent communication channel by the agent, determine whether a second object entity of the entity database associated with the second timeseries data exists in the entity database, ingest the second timeseries data into the entity database based on the second object entity in response to a first determination that the second object entity existing, and generate the second object entity and ingest the second timeseries data into the entity database in response to a second determination that the second object entity does not exist.

In some embodiments, the instructions cause the one or more processors to generate the second object entity and ingest the second timeseries data into the entity database in response to the second determination that the second object entity does not exist by generating the second object entity, a second data entity, and a second relationship between the second object entity and the second data entity and ingesting the second timeseries data into the second data entity.

Another implementation of the present disclosure is a method of building management for a building. The method includes receiving, by one or more processing circuits, a publication by an agent on an agent communication channel, the publication including timeseries data, identifying, by the one or more processing circuits, based on the publication, an object entity of an entity database associated with the agent, wherein the entity database includes one or more object entities and relationships between the one or more object entities and one or more data entities, identifying, by the one or more processing circuits, a data entity related to the object entity based on a relationship of the relationships relating the object entity and the data entity, and ingesting, by the one or more processing circuits, the timeseries data into the data entity.

In some embodiments, the method includes receiving, by the one or more processing circuits via a second agent, the publication by the agent on the agent communication channel and operating, by the one or more processing, a physical building entity represented by the object entity based on the timeseries data.

In some embodiments, the method includes receiving, by the one or more processing circuits via a second agent, the publication by the agent on the agent communication channel, generating, by the one or more processing circuits via the second agent, one or more configuration updates for the agent based on the timeseries data, and ingesting, by the one or more processing circuits via the second agent, the one or more configuration updates into the entity database.

In some embodiments, the method includes receiving, by the one or more processing circuits via a second agent, the publication by the agent on the agent communication channel, identifying, by the one or more processing circuits via the second agent, the data entity related to the object entity based on the relationship of the relationships relating the object entity and the data entity, and ingesting, by the one or more processing circuits via the second agent, the timeseries data into the data entity.

In some embodiments, the method includes monitoring, by the one or more processing circuits via the agent, the agent communication channel for second timeseries data, the second timeseries data including abnormal data, retrieving, by the one or more processing circuits via the agent, from the entity database, third timeseries data, and analyzing, by the one or more processing circuits via the agent, the second timeseries data and the third timeseries data to detect the abnormal data.

In some embodiments, the method includes receiving, by the one or more processing circuits, second timeseries data via the agent communication channel, the second timeseries data published on the agent communication channel by the agent, determining, by the one or more processing circuits, whether a second object entity of the entity database associated with the second timeseries data exists in the entity database, ingesting, by the one or more processing circuits, the second timeseries data into the entity database based on the second object entity in response to a first determination that the second object entity existing, and generating, by the one or more processing circuits, the second object entity and ingest the second timeseries data into the entity database in response to a second determination that the second object entity does not exist.

In some embodiments, the method includes generating, by the one or more processing circuits, the second object entity and ingest the second timeseries data into the entity database in response to the second determination that the second object entity does not exist by generating the second object entity, a second data entity, and a second relationship between the second object entity and the second data entity and ingesting the second timeseries data into the second data entity.

Another implementation of the present disclosure is an information management system including one or more memory devices configured to store instructions thereon and one or more processors configured to execute the instructions to receive a publication by an agent on an agent communication channel, the publication including timeseries data, identify, based on the publication, an object entity of an entity database associated with the agent, wherein the entity database includes one or more object entities and relationships between the one or more object entities and one or more data entities, identify a data entity related to the object entity based on a relationship of the relationships relating the object entity and the data entity, and ingest the timeseries data into the data entity.

In some embodiments, the instructions cause the one or more processors to receive, by a second agent, the publication by the agent on the agent communication channel, generate, by the second agent, one or more configuration updates for the agent based on the timeseries data, and ingest the one or more configuration updates into the entity database.

In some embodiments, the instructions cause the one or more processors to receive, by a second agent, the publication by the agent on the agent communication channel, identify, by the second agent, the data entity related to the object entity based on the relationship of the relationships relating the object entity and the data entity, and ingest, by the second agent, the timeseries data into the data entity.

BRIEF DESCRIPTION OF THE DRAWINGS

The above and other aspects and features of the present disclosure will become more apparent to those skilled in the art from the following detailed description of the example embodiments with reference to the accompanying drawings, in which.

DETAILED DESCRIPTION

Figure 1:
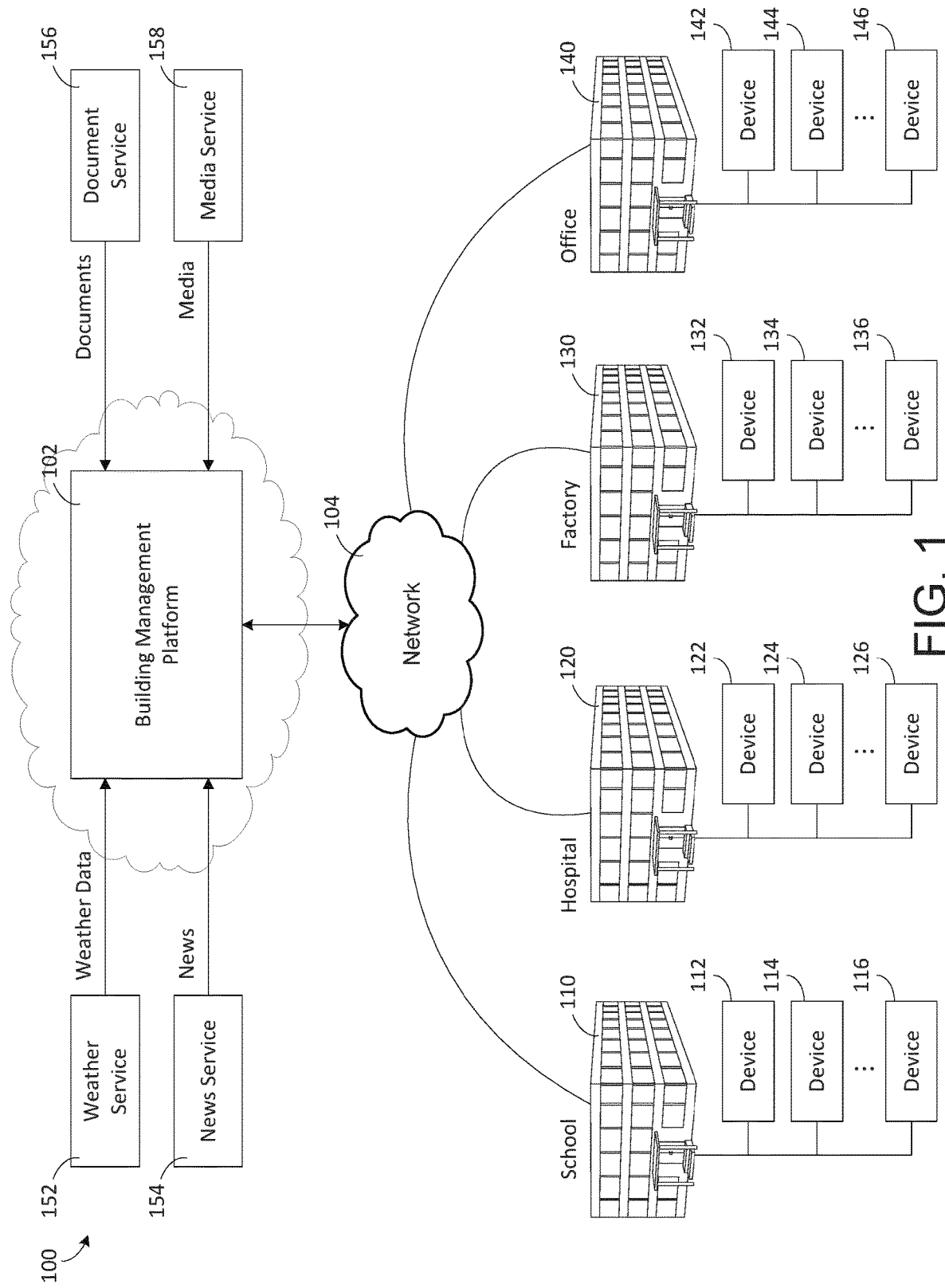
FIG. 1 is a block diagram of a smart building environment, according to an exemplary embodiment.

Referring now generally to FIGURES, various systems and methods are shown for an agent-entity system configured to generate and manage agents and entities, according to an exemplary embodiment. The various systems and methods can generate "Smart Entities," i.e., pairs between entities of an entity database and artificial intelligence agents for data communication and building control. Furthermore, the various systems and methods can perform timeseries based entity creation and maintenance using agents. The various systems and methods can ingest timeseries data into an entity database for storage of timeseries data corresponding to various entities of the entity database, can generate new entities for the entity database based on the timeseries data, and perform analysis of entities based on the timeseries data.

Entities of an entity database can be data structures representing physical building spaces, people, and/or building equipment. The entity database can include various types of entities, e.g., object entities and/or data entities. The object entities can represent particular a physical building, a floor of a building, a space of a building, a room of a building, a building occupant, and/or a physical piece of equipment. Furthermore, the data entities can represent data of the object entities. For example, a data entity may store, or may act as a reference to, timeseries data. A thermostat object entity may be associated with a data entity of temperature measurements for a physical thermostat.

The agents can be configured to simulate a building or system, such that each space, equipment, and/or control function for the building or system is simulated by a software agent. For example, according to various embodiments, various agents are used to simulate, control, and/or monitor any suitable environmental or operational aspects of a building, such as temperature, humidity, particulate count, occupancy time (actual and/or expected), lighting, audio/visual, fire safety, electrical, security, access control, lifts/escalators, and/or the like. The use of agents to aid in simulation of a building or system provide multiple advantages to a BMS systems. For example, agent based building simulation may allow for a single integrated system from design to commissioning to operations.

Agent based building simulation also allows for heavy use and reuse of design inputs, as well as for ease of commissioning (e.g. such as by eliminating the need for explicit point binding.) Agents, such as space agents, equipment agents, and control agents may be used, and may allow for goal-oriented optimization within a BMS. For example, each of the agents may communicate with each other via communication channels to achieve a particular optimization for a particular zone or space. Further, agents can be used to allow for agile deployment of new features (e.g. via the agents) when the BMS is in operations mode. The agents can be run on different devices within the system (e.g. cloud, server, controller, smartboards, etc.) and can allow for system scalability without complexity (e.g. via agents forming building blocks.) Additionally, cloud replicas or virtual simulations of a building can allow for analytics and machine learning to be performed.

Agent based BMS control systems are further described in U.S. Pat. No. 9,817,383 (application Ser. No. 15/367,167), filed Dec. 1, 2016, the entire content of which is incorporated by reference herein. Agent based BMS dynamic channel communications are further described in U.S. patent application Ser. No. 15/934,593, filed Mar. 23, 2018, the entire content of which is incorporated by reference herein. Furthermore, agent based change generation is described in greater detail in U.S. patent application Ser. No. 16/036,685 filed Jul. 16, 2018, the entirety of which is incorporated by reference herein.

Agent-Entity Based Communication and Control

In some embodiments, the system can generate agents for communication and control of physical building equipment. The agents can be generated based on entities of an entity database. For example, the system can generate agents for particular spaces and/or equipment entities. While the entities may be data structures representing an entire building, the agents may be artificial intelligence modules configured to learn and/or take action on behalf of the entities. In this regard, the entities of the entity database can be analyzed to identify one or multiple different agents to be generated, each agent corresponding to an entity of the entity database.

Furthermore, the generated agents can be configured to collect data from physical pieces of building equipment. The agents, individually or together, can be configured to control the physical pieces of building equipment. In some embodiments, the agents are configured to work together, communicating data among each other via communication channels. The communication channels can be subscriber-publisher based channels where each agent is configured to communicate data on particular channels and subscribe to particular channels to receive data. The channels used to communicate the data can be generated based on entities of the entity database. For example, a particular entity of a particular entity type (e.g., a building entity) can be identified and a corresponding communication channel (e.g., a building communication channel) can be generated.

The agents that are subscribed to the generated communication channel can be based on the relationships of the entity database. For example, if a first entity representing a building floor is related to a second entity representing an entire building, a corresponding floor agent and a corresponding building agent can be configured to communicate on a building communication channel based on the relationship. In this regard, the agents can be enabled to receive related data for performing control operations on building equipment and/or send data to other agents.

Agent-Entity Based Data Ingestion and Entity Creation Using Time Series Data

The agents can be configured to manage the entity database based on timeseries data. For example, the agents can be configured to collect timeseries data of physical building equipment, the timeseries data representing measured environmental conditions, control decisions, etc. The agents can be configured to ingest the collected timeseries data into the entity database. For example, the agents, or a timeseries service, can identify an object entity of the entity database and a corresponding data entity for storing the timeseries data. The corresponding data entity can be identified based on a relationship between the object entity and the data entity. The agents, or an agent-entity manager, can cause the timeseries data be ingested into the entity database. The entity database, storing the ingested timeseries data, can be a repository of historical data that the agents can query and utilize to perform learning and/or control decisions. In some embodiments, a first agent monitors a communication channel where a second agent posts information. The first agent can be configured to subscribe to information of the second channel and ingest any timeseries data of the second agent into the entity database.

Furthermore, in some embodiments, the timeseries data an agent collects via a communication channel can be indicative of a newly installed physical device which is not represented by an entity. In this regard, the timeseries data can be analyzed by an agent and/or the agent-entity manager and a new entity for the entity database and/or new agent can be generated. For example, a new temperature sensor could be installed in a building. Since the temperature sensor is new, the entity database may not store an object entity representing the temperature sensor. The temperature sensor can include a temperature sensor agent configured to publish timeseries temperature data of the temperature sensor on a zone communication channel. An agent for a physical building zone associated with the zone communication channel listening to messages on the zone communication channel can cause a new entity representing the thermostat to be generated and added to the entity database. Furthermore, a data entity for storing the timeseries measurements of the sensor can be generated and added to the entity database along with a relationship between the object entity and the data entity. The zone agent can cause the data entity to be ingested with the timeseries measurements.

Furthermore, the agents can be configured to analyze timeseries data published on communication channels to identify data anomalies. For example, a data anomaly, a temperature measurement of a particular zone above a predefined amount, could indicate that there is a fire in the zone or that the sensor used to measure the temperature is defective. In some embodiments, the analytics performed by the agents analyzing the timeseries data may require additional timeseries data, e.g., historical timeseries data or data of other zones or similar sensors. In this regard, if a particular agent identifies that the agent requires timeseries data to run a particular analytics operation, perform a prediction, run a control algorithm, etc. the agent can query the timeseries data for additional timeseries data and operate based on the result of the query.

Building Systems

FIG. 1 is a block diagram of a smart building environment 100, according to some exemplary embodiments. Smart building environment 100 is shown to include a building management platform 102. Building management platform 102 can be configured to collect data from a variety of different data sources. For example, building management platform 102 is shown collecting data from buildings 110, 120, 130, and 140. For example, the buildings may include a school 110, a hospital 120, a factory 130, an office building 140, and/or the like. However, the present disclosure is not limited to the number or types of buildings 110, 120, 130, and 140 shown in FIG. 1. For example, in some embodiments, building management platform 102 may be configured to collect data from one or more buildings, and the one or more buildings may be the same type of building, or may include one or more different types of buildings than that shown in FIG. 1.

Building management platform 102 can be configured to collect data from a variety of devices 112-116, 122-126, 132-136, and 142-146, either directly (e.g., directly via network 104) or indirectly (e.g., via systems or applications in the buildings 110, 120, 130, 140). In some embodiments, devices 112-116, 122-126, 132-136, and 142-146 are internet of things (IoT) devices. IoT devices may include any of a variety of physical devices, sensors, actuators, electronics, vehicles, home appliances, and/or other items having network connectivity which enable IoT devices to communicate with building management platform 102. For example, IoT devices can include smart home hub devices, smart house devices, doorbell cameras, air quality sensors, smart switches, smart lights, smart appliances, garage door openers, smoke detectors, heart monitoring implants, biochip transponders, cameras streaming live feeds, automobiles with built-in sensors, DNA analysis devices, field operation devices, tracking devices for people/vehicles/equipment, networked sensors, wireless sensors, wearable sensors, environmental sensors, RFID gateways and readers, IoT gateway devices, robots and other robotic devices, GPS devices, smart watches, virtual/augmented reality devices, and/or other networked or networkable devices. While the devices described herein are generally referred to as IoT devices, it should be understood that, in various embodiments, the devices referenced in the present disclosure could be any type of devices capable of communicating data over an electronic network.

In some embodiments, IoT devices may include sensors or sensor systems. For example, IoT devices may include acoustic sensors, sound sensors, vibration sensors, automotive or transportation sensors, chemical sensors, electric current sensors, electric voltage sensors, magnetic sensors, radio sensors, environment sensors, weather sensors, moisture sensors, humidity sensors, flow sensors, fluid velocity sensors, ionizing radiation sensors, subatomic particle sensors, navigation instruments, position sensors, angle sensors, displacement sensors, distance sensors, speed sensors, acceleration sensors, optical sensors, light sensors, imaging devices, photon sensors, pressure sensors, force sensors, density sensors, level sensors, thermal sensors, heat sensors, temperature sensors, proximity sensors, presence sensors, and/or any other type of sensors or sensing systems.

Examples of acoustic, sound, or vibration sensors include geophones, hydrophones, lace sensors, guitar pickups, microphones, and seismometers. Examples of automotive or transportation sensors include air flow meters, air-fuel ratio meters, AFR sensors, blind spot monitors, crankshaft position sensors, defect detectors, engine coolant temperature sensors, Hall effect sensors, knock sensors, map sensors, mass flow sensors, oxygen sensors, parking sensors, radar guns, speedometers, speed sensors, throttle position sensors, tire-pressure monitoring sensors, torque sensors, transmission fluid temperature sensors, turbine speed sensors, variable reluctance sensors, vehicle speed sensors, water sensors, and wheel speed sensors.

Examples of chemical sensors include breathalyzers, carbon dioxide sensors, carbon monoxide detectors, catalytic bead sensors, chemical field-effect transistors, chemiresistors, electrochemical gas sensors, electronic noses, electrolyte-insulator-semiconductor sensors, fluorescent chloride sensors, holographic sensors, hydrocarbon dew point analyzers, hydrogen sensors, hydrogen sulfide sensors, infrared point sensors, ion-selective electrodes, nondispersive infrared sensors, microwave chemistry sensors, nitrogen oxide sensors, olfactometers, optodes, oxygen sensors, ozone monitors, pellistors, pH glass electrodes, potentiometric sensors, redox electrodes, smoke detectors, and zinc oxide nanorod sensors.

Examples of electromagnetic sensors include current sensors, Daly detectors, electroscopes, electron multipliers, Faraday cups, galvanometers, Hall effect sensors, Hall probes, magnetic anomaly detectors, magnetometers, magnetoresistances, mems magnetic field sensors, metal detectors, planar hall sensors, radio direction finders, and voltage detectors.

Examples of environmental sensors include actinometers, air pollution sensors, bedwetting alarms, ceilometers, dew warnings, electrochemical gas sensors, fish counters, frequency domain sensors, gas detectors, hook gauge evaporimeters, humistors, hygrometers, leaf sensors, lysimeters, pyranometers, pyrgeometers, psychrometers, rain gauges, rain sensors, seismometers, SNOTEL sensors, snow gauges, soil moisture sensors, stream gauges, and tide gauges. Examples of flow and fluid velocity sensors include air flow meters, anemometers, flow sensors, gas meter, mass flow sensors, and water meters.

Examples of radiation and particle sensors include cloud chambers, Geiger counters, Geiger-Muller tubes, ionisation chambers, neutron detections, proportional counters, scintillation counters, semiconductor detectors, and thermoluminescent dosimeters. Examples of navigation instruments include air speed indicators, altimeters, attitude indicators, depth gauges, fluxgate compasses, gyroscopes, inertial navigation systems, inertial reference units, magnetic compasses, MEM sensors, ring laser gyroscopes, turn coordinators, tialinx sensors, variometers, vibrating structure gyroscopes, and yaw rate sensors.

Examples of position, angle, displacement, distance, speed, and acceleration sensors include auxanometers, capacitive displacement sensors, capacitive sensing devices, flex sensors, free fall sensors, gravimeters, gyroscopic sensors, impact sensors, inclinometers, integrated circuit piezoelectric sensors, laser rangefinders, laser surface velocimeters, LIDAR sensors, linear encoders, linear variable differential transformers (LVDT), liquid capacitive inclinometers odometers, photoelectric sensors, piezoelectric accelerometers, position sensors, position sensitive devices, angular rate sensors, rotary encoders, rotary variable differential transformers, selsyns, shock detectors, shock data loggers, tilt sensors, tachometers, ultrasonic thickness gauges, variable reluctance sensors, and velocity receivers.

Examples of optical, light, imaging, and photon sensors include charge-coupled devices, CMOS sensors, colorimeters, contact image sensors, electro-optical sensors, flame detectors, infra-red sensors, kinetic inductance detectors, led as light sensors, light-addressable potentiometric sensors, Nichols radiometers, fiber optic sensors, optical position sensors, thermopile laser sensors, photodetectors, photodiodes, photomultiplier tubes, phototransistors, photoelectric sensors, photoionization detectors, photomultipliers, photoresistors, photoswitches, phototubes, scintillometers, Shack-Hartmann sensors, single-photon avalanche diodes, superconducting nanowire single-photon detectors, transition edge sensors, visible light photon counters, and wavefront sensors.

Examples of pressure sensors include barographs, barometers, boost gauges, bourdon gauges, hot filament ionization gauges, ionization gauges, McLeod gauges, oscillating u-tubes, permanent downhole gauges, piezometers, pirani gauges, pressure sensors, pressure gauges, tactile sensors, and time pressure gauges. Examples of force, density, and level sensors include bhangmeters, hydrometers, force gauge and force sensors, level sensors, load cells, magnetic level gauges, nuclear density gauges, piezocapacitive pressure sensors, piezoelectric sensors, strain gauges, torque sensors, and viscometers.

Examples of thermal, heat, and temperature sensors include bolometers, bimetallic strips, calorimeters, exhaust gas temperature gauges, flame detections, Gardon gauges, Golay cells, heat flux sensors, infrared thermometers, microbolometers, microwave radiometers, net radiometers, quartz thermometers, resistance thermometers, silicon bandgap temperature sensors, special sensor microwave/imagers, temperature gauges, thermistors, thermocouples, thermometers, and pyrometers. Examples of proximity and presence sensors include alarm sensors, Doppler radars, motion detectors, occupancy sensors, proximity sensors, passive infrared sensors, reed switches, stud finders, triangulation sensors, touch switches, and wired gloves.

In some embodiments, different sensors send measurements or other data to building management platform 102 using a variety of different communications protocols or data formats. Building management platform 102 can be configured to ingest sensor data received in any protocol or data format and translate the inbound sensor data into a common data format. Building management platform 102 can create a sensor object smart entity for each sensor that communicates with Building management platform 102. Each sensor object smart entity may include one or more static attributes that describe the corresponding sensor, one or more dynamic attributes that indicate the most recent values collected by the sensor, and/or one or more relational attributes that relate sensors object smart entities to each other and/or to other types of smart entities (e.g., space entities, system entities, data entities, etc.).

In some embodiments, building management platform 102 stores sensor data using data entities. Each data entity may correspond to a particular sensor and may include a timeseries of data values received from the corresponding sensor. In some embodiments, building management platform 102 stores relational objects that define relationships between sensor object entities and the corresponding data entity. For example, each relational object may identify a particular sensor object entity, a particular data entity, and may define a link between such entities.

Building management platform 102 can collect data from a variety of external systems or services. For example, building management platform 102 is shown receiving weather data from a weather service 152, news data from a news service 154, documents and other document-related data from a document service 156, and media (e.g., video, images, audio, social media, etc.) from a media service 158. In some embodiments, building management platform 102 generates data internally. For example, building management platform 102 may include a web advertising system, a website traffic monitoring system, a web sales system, or other types of platform services that generate data. The data generated by building management platform 102 can be collected, stored, and processed along with the data received from other data sources. Building management platform 102 can collect data directly from external systems or devices or via a network 104 (e.g., a WAN, the Internet, a cellular network, etc.). Building management platform 102 can process and transform collected data to generate timeseries data and entity data. Several features of building management platform 102 are described in more detail below.

Building HVAC Systems and Building Management Systems

Figure 2:
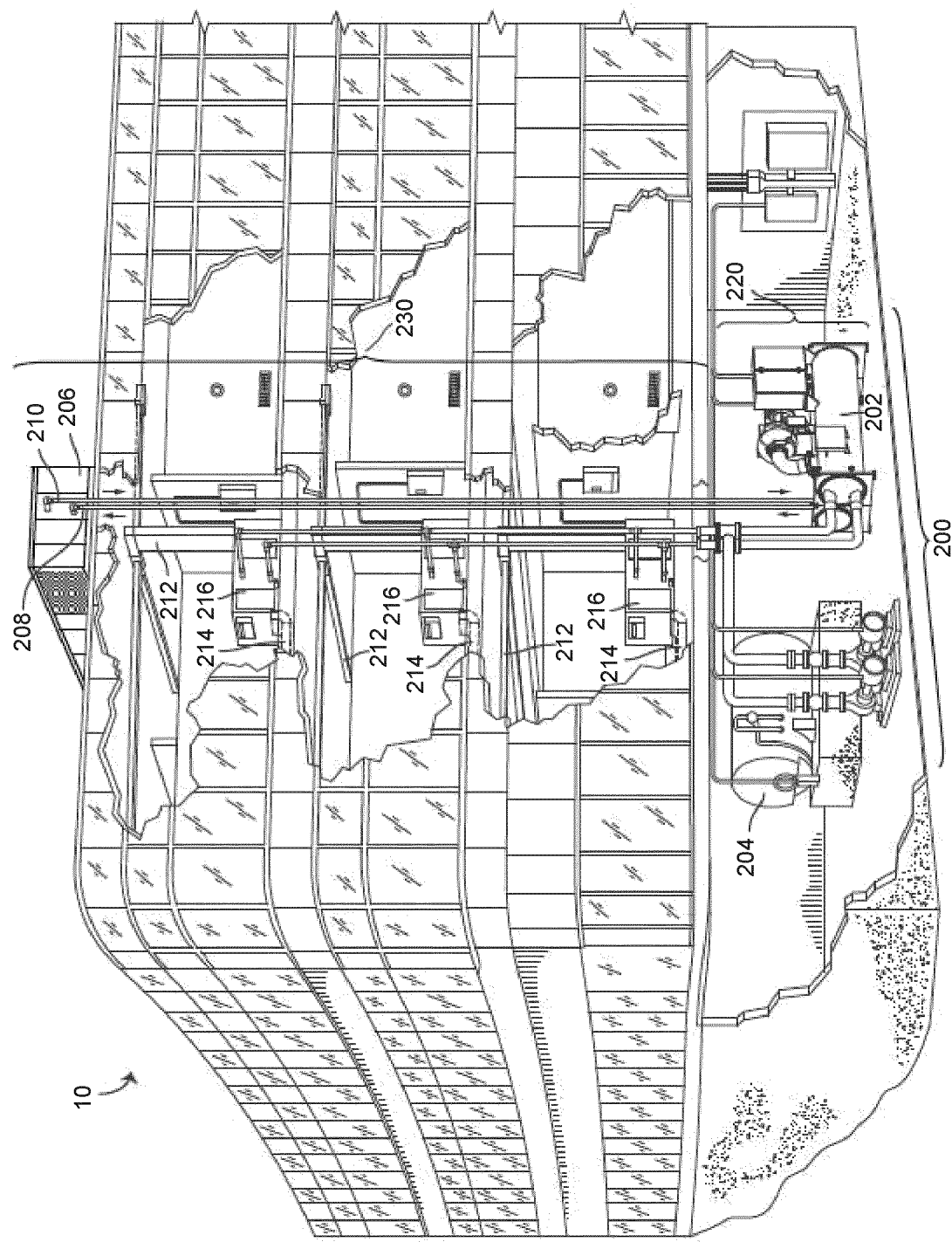
FIG. 2 is a perspective view of a smart building, according to an exemplary embodiment.
Figure 3:
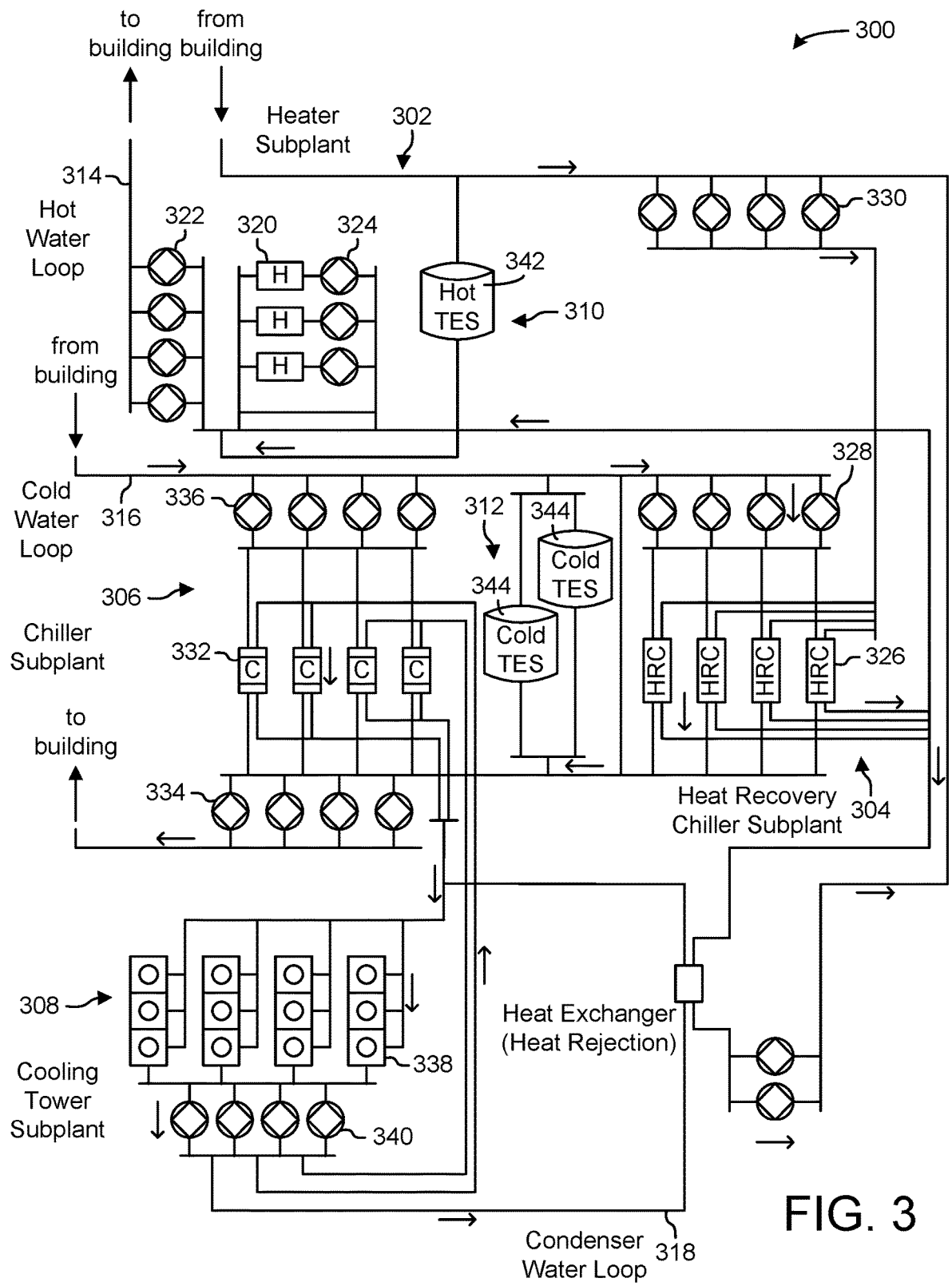
FIG. 3 is a block diagram of a waterside system, according to an exemplary embodiment.
Figure 4:
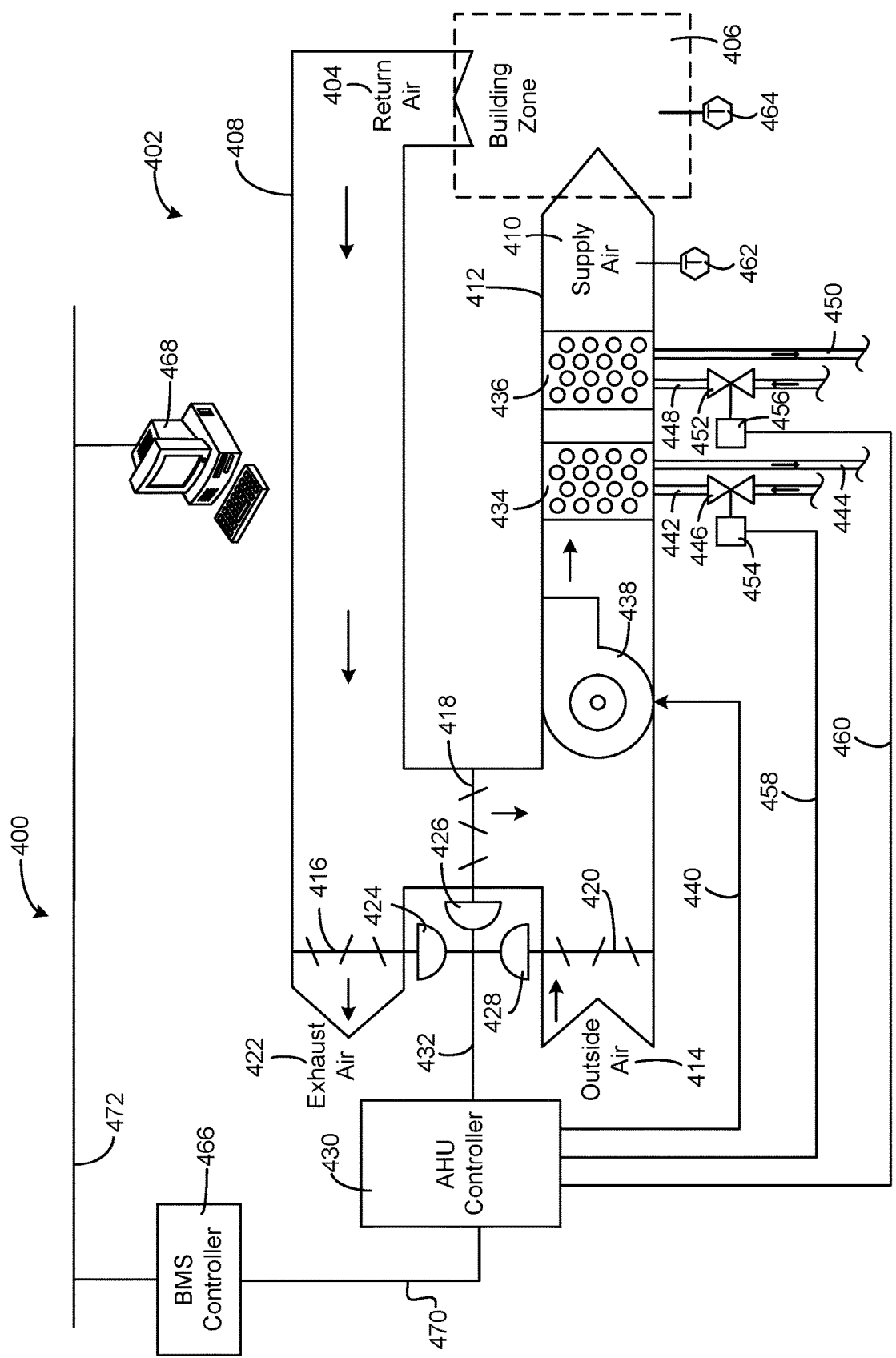
FIG. 4 is a block diagram of an airside system, according to an exemplary embodiment.
Figure 5:
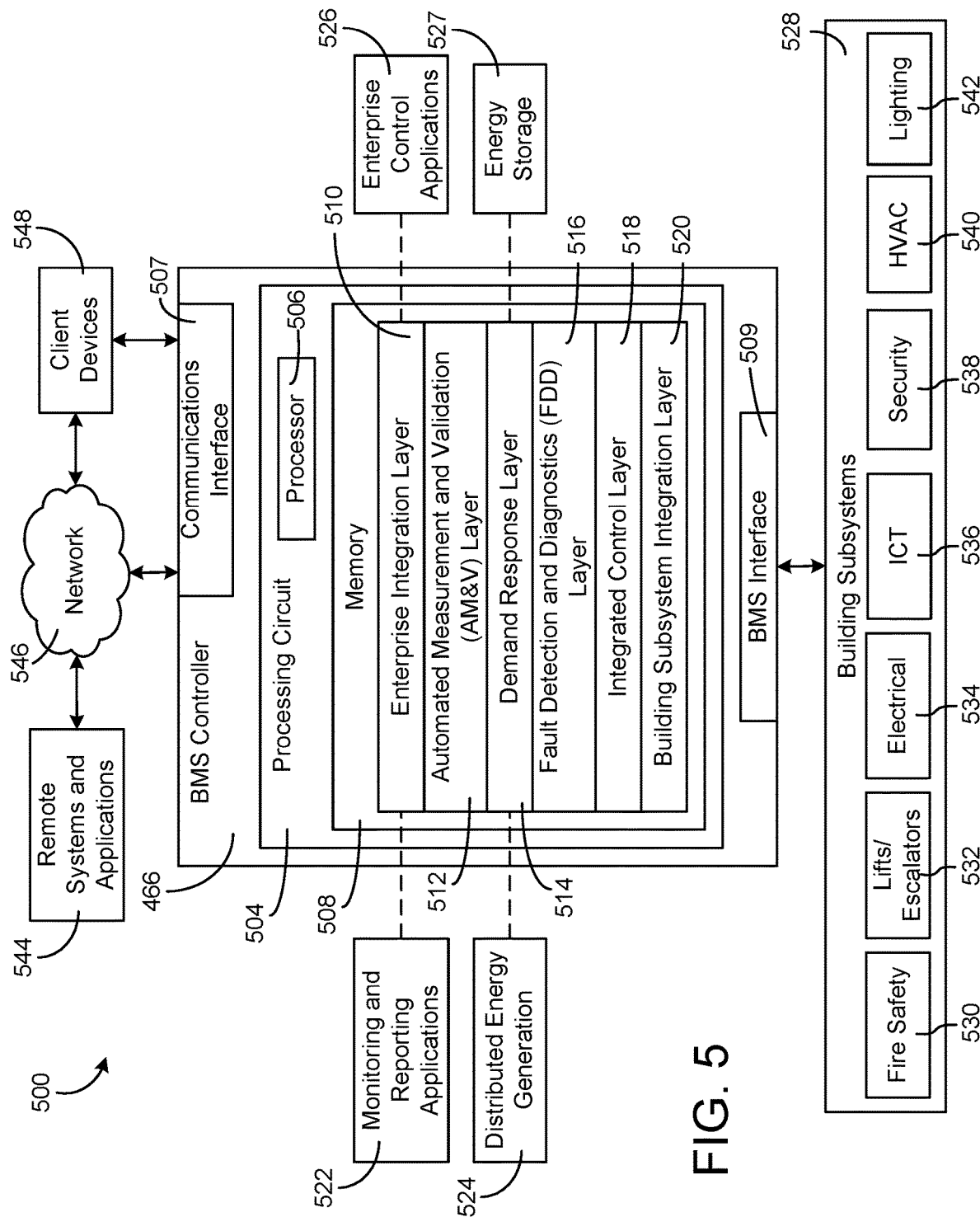
FIG. 5 is a block diagram of a building management system, according to an exemplary embodiment.

Referring now to FIGS. 2-5, several building management systems (BMS) and HVAC systems in which the systems and methods of the present disclosure can be implemented are shown, according to some embodiments. In brief overview, FIG. 2 shows a building 10 equipped with, for example, a HVAC system 200. Building 10 may be any of the buildings 210, 220, 230, and 140 as shown in FIG. 1, or may be any other suitable building that is communicatively connected to building management platform 202. FIG. 3 is a block diagram of a waterside system 300 which can be used to serve building 10. FIG. 4 is a block diagram of an airside system 400 which can be used to serve building 10. FIG. 5 is a block diagram of a building management system (BMS) which can be used to monitor and control building 10.

Building and HVAC System

Referring particularly to FIG. 2, a perspective view of a smart building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. Further, each of the systems may include multiple sensors and other devices (e.g., IoT devices) for the proper operation, maintenance, monitoring, and the like of the respective systems.

The BMS that serves building 10 includes a HVAC system 200. HVAC system 200 can include multiple HVAC devices (e.g., heaters, chillers, air handling units, pumps, fans, thermal energy storage, etc.) configured to provide heating, cooling, ventilation, or other services for building 10. For example, HVAC system 200 is shown to include a waterside system 220 and an airside system 230. Waterside system 220 may provide a heated or chilled fluid to an air handling unit of airside system 230. Airside system 230 may use the heated or chilled fluid to heat or cool an airflow provided to building 10. An exemplary waterside system and airside system which can be used in HVAC system 200 are described in greater detail with reference to FIGS. 3 and 4.

HVAC system 200 is shown to include a chiller 202, a boiler 204, and a rooftop air handling unit (AHU) 206. Waterside system 220 may use boiler 204 and chiller 202 to heat or cool a working fluid (e.g., water, glycol, etc.) and may circulate the working fluid to AHU 206. In various embodiments, the HVAC devices of waterside system 220 can be located in or around building 10 (as shown in FIG. 2) or at an offsite location such as a central plant (e.g., a chiller plant, a steam plant, a heat plant, etc.). The working fluid can be heated in boiler 204 or cooled in chiller 202, depending on whether heating or cooling is required in building 10. Boiler 204 may add heat to the circulated fluid, for example, by burning a combustible material (e.g., natural gas) or using an electric heating element. Chiller 202 may place the circulated fluid in a heat exchange relationship with another fluid (e.g., a refrigerant) in a heat exchanger (e.g., an evaporator) to absorb heat from the circulated fluid. The working fluid from chiller 202 and/or boiler 204 can be transported to AHU 206 via piping 208.

AHU 206 may place the working fluid in a heat exchange relationship with an airflow passing through AHU 206 (e.g., via one or more stages of cooling coils and/or heating coils). The airflow can be, for example, outside air, return air from within building 10, or a combination of both. AHU 206 may transfer heat between the airflow and the working fluid to provide heating or cooling for the airflow. For example, AHU 206 can include one or more fans or blowers configured to pass the airflow over or through a heat exchanger containing the working fluid. The working fluid may then return to chiller 202 or boiler 204 via piping 210.

Airside system 230 may deliver the airflow supplied by AHU 206 (i.e., the supply airflow) to building 10 via air supply ducts 212 and may provide return air from building 10 to AHU 206 via air return ducts 214. In some embodiments, airside system 230 includes multiple variable air volume (VAV) units 216. For example, airside system 230 is shown to include a separate VAV unit 216 on each floor or zone of building 10. VAV units 216 can include dampers or other flow control elements that can be operated to control an amount of the supply airflow provided to individual zones of building 10. In other embodiments, airside system 230 delivers the supply airflow into one or more zones of building 10 (e.g., via supply ducts 212) without using intermediate VAV units 216 or other flow control elements. AHU 206 can include various sensors (e.g., temperature sensors, pressure sensors, etc.) configured to measure attributes of the supply airflow. AHU 206 may receive input from sensors located within AHU 206 and/or within the building zone and may adjust the flow rate, temperature, or other attributes of the supply airflow through AHU 206 to achieve setpoint conditions for the building zone.

Waterside System

Referring now to FIG. 3, a block diagram of a waterside system 300 is shown, according to some embodiments. In various embodiments, waterside system 300 may supplement or replace waterside system 220 in HVAC system 200 or can be implemented separate from HVAC system 200. When implemented in HVAC system 200, waterside system 300 can include a subset of the HVAC devices in HVAC system 200 (e.g., boiler 204, chiller 202, pumps, valves, etc.) and may operate to supply a heated or chilled fluid to AHU 206. The HVAC devices of waterside system 300 can be located within building 10 (e.g., as components of waterside system 220) or at an offsite location such as a central plant.

In FIG. 3, waterside system 300 is shown as a central plant having subplants 302-312. Subplants 302-312 are shown to include a heater subplant 302, a heat recovery chiller subplant 304, a chiller subplant 306, a cooling tower subplant 308, a hot thermal energy storage (TES) subplant 310, and a cold thermal energy storage (TES) subplant 312. Subplants 302-312 consume resources (e.g., water, natural gas, electricity, etc.) from utilities to serve thermal energy loads (e.g., hot water, cold water, heating, cooling, etc.) of a building or campus. For example, heater subplant 302 can be configured to heat water in a hot water loop 314 that circulates the hot water between heater subplant 302 and building 10. Chiller subplant 306 can be configured to chill water in a cold water loop 316 that circulates the cold water between chiller subplant 306 and building 10. Heat recovery chiller subplant 304 can be configured to transfer heat from cold water loop 316 to hot water loop 314 to provide additional heating for the hot water and additional cooling for the cold water. Condenser water loop 318 may absorb heat from the cold water in chiller subplant 306 and reject the absorbed heat in cooling tower subplant 308 or transfer the absorbed heat to hot water loop 314. Hot TES subplant 310 and cold TES subplant 312 may store hot and cold thermal energy, respectively, for subsequent use.

Hot water loop 314 and cold water loop 316 may deliver the heated and/or chilled water to air handlers located on the rooftop of building 10 (e.g., AHU 206) or to individual floors or zones of building 10 (e.g., VAV units 216). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 302-312 to receive further heating or cooling.

Although subplants 302-312 are shown and described as heating and cooling water for circulation to a building, it is understood that any other type of working fluid (e.g., glycol, $CO_2$, etc.) can be used in place of or in addition to water to serve thermal energy loads. In other embodiments, subplants 302-312 may provide heating and/or cooling directly to the building or campus without requiring an intermediate heat transfer fluid. These and other variations to waterside system 300 are within the teachings of the present disclosure.

Each of subplants 302-312 can include a variety of equipment configured to facilitate the functions of the subplant. For example, heater subplant 302 is shown to include heating elements 320 (e.g., boilers, electric heaters, etc.) configured to add heat to the hot water in hot water loop 314. Heater subplant 302 is also shown to include several pumps 322 and 324 configured to circulate the hot water in hot water loop 314 and to control the flow rate of the hot water through individual heating elements 320. Chiller subplant 306 is shown to include chillers 332 configured to remove heat from the cold water in cold water loop 316. Chiller subplant 306 is also shown to include several pumps 334 and 336 configured to circulate the cold water in cold water loop 316 and to control the flow rate of the cold water through individual chillers 332.

Heat recovery chiller subplant 304 is shown to include heat recovery heat exchangers 326 (e.g., refrigeration circuits) configured to transfer heat from cold water loop 316 to hot water loop 314. Heat recovery chiller subplant 304 is also shown to include several pumps 328 and 330 configured to circulate the hot water and/or cold water through heat recovery heat exchangers 326 and to control the flow rate of the water through individual heat recovery heat exchangers 326. Cooling tower subplant 308 is shown to include cooling towers 338 configured to remove heat from the condenser water in condenser water loop 318. Cooling tower subplant 308 is also shown to include several pumps 340 configured to circulate the condenser water in condenser water loop 318 and to control the flow rate of the condenser water through individual cooling towers 338.

Hot TES subplant 310 is shown to include a hot TES tank 342 configured to store the hot water for later use. Hot TES subplant 310 may also include one or more pumps or valves configured to control the flow rate of the hot water into or out of hot TES tank 342. Cold TES subplant 312 is shown to include cold TES tanks 344 configured to store the cold water for later use. Cold TES subplant 312 may also include one or more pumps or valves configured to control the flow rate of the cold water into or out of cold TES tanks 344.

In some embodiments, one or more of the pumps in waterside system 300 (e.g., pumps 322, 324, 328, 330, 334, 336, and/or 340) or pipelines in waterside system 300 include an isolation valve associated therewith. Isolation valves can be integrated with the pumps or positioned upstream or downstream of the pumps to control the fluid flows in waterside system 300. In various embodiments, waterside system 300 can include more, fewer, or different types of devices and/or subplants based on the particular configuration of waterside system 300 and the types of loads served by waterside system 300.

Airside System

Referring now to FIG. 4, a block diagram of an airside system 400 is shown, according to some embodiments. In various embodiments, airside system 400 may supplement or replace airside system 230 in HVAC system 200 or can be implemented separate from HVAC system 200. When implemented in HVAC system 200, airside system 400 can include a subset of the HVAC devices in HVAC system 200 (e.g., AHU 206, VAV units 216, ducts 212-214, fans, dampers, etc.) and can be located in or around building 10. Airside system 400 may operate to heat or cool an airflow provided to building 10 using a heated or chilled fluid provided by waterside system 300.

In FIG. 4, airside system 400 is shown to include an economizer-type air handling unit (AHU) 402. Economizer-type AHUs vary the amount of outside air and return air used by the air handling unit for heating or cooling. For example, AHU 402 may receive return air 404 from building zone 406 via return air duct 408 and may deliver supply air 410 to building zone 406 via supply air duct 412. In some embodiments, AHU 402 is a rooftop unit located on the roof of building 10 (e.g., AHU 206 as shown in FIG. 2) or otherwise positioned to receive both return air 404 and outside air 414. AHU 402 can be configured to operate exhaust air damper 416, mixing damper 418, and outside air damper 420 to control an amount of outside air 414 and return air 404 that combine to form supply air 410. Any return air 404 that does not pass through mixing damper 418 can be exhausted from AHU 402 through exhaust damper 416 as exhaust air 422.

Each of dampers 416-420 can be operated by an actuator. For example, exhaust air damper 416 can be operated by actuator 424, mixing damper 418 can be operated by actuator 426, and outside air damper 420 can be operated by actuator 428. Actuators 424-428 may communicate with an AHU controller 430 via a communications link 432. Actuators 424-428 may receive control signals from AHU controller 430 and may provide feedback signals to AHU controller 430. Feedback signals can include, for example, an indication of a current actuator or damper position, an amount of torque or force exerted by the actuator, diagnostic information (e.g., results of diagnostic tests performed by actuators 424-428), status information, commissioning information, configuration settings, calibration data, and/or other types of information or data that can be collected, stored, or used by actuators 424-428. AHU controller 430 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 424-428.

Still referring to FIG. 4, AHU 304 is shown to include a cooling coil 434, a heating coil 436, and a fan 438 positioned within supply air duct 412. Fan 438 can be configured to force supply air 410 through cooling coil 434 and/or heating coil 436 and provide supply air 410 to building zone 406. AHU controller 430 may communicate with fan 438 via communications link 440 to control a flow rate of supply air 410. In some embodiments, AHU controller 430 controls an amount of heating or cooling applied to supply air 410 by modulating a speed of fan 438.

Cooling coil 434 may receive a chilled fluid from waterside system 300 (e.g., from cold water loop 316) via piping 442 and may return the chilled fluid to waterside system 300 via piping 444. Valve 446 can be positioned along piping 442 or piping 444 to control a flow rate of the chilled fluid through cooling coil 434. In some embodiments, cooling coil 434 includes multiple stages of cooling coils that can be independently activated and deactivated (e.g., by AHU controller 430, by BMS controller 466, etc.) to modulate an amount of cooling applied to supply air 410.

Heating coil 436 may receive a heated fluid from waterside system 300 (e.g., from hot water loop 314) via piping 448 and may return the heated fluid to waterside system 300 via piping 450. Valve 452 can be positioned along piping 448 or piping 450 to control a flow rate of the heated fluid through heating coil 436. In some embodiments, heating coil 436 includes multiple stages of heating coils that can be independently activated and deactivated (e.g., by AHU controller 430, by BMS controller 466, etc.) to modulate an amount of heating applied to supply air 410.

Each of valves 446 and 452 can be controlled by an actuator. For example, valve 446 can be controlled by actuator 454 and valve 452 can be controlled by actuator 456. Actuators 454-456 may communicate with AHU controller 430 via communications links 458-460. Actuators 454-456 may receive control signals from AHU controller 430 and may provide feedback signals to controller 430. In some embodiments, AHU controller 430 receives a measurement of the supply air temperature from a temperature sensor 462 positioned in supply air duct 412 (e.g., downstream of cooling coil 434 and/or heating coil 436). AHU controller 430 may also receive a measurement of the temperature of building zone 406 from a temperature sensor 464 located in building zone 406.

In some embodiments, AHU controller 430 operates valves 446 and 452 via actuators 454-456 to modulate an amount of heating or cooling provided to supply air 410 (e.g., to achieve a setpoint temperature for supply air 410 or to maintain the temperature of supply air 410 within a setpoint temperature range). The positions of valves 446 and 452 affect the amount of heating or cooling provided to supply air 410 by cooling coil 434 or heating coil 436 and may correlate with the amount of energy consumed to achieve a desired supply air temperature. AHU 430 may control the temperature of supply air 410 and/or building zone 406 by activating or deactivating coils 434-436, adjusting a speed of fan 438, or a combination of both.

Still referring to FIG. 4, airside system 400 is shown to include a building management system (BMS) controller 466 and a client device 468. BMS controller 466 can include one or more computer systems (e.g., servers, supervisory controllers, subsystem controllers, etc.) that serve as system level controllers, application or data servers, head nodes, or master controllers for airside system 400, waterside system 300, HVAC system 200, and/or other controllable systems that serve building 10. BMS controller 466 may communicate with multiple downstream building systems or subsystems (e.g., HVAC system 200, a security system, a lighting system, waterside system 300, etc.) via a communications link 470 according to like or disparate protocols (e.g., LON, BACnet, etc.). In various embodiments, AHU controller 430 and BMS controller 466 can be separate (as shown in FIG. 4) or integrated. In an integrated implementation, AHU controller 430 can be a software module configured for execution by a processor of BMS controller 466.

In some embodiments, AHU controller 430 receives information from BMS controller 466 (e.g., commands, setpoints, operating boundaries, etc.) and provides information to BMS controller 466 (e.g., temperature measurements, valve or actuator positions, operating statuses, diagnostics, etc.). For example, AHU controller 430 may provide BMS controller 466 with temperature measurements from temperature sensors 462-464, equipment on/off states, equipment operating capacities, and/or any other information that can be used by BMS controller 466 to monitor or control a variable state or condition within building zone 406.

Client device 468 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 200, its subsystems, and/or devices. Client device 468 can be a computer workstation, a client terminal, a remote or local interface, or any other type of user interface device. Client device 468 can be a stationary terminal or a mobile device. For example, client device 468 can be a desktop computer, a computer server with a user interface, a laptop computer, a tablet, a smartphone, a PDA, or any other type of mobile or non-mobile device. Client device 468 may communicate with BMS controller 466 and/or AHU controller 430 via communications link 472.

Building Management System

Referring now to FIG. 5, a block diagram of a building management system (BMS) 500 is shown, according to some embodiments. BMS 500 can be implemented in building 10 to automatically monitor and control various building functions. BMS 500 is shown to include BMS controller 466 and building subsystems 528. Building subsystems 528 are shown to include a building electrical subsystem 534, an information communication technology (ICT) subsystem 536, a security subsystem 538, a HVAC subsystem 540, a lighting subsystem 542, a lift/escalators subsystem 532, and a fire safety subsystem 530. In various embodiments, building subsystems 528 can include fewer, additional, or alternative subsystems. For example, building subsystems 528 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 528 include waterside system 300 and/or airside system 400, as described with reference to FIGS. 3-4.

Each of building subsystems 528 can include any number of devices (e.g., IoT devices), sensors, controllers, and connections for completing its individual functions and control activities. HVAC subsystem 540 can include many of the same components as HVAC system 200, as described with reference to FIGS. 2-4. For example, HVAC subsystem 540 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 542 can include any number of light fixtures, ballasts, lighting sensors, dimmers, or other devices configured to controllably adjust the amount of light provided to a building space. Security subsystem 538 can include occupancy sensors, video surveillance cameras, digital video recorders, video processing servers, intrusion detection devices, access control devices and servers, or other security-related devices.

Still referring to FIG. 5, BMS controller 466 is shown to include a communications interface 507 and a BMS interface 509. Interface 507 may facilitate communications between BMS controller 466 and external applications (e.g., monitoring and reporting applications 522, enterprise control applications 526, remote systems and applications 544, applications residing on client devices 548, etc.) for allowing user control, monitoring, and adjustment to BMS controller 466 and/or subsystems 528. Interface 507 may also facilitate communications between BMS controller 466 and client devices 548. BMS interface 509 may facilitate communications between BMS controller 466 and building subsystems 528 (e.g., HVAC, lighting security, lifts, power distribution, business, etc.).

Interfaces 507, 509 can be or include wired or wireless communications interfaces (e.g., jacks, antennas, transmitters, receivers, transceivers, wire terminals, etc.) for conducting data communications with building subsystems 528 or other external systems or devices. In various embodiments, communications via interfaces 507, 509 can be direct (e.g., local wired or wireless communications) or via a communications network 546 (e.g., a WAN, the Internet, a cellular network, etc.). For example, interfaces 507, 509 can include an Ethernet card and port for sending and receiving data via an Ethernet-based communications link or network. In another example, interfaces 507, 509 can include a Wi-Fi transceiver for communicating via a wireless communications network. In another example, one or both of interfaces 507, 509 can include cellular or mobile phone communications transceivers. In one embodiment, communications interface 507 is a power line communications interface and BMS interface 509 is an Ethernet interface. In other embodiments, both communications interface 507 and BMS interface 509 are Ethernet interfaces or are the same Ethernet interface.

Still referring to FIG. 5, BMS controller 466 is shown to include a processing circuit 504 including a processor 506 and memory 508. Processing circuit 504 can be communicably connected to BMS interface 509 and/or communications interface 507 such that processing circuit 504 and the various components thereof can send and receive data via interfaces 507, 509. Processor 506 can be implemented as a general purpose processor, an application specific integrated circuit (ASIC), one or more field programmable gate arrays (FPGAs), a group of processing components, or other suitable electronic processing components.

Memory 508 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 508 can be or include volatile memory or non-volatile memory. Memory 508 can include database components, object code components, script components, or any other type of information structure for supporting the various activities and information structures described in the present application. According to some embodiments, memory 508 is communicably connected to processor 506 via processing circuit 504 and includes computer code for executing (e.g., by processing circuit 504 and/or processor 506) one or more processes described herein.

In some embodiments, BMS controller 466 is implemented within a single computer (e.g., one server, one housing, etc.). In various other embodiments BMS controller 466 can be distributed across multiple servers or computers (e.g., that can exist in distributed locations). Further, while FIG. 4 shows applications 522 and 526 as existing outside of BMS controller 466, in some embodiments, applications 522 and 526 can be hosted within BMS controller 466 (e.g., within memory 508).

Still referring to FIG. 5, memory 508 is shown to include an enterprise integration layer 510, an automated measurement and validation (AM&V) layer 512, a demand response (DR) layer 514, a fault detection and diagnostics (FDD) layer 516, an integrated control layer 518, and a building subsystem integration later 520. Layers 510-520 can be configured to receive inputs from building subsystems 528 and other data sources, determine optimal control actions for building subsystems 528 based on the inputs, generate control signals based on the optimal control actions, and provide the generated control signals to building subsystems 528. The following paragraphs describe some of the general functions performed by each of layers 510-520 in BMS 500.

Enterprise integration layer 510 can be configured to serve clients or local applications with information and services to support a variety of enterprise-level applications. For example, enterprise control applications 526 can be configured to provide subsystem-spanning control to a graphical user interface (GUI) or to any number of enterprise-level business applications (e.g., accounting systems, user identification systems, etc.). Enterprise control applications 526 may also or alternatively be configured to provide configuration GUIs for configuring BMS controller 466. In yet other embodiments, enterprise control applications 526 can work with layers 510-520 to optimize building performance (e.g., efficiency, energy use, comfort, or safety) based on inputs received at interface 507 and/or BMS interface 509.

Building subsystem integration layer 520 can be configured to manage communications between BMS controller 466 and building subsystems 528. For example, building subsystem integration layer 520 may receive sensor data and input signals from building subsystems 528 and provide output data and control signals to building subsystems 528. Building subsystem integration layer 520 may also be configured to manage communications between building subsystems 528. Building subsystem integration layer 520 translates communications (e.g., sensor data, input signals, output signals, etc.) across multi-vendor/multi-protocol systems.

Demand response layer 514 can be configured to determine (e.g., optimize) resource usage (e.g., electricity use, natural gas use, water use, etc.) and/or the monetary cost of such resource usage to satisfy the demand of building 10. The resource usage determination can be based on time-of-use prices, curtailment signals, energy availability, or other data received from utility providers, distributed energy generation systems 524, energy storage 527 (e.g., hot TES 342, cold TES 344, etc.), or from other sources. Demand response layer 514 may receive inputs from other layers of BMS controller 466 (e.g., building subsystem integration layer 520, integrated control layer 518, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 514 includes control logic for responding to the data and signals it receives. These responses can include communicating with the control algorithms in integrated control layer 518, changing control strategies, changing setpoints, or activating/deactivating building equipment or subsystems in a controlled manner. Demand response layer 514 may also include control logic configured to determine when to utilize stored energy. For example, demand response layer 514 may determine to begin using energy from energy storage 527 just prior to the beginning of a peak use hour.

In some embodiments, demand response layer 514 includes a control module configured to actively initiate control actions (e.g., automatically changing setpoints) which reduce (e.g., minimize) energy costs based on one or more inputs representative of or based on demand (e.g., price, a curtailment signal, a demand level, etc.). In some embodiments, demand response layer 514 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 514 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 518 can be configured to use the data input or output of building subsystem integration layer 520 and/or demand response later 514 to make control decisions. Due to the subsystem integration provided by building subsystem integration layer 520, integrated control layer 518 can integrate control activities of the subsystems 528 such that the subsystems 528 behave as a single integrated supersystem. In some embodiments, integrated control layer 518 includes control logic that uses inputs and outputs from building subsystems to provide greater comfort and energy savings relative to the comfort and energy savings that separate subsystems could provide alone. For example, integrated control layer 518 can be configured to use an input from a first subsystem to make an energy-saving control decision for a second subsystem. Results of these decisions can be communicated back to building subsystem integration layer 520.

Integrated control layer 518 is shown to be logically below demand response layer 514. Integrated control layer 518 can be configured to enhance the effectiveness of demand response layer 514 by enabling building subsystems 528 and their respective control loops to be controlled in coordination with demand response layer 514. This configuration may advantageously reduce disruptive demand response behavior relative to conventional systems. For example, integrated control layer 518 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 518 can be configured to provide feedback to demand response layer 514 so that demand response layer 514 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 518 is also logically below fault detection and diagnostics layer 516 and automated measurement and validation layer 512. Integrated control layer 518 can be configured to provide calculated inputs (e.g., aggregations) to these higher levels based on outputs from more than one building subsystem.

Automated measurement and validation (AM&V) layer 512 can be configured to verify that control strategies commanded by integrated control layer 518 or demand response layer 514 are working properly (e.g., using data aggregated by AM&V layer 512, integrated control layer 518, building subsystem integration layer 520, FDD layer 516, or otherwise). The calculations made by AM&V layer 512 can be based on building system energy models and/or equipment models for individual BMS devices or subsystems. For example, AM&V layer 512 may compare a model-predicted output with an actual output from building subsystems 528 to determine an accuracy of the model.

Fault detection and diagnostics (FDD) layer 516 can be configured to provide on-going fault detection for building subsystems 528, building subsystem devices (i.e., building equipment), and control algorithms used by demand response layer 514 and integrated control layer 518. FDD layer 516 may receive data inputs from integrated control layer 518, directly from one or more building subsystems or devices, or from another data source. FDD layer 516 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 516 can be configured to output a specific identification of the faulty component or cause of the fault (e.g., loose damper linkage) using detailed subsystem inputs available at building subsystem integration layer 520. In other exemplary embodiments, FDD layer 516 is configured to provide "fault" events to integrated control layer 518 which executes control strategies and policies in response to the received fault events. According to some embodiments, FDD layer 516 (or a policy executed by an integrated control engine or business rules engine) may shut-down systems or direct control activities around faulty devices or systems to reduce energy waste, extend equipment life, or assure proper control response.

FDD layer 516 can be configured to store or access a variety of different system data stores (or data points for live data). FDD layer 516 may use some content of the data stores to identify faults at the equipment level (e.g., specific chiller, specific AHU, specific terminal unit, etc.) and other content to identify faults at component or subsystem levels. For example, building subsystems 528 may generate temporal (i.e., time-series) data indicating the performance of BMS 500 and the various components thereof. The data generated by building subsystems 528 can include measured or calculated values that exhibit statistical characteristics and provide information about how the corresponding system or process (e.g., a temperature control process, a flow control process, etc.) is performing in terms of error from its setpoint. These processes can be examined by FDD layer 516 to expose when the system begins to degrade in performance and alert a user to repair the fault before it becomes more severe.

Building Management System with Cloud Building Management Platform

Figure 6:
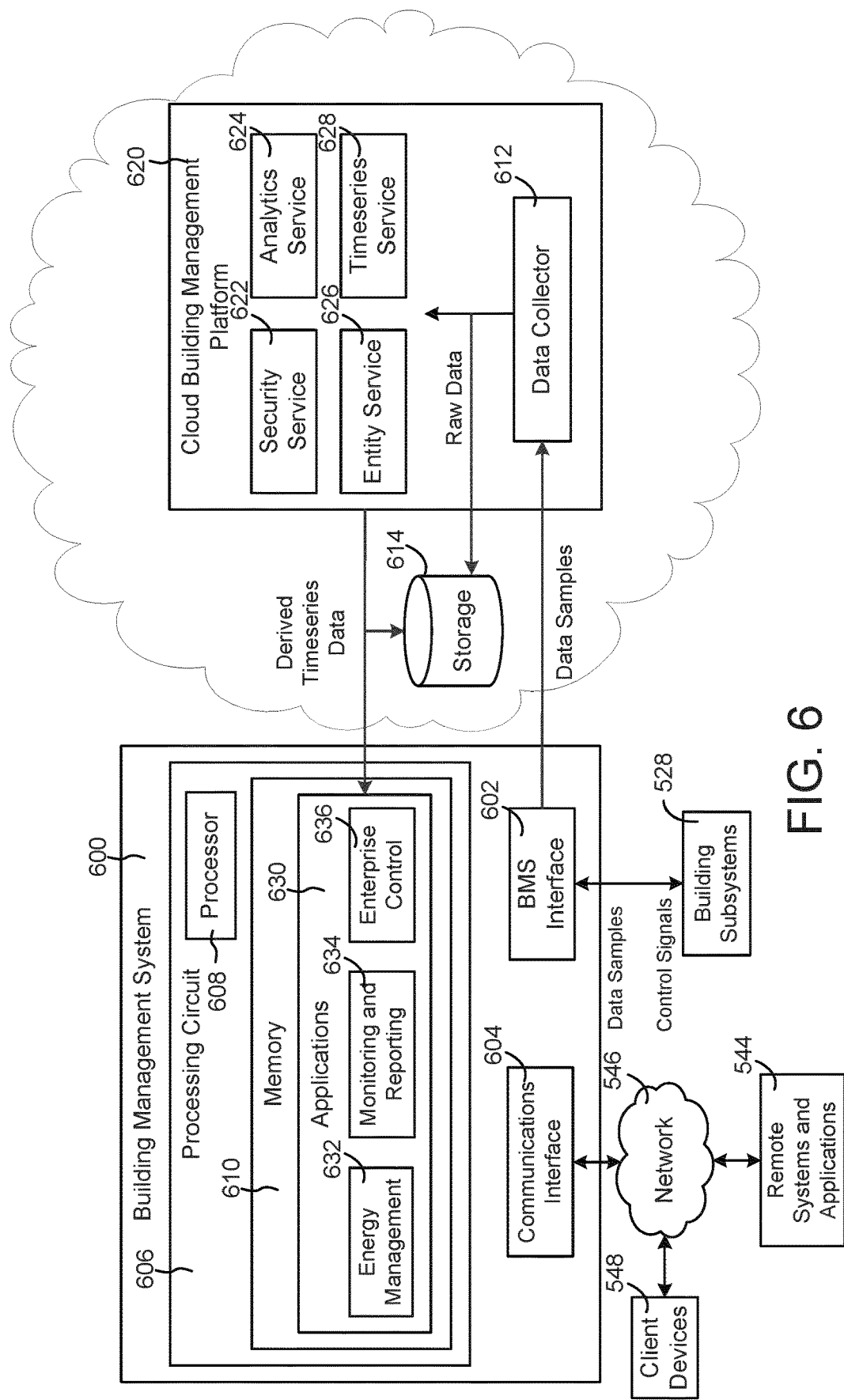
FIG. 6 is a block diagram of another building management system, according to an exemplary embodiment.

Referring now to FIG. 6, a block diagram of another building management system (BMS) 600 is shown, according to some embodiments. BMS 600 can be configured to collect data samples from building subsystems 528 and provide the data samples to Cloud building management platform 620 to generate raw timeseries data, derived timeseries data, and/or entity data from the data samples. In some embodiments, Cloud building management platform 620 may supplement or replace building management platform 102 shown in FIG. 1 or can be implemented separate from building management platform 102. Cloud building management platform 620 can process and transform the raw timeseries data to generate derived timeseries data. Throughout this disclosure, the term "derived timeseries data" is used to describe the result or output of a transformation or other timeseries processing operation performed by various services of the building management platform 620 (e.g., data aggregation, data cleansing, virtual point calculation, etc.). The term "entity data" is used to describe the attributes of various smart entities (e.g., IoT systems, devices, components, sensors, and the like) and the relationships between the smart entities. The derived timeseries data can be provided to various applications 630 and/or stored in storage 614 (e.g., as materialized views of the raw timeseries data). In some embodiments, Cloud building management platform 620 separates data collection; data storage, retrieval, and analysis; and data visualization into three different layers. This allows Cloud building management platform 620 to support a variety of applications 630 that use the derived timeseries data and allows new applications 630 to reuse the existing infrastructure provided by Cloud building management platform 620.

It should be noted that the components of BMS 600 and/or Cloud building management platform 620 can be integrated within a single device (e.g., a supervisory controller, a BMS controller, etc.) or distributed across multiple separate systems or devices. In other embodiments, some or all of the components of BMS 600 and/or Cloud building management platform 620 can be implemented as part of a cloud-based computing system configured to receive and process data from one or more building management systems. In other embodiments, some or all of the components of BMS 600 and/or Cloud building management platform 620 can be components of a subsystem level controller (e.g., a HVAC controller), a subplant controller, a device controller (e.g., AHU controller 330, a chiller controller, etc.), a field controller, a computer workstation, a client device, or any other system or device that receives and processes data from building systems and equipment.

BMS 600 can include many of the same components as BMS 500, as described with reference to FIG. 5. For example, BMS 600 is shown to include a BMS interface 602 and a communications interface 604. Interfaces 602-604 can include wired or wireless communications interfaces (e.g., jacks, antennas, transmitters, receivers, transceivers, wire terminals, etc.) for conducting data communications with building subsystems 528 or other external systems or devices. Communications conducted via interfaces 602-604 can be direct (e.g., local wired or wireless communications) or via a communications network 546 (e.g., a WAN, the Internet, a cellular network, etc.).

Communications interface 604 can facilitate communications between BMS 600 and external applications (e.g., remote systems and applications 544) for allowing user control, monitoring, and adjustment to BMS 600. Communications interface 604 can also facilitate communications between BMS 600 and client devices 548. BMS interface 602 can facilitate communications between BMS 600 and building subsystems 528. BMS 600 can be configured to communicate with building subsystems 528 using any of a variety of building automation systems protocols (e.g., BACnet, Modbus, ADX, etc.). In some embodiments, BMS 600 receives data samples from building subsystems 528 and provides control signals to building subsystems 528 via BMS interface 602.

Building subsystems 528 can include building electrical subsystem 534, information communication technology (ICT) subsystem 536, security subsystem 538, HVAC subsystem 540, lighting subsystem 542, lift/escalators subsystem 532, and/or fire safety subsystem 530, as described with reference to FIG. 5. In various embodiments, building subsystems 528 can include fewer, additional, or alternative subsystems. For example, building subsystems 528 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 528 include waterside system 300 and/or airside system 400, as described with reference to FIGS. 3-4. Each of building subsystems 528 can include any number of devices, controllers, and connections for completing its individual functions and control activities. Building subsystems 528 can include building equipment (e.g., sensors, air handling units, chillers, pumps, valves, etc.) configured to monitor and control a building condition such as temperature, humidity, airflow, etc.

Still referring to FIG. 6, BMS 600 is shown to include a processing circuit 606 including a processor 608 and memory 610. Cloud building management platform may include one or more processing circuits including one or more processors and memory. Each of the processor can be a general purpose or specific purpose processor, an application specific integrated circuit (ASIC), one or more field programmable gate arrays (FPGAs), a group of processing components, or other suitable processing components. Each of the processors is configured to execute computer code or instructions stored in memory or received from other computer readable media (e.g., CDROM, network storage, a remote server, etc.).

Memory can include one or more devices (e.g., memory units, memory devices, storage devices, etc.) for storing data and/or computer code for completing and/or facilitating the various processes described in the present disclosure. Memory can include random access memory (RAM), read-only memory (ROM), hard drive storage, temporary storage, non-volatile memory, flash memory, optical memory, or any other suitable memory for storing software objects and/or computer instructions. Memory can include database components, object code components, script components, or any other type of information structure for supporting the various activities and information structures described in the present disclosure. Memory can be communicably connected to the processors via the processing circuits and can include computer code for executing (e.g., by processor 508) one or more processes described herein.

Still referring to FIG. 6, Cloud building management platform 620 is shown to include a data collector 612. Data collector 612 is shown receiving data samples from building subsystems 528 via BMS interface 602. However, the present disclosure is not limited thereto, and the data collector 612 may receive the data samples directly from the building subsystems 528 (e.g., via network 546 or via any suitable method). In some embodiments, the data samples include data values for various data points. The data values can be measured or calculated values, depending on the type of data point. For example, a data point received from a temperature sensor can include a measured data value indicating a temperature measured by the temperature sensor. A data point received from a chiller controller can include a calculated data value indicating a calculated efficiency of the chiller. Data collector 612 can receive data samples from multiple different devices (e.g., IoT devices, sensors, etc.) within building subsystems 528.

The data samples can include one or more attributes that describe or characterize the corresponding data points. For example, the data samples can include a name attribute defining a point name or ID (e.g., "B1F4R2.T-Z"), a device attribute indicating a type of device from which the data samples is received (e.g., temperature sensor, humidity sensor, chiller, etc.), a unit attribute defining a unit of measure associated with the data value (e.g., ° F., ° C., kPA, etc.), and/or any other attribute that describes the corresponding data point or provides contextual information regarding the data point. The types of attributes included in each data point can depend on the communications protocol used to send the data samples to BMS 600 and/or Cloud building management platform 620. For example, data samples received via the ADX protocol or BACnet protocol can include a variety of descriptive attributes along with the data value, whereas data samples received via the Modbus protocol may include a lesser number of attributes (e.g., only the data value without any corresponding attributes).

In some embodiments, each data sample is received with a timestamp indicating a time at which the corresponding data value was measured or calculated. In other embodiments, data collector 612 adds timestamps to the data samples based on the times at which the data samples are received. Data collector 612 can generate raw timeseries data for each of the data points for which data samples are received. Each timeseries can include a series of data values for the same data point and a timestamp for each of the data values. For example, a timeseries for a data point provided by a temperature sensor can include a series of temperature values measured by the temperature sensor and the corresponding times at which the temperature values were measured. An example of a timeseries which can be generated by data collector 612 is as follows:

[<key, timestamp$_1$, value$_1$>, <key, timestamp$_2$, value$_2$>, <key, timestamp$_3$, value$_3$>]

where key is an identifier of the source of the raw data samples (e.g., timeseries ID, sensor ID, device ID, etc.), timestamp identifies the time at which the ith sample was collected, and value$_i$ indicates the value of the ith sample.

Data collector 612 can add timestamps to the data samples or modify existing timestamps such that each data sample includes a local timestamp. Each local timestamp indicates the local time at which the corresponding data sample was measured or collected and can include an offset relative to universal time. The local timestamp indicates the local time at the location the data point was measured at the time of measurement. The offset indicates the difference between the local time and a universal time (e.g., the time at the international date line). For example, a data sample collected in a time zone that is six hours behind universal time can include a local timestamp (e.g., Timestamp=2016-03-18T14: 10: 02) and an offset indicating that the local timestamp is six hours behind universal time (e.g., Offset=-6:00). The offset can be adjusted (e.g., +1:00 or -1:00) depending on whether the time zone is in daylight savings time when the data sample is measured or collected.

The combination of the local timestamp and the offset provides a unique timestamp across daylight saving time boundaries. This allows an application using the timeseries data to display the timeseries data in local time without first converting from universal time. The combination of the local timestamp and the offset also provides enough information to convert the local timestamp to universal time without needing to look up a schedule of when daylight savings time occurs. For example, the offset can be subtracted from the local timestamp to generate a universal time value that corresponds to the local timestamp without referencing an external database and without requiring any other information.

In some embodiments, data collector 612 organizes the raw timeseries data. Data collector 612 can identify a system or device associated with each of the data points. For example, data collector 612 can associate a data point with a temperature sensor, an air handler, a chiller, or any other type of system or device. In some embodiments, a data entity may be created for the data point, in which case, the data collector 612 (e.g., via entity service) can associate the data point with the data entity. In various embodiments, data collector uses the name of the data point, a range of values of the data point, statistical characteristics of the data point, or other attributes of the data point to identify a particular system or device associated with the data point. Data collector 612 can then determine how that system or device relates to the other systems or devices in the building site from entity data. For example, data collector 612 can determine that the identified system or device is part of a larger system (e.g., a HVAC system) or serves a particular space (e.g., a particular building, a room or zone of the building, etc.) from the entity data. In some embodiments, data collector 512 uses or retrieves an entity graph (e.g., via entity service 626) when organizing the timeseries data.

Data collector 612 can provide the raw timeseries data to the services of Cloud building management platform 620 and/or store the raw timeseries data in storage 614. Storage 614 may be internal storage or external storage. For example, storage 614 can be internal storage with relation to Cloud building management platform 620 and/or BMS 600, and/or may include a remote database, cloud-based data hosting, or other remote data storage. Storage 614 can be configured to store the raw timeseries data obtained by data collector 612, the derived timeseries data generated by Cloud building management platform 620, and/or directed acyclic graphs (DAGs) used by Cloud building management platform 620 to process the timeseries data.

Still referring to FIG. 5, Cloud building management platform 620 can receive the raw timeseries data from data collector 612 and/or retrieve the raw timeseries data from storage 614. Cloud building management platform 620 can include a variety of services configured to analyze, process, and transform the raw timeseries data. For example, Cloud building management platform 620 is shown to include a security service 622, an analytics service 624, an entity service 626, and a timeseries service 628. Security service 622 can assign security attributes to the raw timeseries data to ensure that the timeseries data are only accessible to authorized individuals, systems, or applications. Security service 622 may include a messaging layer to exchange secure messages with the entity service 626. In some embodiment, security service 622 may provide permission data to entity service 626 so that entity service 626 can determine the types of entity data that can be accessed by a particular entity or device. Entity service 624 can assign entity information (or entity data) to the timeseries data to associate data points with a particular system, device, or space. Timeseries service 628 and analytics service 624 can apply various transformations, operations, or other functions to the raw timeseries data to generate derived timeseries data.

In some embodiments, timeseries service 628 aggregates predefined intervals of the raw timeseries data (e.g., quarter-hourly intervals, hourly intervals, daily intervals, monthly intervals, etc.) to generate new derived timeseries of the aggregated values. These derived timeseries can be referred to as "data rollups" since they are condensed versions of the raw timeseries data. The data rollups generated by timeseries service 628 provide an efficient mechanism for applications 630 to query the timeseries data. For example, applications 630 can construct visualizations of the timeseries data (e.g., charts, graphs, etc.) using the pre-aggregated data rollups instead of the raw timeseries data. This allows applications 630 to simply retrieve and present the pre-aggregated data rollups without requiring applications 630 to perform an aggregation in response to the query. Since the data rollups are pre-aggregated, applications 630 can present the data rollups quickly and efficiently without requiring additional processing at query time to generate aggregated timeseries values.

In some embodiments, timeseries service 628 calculates virtual points based on the raw timeseries data and/or the derived timeseries data. Virtual points can be calculated by applying any of a variety of mathematical operations (e.g., addition, subtraction, multiplication, division, etc.) or functions (e.g., average value, maximum value, minimum value, thermodynamic functions, linear functions, nonlinear functions, etc.) to the actual data points represented by the timeseries data. For example, timeseries service 628 can calculate a virtual data point (pointID$_3$) by adding two or more actual data points (pointID$_1$ and pointID$_2$) (e.g., pointID$_3$=pointID$_1$+pointID$_2$). As another example, timeseries service 628 can calculate an enthalpy data point (pointID$_4$) based on a measured temperature data point (pointID$_5$) and a measured pressure data point (pointID$_6$) (e.g., pointID$_4$=enthalpy(pointID$_5$, pointID$_6$)). The virtual data points can be stored as derived timeseries data.

Applications 630 can access and use the virtual data points in the same manner as the actual data points. Applications 630 may not need to know whether a data point is an actual data point or a virtual data point since both types of data points can be stored as derived timeseries data and can be handled in the same manner by applications 630. In some embodiments, the derived timeseries are stored with attributes designating each data point as either a virtual data point or an actual data point. Such attributes allow applications 630 to identify whether a given timeseries represents a virtual data point or an actual data point, even though both types of data points can be handled in the same manner by applications 630. These and other features of timeseries service 628 are described in greater detail with reference to FIG. 9.

In some embodiments, analytics service 624 analyzes the raw timeseries data and/or the derived timeseries data to detect faults. Analytics service 624 can apply a set of fault detection rules to the timeseries data to determine whether a fault is detected at each interval of the timeseries. Fault detections can be stored as derived timeseries data. For example, analytics service 624 can generate a new fault detection timeseries with data values that indicate whether a fault was detected at each interval of the timeseries. The fault detection timeseries can be stored as derived timeseries data along with the raw timeseries data in storage 614.

Still referring to FIG. 6, BMS 600 is shown to include several applications 630 including an energy management application 632, monitoring and reporting applications 634, and enterprise control applications 636. Although only a few applications 630 are shown, it is contemplated that applications 630 can include any of a variety of suitable applications configured to use the raw or derived timeseries generated by Cloud building management platform 620. In some embodiments, applications 630 exist as a separate layer of BMS 600 (e.g., a part of Cloud building management platform 620 and/or data collector 612). In other embodiments, applications 630 can exist as remote applications that run on remote systems or devices (e.g., remote systems and applications 544, client devices 548, and/or the like).

Applications 630 can use the derived timeseries data to perform a variety data visualization, monitoring, and/or control activities. For example, energy management application 632 and monitoring and reporting application 634 can use the derived timeseries data to generate user interfaces (e.g., charts, graphs, etc.) that present the derived timeseries data to a user. In some embodiments, the user interfaces present the raw timeseries data and the derived data rollups in a single chart or graph. For example, a dropdown selector can be provided to allow a user to select the raw timeseries data or any of the data rollups for a given data point.

Enterprise control application 636 can use the derived timeseries data to perform various control activities. For example, enterprise control application 636 can use the derived timeseries data as input to a control algorithm (e.g., a state-based algorithm, an extremum seeking control (ESC) algorithm, a proportional-integral (PI) control algorithm, a proportional-integral-derivative (PID) control algorithm, a model predictive control (MPC) algorithm, a feedback control algorithm, etc.) to generate control signals for building subsystems 528. In some embodiments, building subsystems 528 use the control signals to operate building equipment. Operating the building equipment can affect the measured or calculated values of the data samples provided to BMS 600 and/or Cloud building management platform 620. Accordingly, enterprise control application 636 can use the derived timeseries data as feedback to control the systems and devices of building subsystems 528.

Cloud Building Management Platform Entity Service

Figure 7:
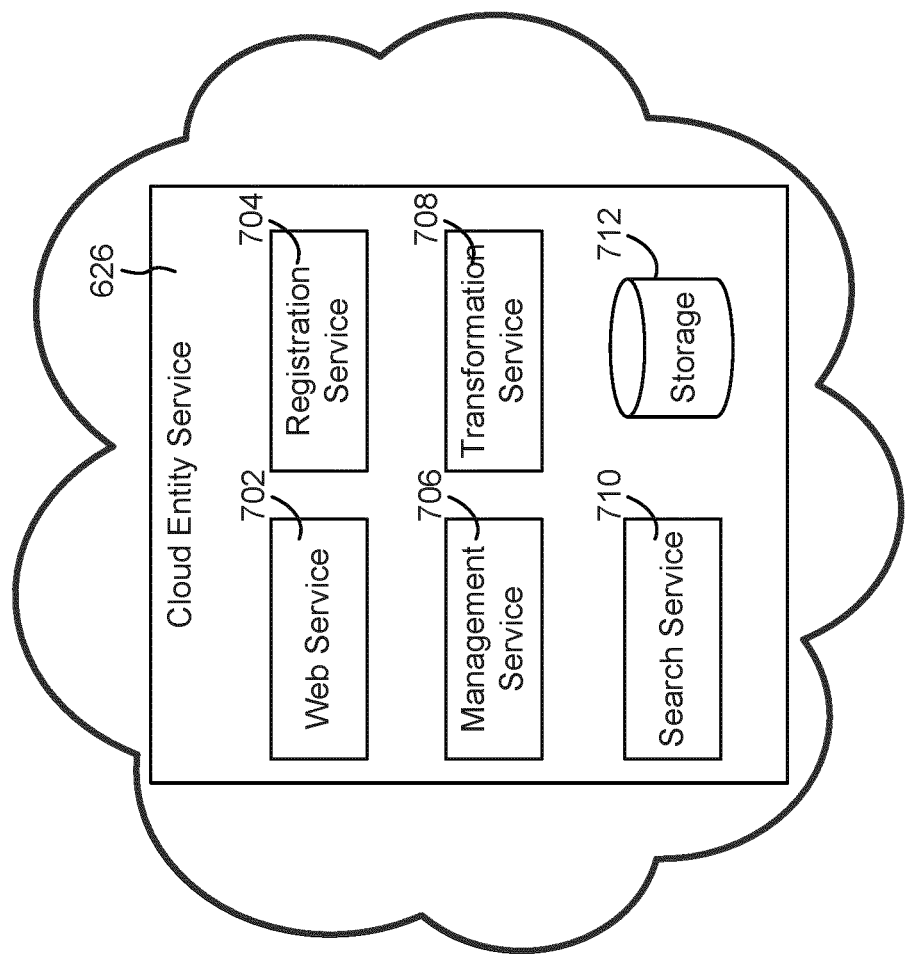
FIG. 7 is a block diagram illustrating an entity service of FIG. 6 in greater detail, according to an exemplary embodiment.

Referring now to FIG. 7, a block diagram illustrating entity service 626 in greater detail is shown, according to some embodiments. Entity service 626 registers and manages various buildings (e.g., 110-140), spaces, persons, subsystems (e.g., 428), devices (e.g., 112-146), and other entities in the Cloud building management platform 620. According to various embodiments, an entity may be any person, place, or physical object, hereafter referred to as an object entity. Further, an entity may be any event, data point, or record structure, hereinafter referred to as data entity. In addition, relationships between entities may be defined by relational objects.

In some embodiments, an object entity may be defined as having at least three types of attributes. For example, an object entity may have a static attribute, a dynamic attribute, and a behavioral attribute. The static attribute may include any unique identifier of the object entity or characteristic of the object entity that either does not change over time or changes infrequently (e.g., a device ID, a person's name or social security number, a place's address or room number, and the like). The dynamic attribute may include a property of the object entity that changes over time (e.g., location, age, measurement, data point, and the like). In some embodiments, the dynamic attribute of an object entity may be linked to a data entity. In this case, the dynamic attribute of the object entity may simply refer to a location (e.g., data/network address) or static attribute (e.g., identifier) of the linked data entity, which may store the data (e.g., the value or information) of the dynamic attribute. Accordingly, in some such embodiments, when a new data point (e.g., timeseries data) is received for the object entity, only the linked data entity may be updated, while the object entity remains unchanged. Therefore, resources that would have been expended to update the object entity may be reduced.

However, the present disclosure is not limited thereto. For example, in some embodiments, there may also be some data that is updated (e.g., during predetermined intervals) in the dynamic attribute of the object entity itself. For example, the linked data entity may be configured to be updated each time a new data point is received, whereas the corresponding dynamic attribute of the object entity may be configured to be updated less often (e.g., at predetermined intervals less than the intervals during which the new data points are received). In some implementations, the dynamic attribute of the object entity may include both a link to the data entity and either a portion of the data from the data entity or data derived from the data of the data entity. For example, in an embodiment in which periodic temperature readings are received from a thermostat, an object entity corresponding to the thermostat could include the last temperature reading and a link to a data entity that stores a series of the last ten temperature readings received from the thermostat.

The behavioral attribute may define a function of the object entity, for example, based on inputs, capabilities, and/or permissions. For example, behavioral attributes may define the types of inputs that the object entity is configured to accept, how the object entity is expected to respond under certain conditions, the types of functions that the object entity is capable of performing, and the like. As a non-limiting example, if the object entity represents a person, the behavioral attribute of the person may be his/her job title or job duties, user permissions to access certain systems or locations, expected location or behavior given a time of day, tendencies or preferences based on connected activity data received by entity service 626 (e.g., social media activity), and the like. As another non-limiting example, if the object entity represents a device, the behavioral attributes may include the types of inputs that the device can receive, the types of outputs that the device can generate, the types of controls that the device is capable of, the types of software or versions that the device currently has, known responses of the device to certain types of input (e.g., behavior of the device defined by its programming), and the like.

In some embodiments, the data entity may be defined as having at least a static attribute and a dynamic attribute. The static attribute of the data entity may include a unique identifier or description of the data entity. For example, if the data entity is linked to a dynamic attribute of an object entity, the static attribute of the data entity may include an identifier that is used to link to the dynamic attribute of the object entity. In some embodiments, the dynamic attribute of the data entity represents the data for the dynamic attribute of the linked object entity. In some embodiments, the dynamic attribute of the data entity may represent some other data that is derived, analyzed, inferred, calculated, or determined based on data from data sources.

In some embodiments, the relational object may be defined as having at least a static attribute. The static attribute of the relational object may semantically define the type of relationship between two or more entities. For example, in a non-limiting embodiment, a relational object for a relationship that semantically defines that Entity A has a part of Entity B, or that Entity B is a part of Entity A may include:

hasPart{Entity A, Entity B} where the static attribute hasPart defines what the relationship is of the listed entities, and the order of the listed entities or data field of the relational object specifies which entity is the part of the other (e.g., Entity A→hasPart→Entity B).

In various embodiments, the relational object is an object-oriented construct with predefined fields that define the relationship between two or more entities, regardless of the type of entities. For example, Cloud building management platform 620 can provide a rich set of pre-built entity models with standardized relational objects that can be used to describe how any two or more entities are semantically related, as well as how data is exchanged and/or processed between the entities. Accordingly, a global change to a definition or relationship of a relational object at the system level can be effected at the object level, without having to manually change the entity relationships for each object or entity individually. Further, in some embodiments, a global change at the system level can be propagated through to third-party applications integrated with Cloud building management platform 620 such that the global change can be implemented across all of the third-party applications without requiring manual implementation of the change in each disparate application.

Figure 8:
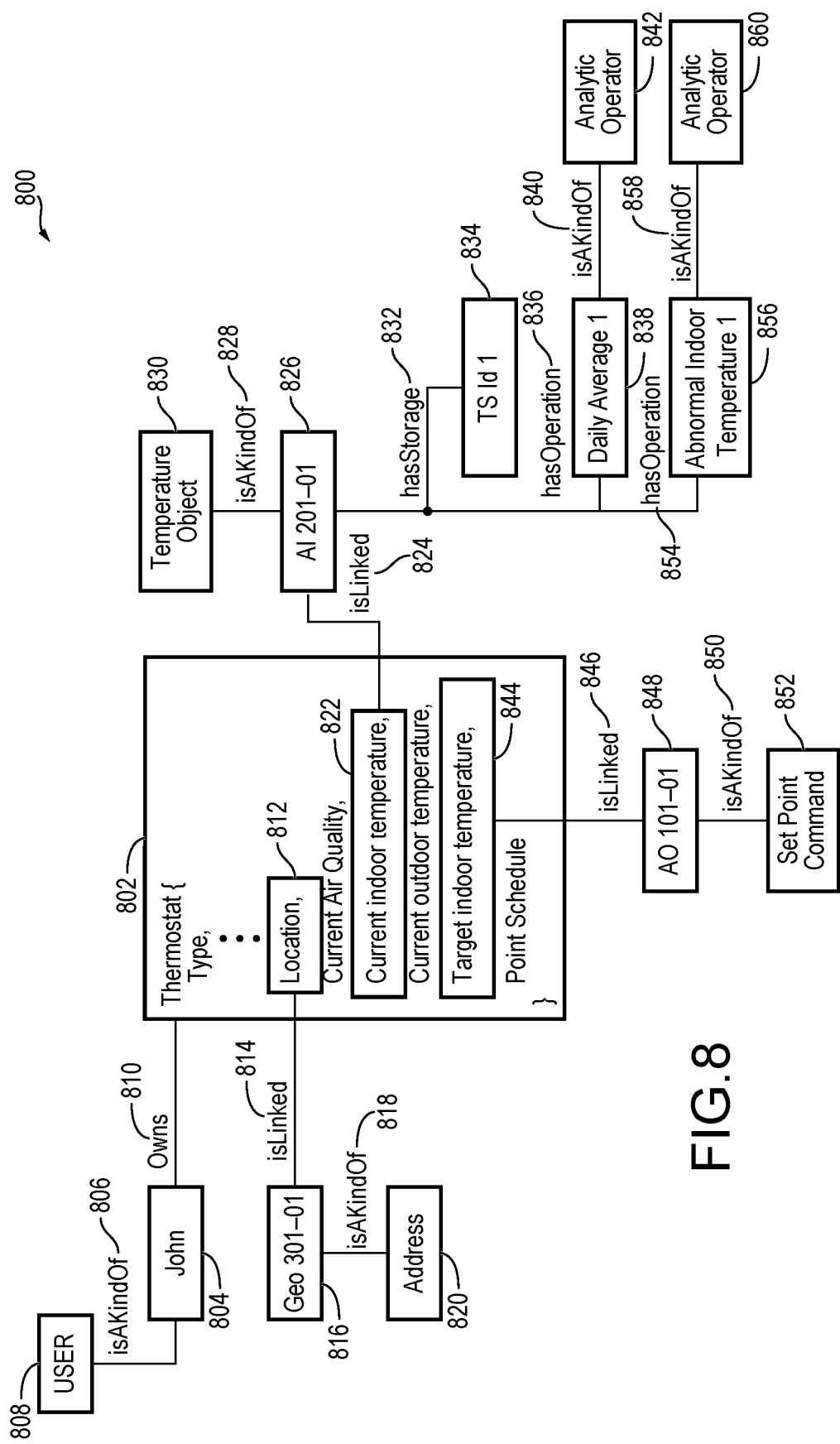
FIG. 8 in an example entity graph of entity data, according to an exemplary embodiment.

For example, referring to FIG. 8, an example entity graph of entity data is shown, according to some embodiments. The term "entity data" is used to describe the attributes of various entities and the relationships between the entities. For example, entity data may be represented in the form of an entity graph. In some embodiments, entity data includes any suitable predefined data models (e.g., as a table, JSON data, and/or the like), such as entity type or object, and further includes one or more relational objects that semantically define the relationships between the entities. The relational objects may help to semantically define, for example, hierarchical or directed relationships between the entities (e.g., entity X controls entity Y, entity A feeds entity B, entity 1 is located in entity 2, and the like). For example, an object entity (e.g., IoT device) may be represented by entity type or object, which generally describes how data corresponding to the entity will be structured and stored.

For example, an entity type (or object) "Thermostat" may be represented via the below schema:

```
Thermostat{
    Type,
    Model No,
    Device Name,
    Manufactured date,
    Serial number,
    MAC address,
    Location,
    Current air quality,
    Current indoor temperature,
    Current outdoor temperature,
    Target indoor temperature,
    Point schedule (e.g., BACnet schedule object)
}
``` where various attributes are static attributes (e.g., "Type," "Model Number," "Device Name," etc.,), dynamic attributes (e.g., "Current air quality," "Current outdoor temperature," etc.), or behavioral attributes (e.g., "Target indoor temperature," etc.) for the object entity "thermostat." In a relational database, the object "Thermostat" is a table name, and the attributes represents column names.

An example of an object entity data model for a person named John Smith in a relational database may be represented by the below table:

| First Name | Last Name | Tel. No. | Age | Location | Job Title |
|---|---|---|---|---|---|
| John | Smith | (213)220-XXXX | 36 | Home | Engineer | where various attributes are static attributes (e.g., "First Name," "Last Name," etc.,), dynamic attributes (e.g., "Age," "Location," etc.), or behavioral attributes (e.g., "Engineer") for the object entity "John Smith."

An example data entity for the data point "Current indoor temperature" for the "Thermostat" owned by John Smith in a relational database may be represented by the below table:

| Present-Value | Description | Device_Type | Unit of measure |
|---|---|---|---|
| 68 | "Current indoor temperature of John's house" | Thermostat | Degrees-F. | where various attributes are static attributes (e.g., "Description" and "Device_Type") and dynamic attributes (e.g., "Present-Value").

While structuring the entities via entity type or object may help to define the data representation of the entities, these data models do not provide information on how the entities relate to each other. For example, a BMS, building subsystem, or device may need data from sources as well as information on how the sources relate to each other in order to provide a proper decision, action, or recommendation. Accordingly, in various embodiments, the entity data further includes the relational objects to semantically define the relationships between the entities, which may help to increase speeds in analyzing data, as well as provide ease of navigation and browsing.

For example, still referring to FIG. 8, an entity graph 800 for the Thermostat object entity 802 includes various class entities (e.g., User, Address, SetPoint Command, and Temperature Object), object entities (e.g., John and Thermostat), relational objects (e.g., isAKindOf, Owns, isLinked, hasStorage, and hasOperation), and data entities (AI 201-01, TS ID 1, Daily Average 1, Abnormal indoor temp 1, AO 101-1, and Geo 301-01). The relational objects describe the relationships between the various class, object, and data entities in a semantic and syntactic manner, so that an application or user viewing the entity graph 800 can quickly determine the relationships and data process flow of the Thermostat object entity 802, without having to resort to a data base analyst or engineer to create, index, and/or manage the entities (e.g., using SQL or NoSQL). In some embodiments, each of the entities (e.g., class entity, object entity, and data entity) represents a node on the entity graph 800, and the relational objects define the relationships or connections between the entities (or nodes).

For example, the entity graph 800 shows that a person named John (object entity) 804 isAKindOf (relational object) 806 User (class entity) 808. John 804 Owns (relational object) 810 the Thermostat (object entity) 802. The Thermostat 802 has a location attribute (dynamic attribute) 812 that isLinked (relational object) 814 to Geo 301-01 (data entity) 816, which isAKindOf (relational object) 818 an Address (class entity) 820. Accordingly, Geo 301-01 316 should have a data point corresponding to an address.

The Thermostat 802 further includes a "Current indoor temperature" attribute (dynamic attribute) 822 that isLinked (relational object) 824 to AI 201-01 (data entity) 826. AI 201-01 826 isAKindOf (relational object) 828 Temperature Object (class entity) 830. Thus, AI 201-01 826 should contain some sort of temperature related data. AI 201-01 826 hasStorage (relational object) 832 at TS ID 1 (data entity) 834, which may be raw or derived timeseries data for the temperature readings. AI 201-01 826 hasOperation (relational object) 836 of Daily Average 1 (data entity) 838, which isAKindOf (relational object) 840 Analytic Operator (class entity) 842. Thus, Daily Average 1 results from an analytic operation that calculates the daily average of the indoor temperature. AI 201-01 826 further hasOperation (relational object) 854 of Abnormal Indoor Temperature (data entity) 856, which isAKindOf (relational object) 858 Analytic Operator (class entity) 860. Accordingly, Abnormal Indoor Temperature results from an analytic operation to determine an abnormal temperature (e.g., exceeds or falls below a threshold value).

In this example, the data entity AI 201-01 526 may be represented by the following data model:

```
point {
    name: "AI 201-01";
    type: "analog input";
    value: 72;
    unit: "Degree-F";
    source: "Temperature Sensor 1"
}
``` where "point" is an example of a data entity that may be created by Cloud building management platform 620 to hold the value for the linked "Current indoor temperature" 822 dynamic attribute of the Thermostat entity 802, and source is the sensor or device in the Thermostat device that provides the data to the linked "Current indoor temperature" 822 dynamic attribute.

The data entity TS Id 1 534 may be represented, for example, by the following data model:

```
timeseries {
    name: "TS Id 1";
    type: "Daily Average";
    values: "[68, 20666, 70, 69, 71]";
    unit: "Degree-F";
    point: "AI 201-0";
    source: "Daily Average 1"
}
``` where the data entity Daily Average 1 838 represents a specific analytic operator used to create the data entity for the average daily timeseries TS Id 1 834 based on the values of the corresponding data entity for point AI 201-01 826. The relational object hasOperation shows that the AI 201-01 data entity 826 is used as an input to the specific logic/math operation represented by Daily Average 1 838. TS Id 1 834 might also include an attribute that identifies the analytic operator Daily Average 1 838 as the source of the data samples in the timeseries.

Still referring to FIG. 8, the entity graph 800 for Thermostat 802 shows that the "Target indoor temperature" attribute (dynamic attribute) 844 isLinked (relational attribute) 846 to the data entity AO 101-01 (data entity) 848. AO 101-01 data entity 848 isAKindOf (relational attribute) 850 SetPoint Command (class entity) 852. Thus, the data in data entity AO 101-01 848 may be set via a command by the user or other entity, and may be used to control the Thermostat object entity 802. Accordingly, in various embodiments, entity graph 800 provides a user friendly view of the various relationships between the entities and data processing flow, which provides for ease of navigation, browsing, and analysis of data.

In some embodiments, any two entities (or nodes) can be connected to each other via one or more relational objects that define different relationships between the two entities (or nodes). For example, still referring to FIG. 8, the object entity John 804 is shown to be connected to the object entity Thermostat 802 via one relational object Owns 810. However, in another embodiment, the object entity John 804 can be connected to the object entity Thermostat 802 via more than one relational object, such that, in addition to the relational object Owns 810, another relational object can define another relationship between the object entity John 804 and the object entity Activity Tracker 802. For example, another relational object such as isInZone or isNotInZone can define whether or not John (or the entity object for John 804) is currently within the zone serviced by Thermostat 802 (e.g., via the relational object isInZone) or currently not within the zone serviced by Thermostat 802 (e.g., via the relational object isNotInZone).

In this case, when the data entities associated with the thermostat object entity 802 indicates that John is within the zone serviced by thermostat (e.g., which may be determined from the location attribute 812 and location data for John 810), the relational object isInZone may be created between the object entity for John 610 and the object entity for thermostat 802. On the other hand, when the data entities associated with the thermostat object entity 802 indicates that John is not within the zone serviced by the thermostat (e.g., which may be determined when the location attribute 812 shows a different location from a known location of John), the relational object isNotInZone can be created between the object entity for John 810 and the object entity for thermostat 802. For example, the relational object isNotInZone can be created by modifying the relational object isInZone or deleting the relational object isInZone and creating the relational object isNotInZone. Thus, in some embodiments, the relational objects can be dynamically created, modified, or deleted as needed or desired.

Referring again to FIG. 7, entity service 626 may transforms raw data samples and/or raw timeseries data into data corresponding to entity data. For example, as discussed above with reference to FIG. 8, entity service 626 can create data entities that use and/or represent data points in the timeseries data. Entity service 626 includes a web service 702, a registration service 704, a management service 706, a transformation service 708, a search service 710, and storage 712. In some embodiments, storage 712 may be internal storage or external storage. For example, storage 712 may be storage 614 (see FIG. 6), internal storage with relation to entity service 626, and/or may include a remote database, cloud-based data hosting, or other remote data storage.

Web service 702 can be configured to interact with web-based applications to send entity data and/or receive raw data (e.g., data samples, timeseries data, and the like). For example, web service 702 can provide an interface (e.g., API, UI/UX, and the like) to manage (e.g., register, create, edit, delete, and/or update) an entity (e.g., class entity, object entity, data entity, and/or the like) and the relational objects that define the relationships between the entities. In some embodiments, web service 702 provides entity data to web-based applications. For example, if one or more of applications 630 are web-based applications, web service 702 can provide entity data to the web-based applications. In some embodiments, web service 702 receives raw data samples and/or raw timeseries data including device information from a web-based data collector, or a web-based security service to identify authorized entities and to exchange secured messages. For example, if data collector 612 is a web-based application, web service 702 can receive the raw data samples and/or timeseries data including a device attribute indicating a type of device (e.g., IoT device) from which the data samples and/or timeseries data are received from data collector 612. In some embodiments, web service 702 may message security service 622 to request authorization information and/or permission information of a particular user, building, BMS, building subsystem, device, application, or other entity. In some embodiments, web service 702 receives derived timeseries data from timeseries service 628, and/or may provide entity data to timeseries service 628. In some embodiments, the entity service 626 processes and transforms the collected data to generate the entity data.

The registration service 704 can perform registration of devices and entities. For example, registration service 704 can communicate with building subsystems 528 and client devices 548 (e.g., via web service 702) to register each entity (e.g., building, BMS, building subsystems, devices, and the like) with Cloud building management platform 620. In some embodiments, registration service 704 registers a particular building subsystem 528 (or the devices therein) with a specific user and/or a specific set of permissions and/or entitlements. For example, a user may register a device key and/or a device ID associated with the device via a web portal (e.g., web service 702). In some embodiments, the device ID and the device key may be unique to the device. The device ID may be a unique number associated with the device such as a unique alphanumeric string, a serial number of the device, and/or any other static identifier. In various embodiments, the device is provisioned by a manufacturer and/or any other entity. In various embodiments, the device key and/or device ID are saved to the device or building subsystem 528 based on whether the device includes a trusted platform module (TPM). If the device includes a TPM, the device or building subsystem 528 may store the device key and/or device ID according to the protocols of the TPM. If the device does not include a TPM, the device or building subsystem 528 may store the device key and/or device ID in a file and/or file field which may be stored in a secure storage location. Further, in some embodiments, the device ID may be stored with BIOS software of the device. For example, a serial number of BIOS software may become and/or may be updated with the device ID.

In various embodiments, the device key and/or the device ID are uploaded to registration service 704 (e.g., an IoT hub such as AZURE® IoT Hub). In some embodiments, registration service 704 is configured to store the device key and the device ID in secure permanent storage and/or may be stored by security service 622 (e.g., by a security API). In some embodiments, a manufacturer and/or any other individual may register the device key and the device ID with registration service 704 (e.g., via web service 702). In various embodiments, the device key and the device ID are linked to a particular profile associated with the building subsystem 528 or device and/or a particular user profile (e.g., a particular user). In this regard, a device (or building subsystem 528) can be associated with a particular user. In various embodiments, the device key and the device ID make up the profile for device. The profile may be registered as a device that has been manufactured and/or provisioned but has not yet been purchased by an end user.

In various embodiments, registration service 704 adds and/or updates a device in an building hub device registry. In various embodiments, registration service 704 may determine if the device is already registered, can set various authentication values (e.g., device ID, device key), and can update the building hub device registry. In a similar manner, registration service 704 can update a document database with the various device registration information.

In some embodiments, registration service 704 can be configured to create a virtual representation (e.g., "digital twins" or "shadow records") of each object entity (e.g., person, room, building subsystem, device, and the like) in the building within Cloud building management platform 620. In some embodiments, the virtual representations are smart entities that include attributes defining or characterizing the corresponding object and are associated to the corresponding object entity via relational objects defining the relationship of the object and the smart entity representation thereof. In some embodiments, the virtual representations maintain shadow copies of the object entities with versioning information so that entity service 626 can store not only the most recent update of an attribute (e.g., a dynamic attribute) associated with the object, but records of previous states of the attributes (e.g., dynamic attributes) and/or entities. For example, the shadow record may be created as a type of data entity that is related to a linked data entity corresponding to the dynamic attribute of the object entity (e.g., the person, room, building subsystem, device, and the like). For example, the shadow entity may be associated with the linked data entity via a relational object (e.g., isLinked, hasStorage, hasOperation, and the like). In this case, the shadow entity may be used to determine additional analytics for the data point of the dynamic attribute. For example, the shadow entity may be used to determine an average value, an expected value, or an abnormal value of the data point from the dynamic attribute.

Management service 706 may create, modify, or update various attributes, data entities, and/or relational objects of the objects managed by entity service 626 for each entity rather than per class or type of entity. This allows for separate processing/analytics for each individual entity rather than only to a class or type of entity. Some attributes (or data entities) may correspond to, for example, the most recent value of a data point provided to BMS 600 or Cloud building management platform 620 via the raw data samples and/or timeseries data. For example, the "Current indoor temperature" dynamic attribute of the "Thermostat" object entity 802 in the example discussed above may be the most recent value of indoor temperature provided by the Thermostat device. Management service 706 can use the relational objects of the entity data for Thermostat to determine where to update the data of the attribute.

For example, Management service 706 may determine that a data entity (e.g., AI 201-01) is linked to the "Current indoor temperature" dynamic attribute of Thermostat via an isLinked relational object. In this case, Management service 706 may automatically update the attribute data in the linked data entity. Further, if a linked data entity does not exist, Management service 706 can create a data entity (e.g., AI 201-01) and an instance of the isLinked relational object 824 to store and link the "Current indoor temperature" dynamic attribute of Thermostat therein. Accordingly, processing/analytics for Thermostat 802 may be automated. As another example, a "most recent view" attribute (or linked data entity) of a webpage object entity may indicate the most recent time at which the webpage was viewed. Management service 706 can use the entity data from a related click tracking system object entity or web server object entity to determine when the most recent view occurred and can automatically update the "most recent view" attribute (or linked data entity) of the webpage entity accordingly.

Other data entities and/or attributes may be created and/or updated as a result of an analytic, transformation, calculation, or other processing operation based on the raw data and/or entity data. For example, Management service 706 can use the relational objects in entity data to identify a related access control device (e.g., a card reader, a keypad, etc.) at the entrance/exit of a building object entity. Management service 706 can use raw data received from the identified access control device to track the number of occupants entering and exiting the building object entity (e.g., via related card entities used by the occupants to enter and exit the building). Management service 706 can update a "number of occupants" attribute (or corresponding data entity) of the building object entity each time a person enters or exits the building using a related card object entity, such that the "number of occupants" attribute (or data entity) reflects the current number of occupants within the building (or related building object entity). As another example, a "total revenue" attribute associated with a product line object entity may be the summation of all the revenue generated from related point of sales entities. Management service 706 can use the raw data received from the related point of sales entities to determine when a sale of the product occurs, and can identify the amount of revenue generated by the sales. Management service 706 can then update the "total revenue" attribute (or related data entity) of the product line object entity by adding the most recent sales revenue from each of the related point of sales entities to the previous value of the attribute.

In some embodiments, management service 706 may use derived timeseries data generated from timeseries service 628 to update or create a data entity (e.g., Daily Average 1) that uses or stores the data points in the derived timeseries data. For example, the derived timeseries data may include a virtual data point corresponding to the daily average steps calculated by timeseries service 628, and management service 706 may update the data entity or entities that store or use the data corresponding to the virtual data point as determined via the relational objects. In some embodiments, if a data entity corresponding to the virtual data point does not exist, management service 706 may automatically create a corresponding data entity and one or more relational objects that describe the relationship between the corresponding data entity and other entities.

In some embodiments, management service 706 uses entity data and/or raw data from multiple different data sources to update the attributes (or corresponding data entities) of various object entities. For example, an object entity representing a person (e.g., a person's cellular device or other related object entity) may include a "risk" attribute that quantifies the person's level of risk attributable to various physical, environmental, or other conditions. Management service 706 can use relational objects of the person object entity to identify a related card device and/or a related card reader from a related building object entity (e.g., the building in which the person works) to determine the physical location of the person at any given time. Management service 706 can determine from raw data (e.g., time that the card device was scanned by the card reader) or derived timeseries data (e.g., average time of arrival) whether the person object is located in the building or may be in transit to the building. Management service 706 can use weather data from a weather service in the region in which the building object entity is located to determine whether any severe weather is approaching the person's location. Similarly, management service 706 can use building data from related building entities of the building object entity to determine whether the building in which the person is located is experiencing any emergency conditions (e.g., fire, building lockdown, etc.) or environmental hazards (e.g., detected air contaminants, pollutants, extreme temperatures, etc.) that could increase the person's level of risk. Management service 706 can use these and other types of data as inputs to a risk function that calculates the value of the person object's "risk" attribute and can update the person object (or related device entity of the person object) accordingly.

In some embodiments, management service 706 can be configured to synchronize configuration settings, parameters, and other device-specific or object-specific information between the entities and Cloud building management platform 620. In some embodiments, the synchronization occurs asynchronously. Management service 706 can be configured to manage device properties dynamically. The device properties, configuration settings, parameters, and other device-specific information can be synchronized between the smart entities created by and stored within Cloud building management platform 620.

In some embodiments, management service 706 is configured to manage a manifest for each of the building subsystems 528 (or devices therein). The manifest may include a set of relationships between the building subsystems 528 and various entities. Further, the manifest may indicate a set of entitlements for the building subsystems 528 and/or entitlements of the various entities and/or other entities. The set of entitlements may allow a BMS 600, building subsystem 528 and/or a user to perform certain actions within the building or (e.g., control, configure, monitor, and/or the like).

Still referring to FIG. 7, transformation service 708 can provide data virtualization, and can transform various predefined standard data models for entities in a same class or type to have the same entity data structure, regardless of the object, device, or Thing that the entity represents. For example, each object entity under an object class may include a location attribute, regardless of whether or not the location attribute is used or even generated. Thus, if an application is later developed requiring that each object entity includes a location attribute, manual mapping of heterogenous data of different entities in the same class may be avoided. Accordingly, interoperability and scalability of applications may be improved.

In some embodiments, transformation service 708 can provide entity matching, cleansing, and correlation so that a unified cleansed view of the entity data including the entity related information (e.g., relational objects) can be provided. Transformation service 708 can support semantic and syntactic relationship description in the form of standardized relational objects between the various entities. This may simplify machine learning because the relational objects themselves provide all the relationship description between the entities. Accordingly, the rich set of pre-built entity models and standardized relational objects may provide for rapid application development and data analytics.

Still referring to FIG. 7, the search service 710 provides a unified view of product related information in the form of the entity graph, which correlates entity relationships (via relational objects) among multiple data sources (e.g., CRM, ERP, MRP and the like). In some embodiments, the search service 710 is based on a schema-less and graph based indexing architecture. For example, in some embodiments, the search service 710 provides the entity graph in which the entities are represented as nodes with relational objects defining the relationship between the entities (or nodes). The search service 710 facilitates simple queries without having to search multiple levels of the hierarchical tree of the entity graph. For example, search service 710 can return results based on searching of entity type, individual entities, attributes, or even relational objects without requiring other levels or entities of the hierarchy to be searched.

Timeseries Data Platform Service

Figure 9:
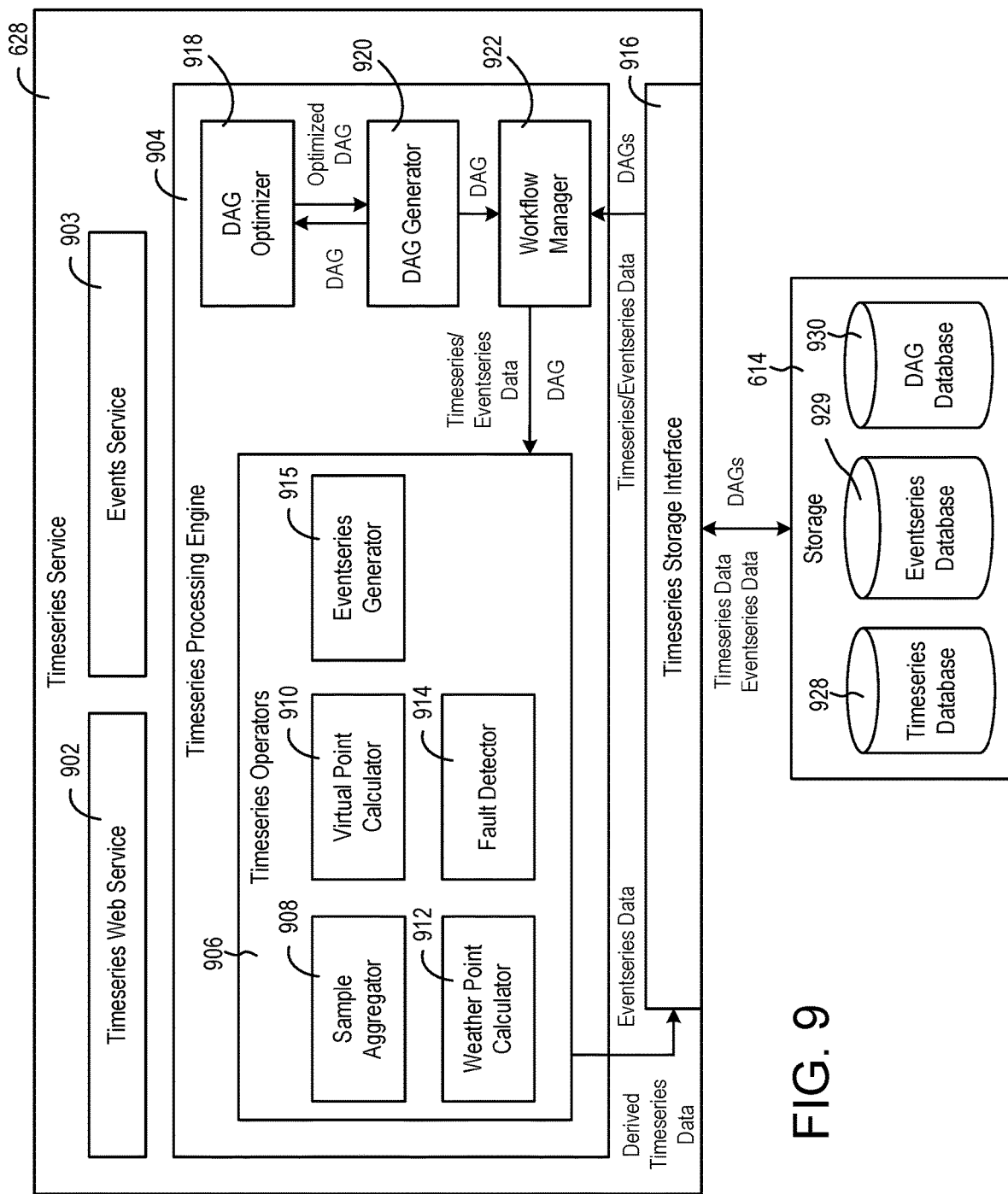
FIG. 9 is a block diagram illustrating timeseries service of FIG. 6 in greater detail, according to an exemplary embodiment.

Referring now to FIG. 9, a block diagram illustrating timeseries service 628 in greater detail is shown, according to some embodiments. Timeseries service 628 is shown to include a timeseries web service 902, an events service 903, a timeseries processing engine 904, and a timeseries storage interface 916. Timeseries web service 902 can be configured to interact with web-based applications to send and/or receive timeseries data. In some embodiments, timeseries web service 902 provides timeseries data to web-based applications. For example, if one or more of applications 630 are web-based applications, timeseries web service 902 can provide derived timeseries data and/or raw timeseries data to the web-based applications. In some embodiments, timeseries web service 902 receives raw timeseries data from a web-based data collector. For example, if data collector 612 is a web-based application, timeseries web service 902 can receive raw data samples or raw timeseries data from data collector 612. In some embodiments, timeseries web service 902 and entity service web service 702 may be integrated as parts of the same web service.

Timeseries storage interface 916 can be configured to store and read samples of various timeseries (e.g., raw timeseries data and derived timeseries data) and eventseries (described in greater detail below). Timeseries storage interface 916 can interact with storage 614. For example, timeseries storage interface 916 can retrieve timeseries data from a timeseries database 928 within storage 614. In some embodiments, timeseries storage interface 916 reads samples from a specified start time or start position in the timeseries to a specified stop time or a stop position in the timeseries. Similarly, timeseries storage interface 916 can retrieve eventseries data from an eventseries database 929 within storage 614. Timeseries storage interface 916 can also store timeseries data in timeseries database 928 and can store eventseries data in eventseries database 929. Advantageously, timeseries storage interface 916 provides a consistent interface which enables logical data independence.

In some embodiments, timeseries storage interface 916 stores timeseries as lists of data samples, organized by time. For example, timeseries storage interface 916 can store timeseries in the following format:

[<key, $timestamp_1$, $value_1$>, <key, $timestamp_2$, $value_2$>, <key, $timestamp_3$, $value_3$>]

where key is an identifier of the source of the data samples (e.g., timeseries ID, sensor ID, device ID, etc.), timestamp identifies a time associated with the ith sample, and $value_i$ indicates the value of the ith sample.

In some embodiments, timeseries storage interface 916 stores eventseries as lists of events having a start time, an end time, and a state. For example, timeseries storage interface 916 can store eventseries in the following format:

[<$eventID_1$, start_$timestamp_1$, end_$timestamp_1$, $state_1$>, . . . , <$eventID_N$, start_$timestamp_N$, end_$timestamp_N$, $state_N$>]

where $eventID_1$ is an identifier of the ith event, start_$timestamp_1$ is the time at which the ith event started, end_$timestamp_1$ is the time at which the ith event ended, state describes a state or condition associated with the ith event (e.g., cold, hot, warm, etc.), and N is the total number of events in the eventseries.

In some embodiments, timeseries storage interface 916 stores timeseries and eventseries in a tabular format. Timeseries storage interface 916 can store timeseries and eventseries in various tables having a column for each attribute of the timeseries/eventseries samples (e.g., key, timestamp, value). The timeseries tables can be stored in timeseries database 928, whereas the eventseries tables can be stored in eventseries database 929. In some embodiments, timeseries storage interface 916 caches older data to storage 614 but stores newer data in RAM. This may improve read performance when the newer data are requested for processing.

In some embodiments, timeseries storage interface 916 omits one or more of the attributes when storing the timeseries samples. For example, timeseries storage interface 916 may not need to repeatedly store the key or timeseries ID for each sample in the timeseries. In some embodiments, timeseries storage interface 916 omits timestamps from one or more of the samples. If samples of a particular timeseries have timestamps at regular intervals (e.g., one sample each minute), timeseries storage interface 916 can organize the samples by timestamps and store the values of the samples in a row. The timestamp of the first sample can be stored along with the interval between the timestamps. Timeseries storage interface 916 can determine the timestamp of any sample in the row based on the timestamp of the first sample and the position of the sample in the row.

In some embodiments, timeseries storage interface 916 stores one or more samples with an attribute indicating a change in value relative to the previous sample value. The change in value can replace the actual value of the sample when the sample is stored in timeseries database 928. This allows timeseries storage interface 916 to use fewer bits when storing samples and their corresponding values. Timeseries storage interface 916 can determine the value of any sample based on the value of the first sample and the change in value of each successive sample.

In some embodiments, timeseries storage interface 916 invokes entity service 626 to create data entities in which samples of timeseries data and/or eventseries data can be stored. The data entities can include JSON objects or other types of data objects to store one or more timeseries samples and/or eventseries samples. Timeseries storage interface 916 can be configured to add samples to the data entities and read samples from the data entities. For example, timeseries storage interface 916 can receive a set of samples from data collector 612, entity service 626, timeseries web service 902, events service 903, and/or timeseries processing engine 904. Timeseries storage interface 916 can add the set of samples to a data entity by sending the samples to entity service 626 to be stored in the data entity, for example, or may directly interface with the data entity to add/modify the sample to the data entity.

Timeseries storage interface 916 can use data entities when reading samples from storage 614. For example, timeseries storage interface 916 can retrieve a set of samples from storage 614 or from entity service 626, and add the samples to a data entity (e.g., directly or via entity service 626). In some embodiments, the set of samples include all samples within a specified time period (e.g., samples with timestamps in the specified time period) or eventseries samples having a specified state. Timeseries storage interface 916 can provide the samples in the data entity to timeseries web service 902, events service 903, timeseries processing engine 904, applications 630, and/or other components configured to use the timeseries/eventseries samples.

Still referring to FIG. 9, timeseries processing engine 904 is shown to include several timeseries operators 906. Timeseries operators 906 can be configured to apply various operations, transformations, or functions to one or more input timeseries to generate output timeseries and/or eventseries. The input timeseries can include raw timeseries data and/or derived timeseries data. Timeseries operators 906 can be configured to calculate aggregate values, averages, or apply other mathematical operations to the input timeseries. In some embodiments, timeseries operators 906 generate virtual point timeseries by combining two or more input timeseries (e.g., adding the timeseries together), creating multiple output timeseries from a single input timeseries, or applying mathematical operations to the input timeseries. In some embodiments, timeseries operators 906 perform data cleansing operations or deduplication operations on an input timeseries. In some embodiments, timeseries operators 906 use the input timeseries to generate eventseries based on the values of the timeseries samples. The output timeseries can be stored as derived timeseries data in storage 614 as one or more timeseries data entities. Similarly, the eventseries can be stored as eventseries data entities in storage 614.

In some embodiments, timeseries operators 906 do not change or replace the raw timeseries data, but rather generate various "views" of the raw timeseries data (e.g., as separate data entities) with corresponding relational objects defining the relationships between the raw timeseries data entity and the various views data entities. The views can be queried in the same manner as the raw timeseries data. For example, samples can be read from the raw timeseries data entity, transformed to create the view entity, and then provided as an output. Because the transformations used to create the views can be computationally expensive, the views can be stored as "materialized view" data entities in timeseries database 928. Instances of relational objects can be created to define the relationship between the raw timeseries data entity and the materialize view data entities. These materialized views are referred to as derived data timeseries throughout the present disclosure.

Timeseries operators 906 can be configured to run at query time (e.g., when a request for derived data timeseries is received) or prior to query time (e.g., when new raw data samples are received, in response to a defined event or trigger, etc.). This flexibility allows timeseries operators 906 to perform some or all of their operations ahead of time and/or in response to a request for specific derived data timeseries. For example, timeseries operators 906 can be configured to pre-process one or more timeseries that are read frequently to ensure that the timeseries are updated whenever new data samples are received, and the pre-processed timeseries may be stored in a corresponding data entity for retrieval. However, timeseries operators 906 can be configured to wait until query time to process one or more timeseries that are read infrequently to avoid performing unnecessary processing operations.

In some embodiments, timeseries operators 906 are triggered in a particular sequence defined by a directed acyclic graph (DAG). The DAG may define a workflow or sequence of operations or transformations to apply to one or more input timeseries. For example, the DAG for a raw data timeseries may include a data cleansing operation, an aggregation operation, and a summation operation (e.g., adding two raw data timeseries to create a virtual point timeseries). The DAGs can be stored in a DAG database 930 within storage 614, or internally within timeseries processing engine 904. DAGs can be retrieved by workflow manager 922 and used to determine how and when to process incoming data samples. Exemplary systems and methods for creating and using DAGs are described in greater detail below.

Timeseries operators 906 can perform aggregations for dashboards, cleansing operations, logical operations for rules and fault detection, machine learning predictions or classifications, call out to external services, or any of a variety of other operations which can be applied to timeseries data. The operations performed by timeseries operators 906 are not limited to timeseries data. Timeseries operators 906 can also operate on event data or function as a billing engine for a consumption or tariff-based billing system. Timeseries operators 906 are shown to include a sample aggregator 908, a virtual point calculator 910, a weather point calculator 912, a fault detector 914, and an eventseries generator 915.

Still referring to FIG. 9, timeseries processing engine 904 is shown to include a DAG optimizer 918. DAG optimizer 918 can be configured to combine multiple DAGs or multiple steps of a DAG to improve the efficiency of the operations performed by timeseries operators 906. For example, suppose that a DAG has one functional block which adds "Timeseries A" and "Timeseries B" to create "Timeseries C" (i.e., A+B=C) and another functional block which adds "Timeseries C" and "Timeseries D" to create "Timeseries E" (i.e., C+D=E). DAG optimizer 918 can combine these two functional blocks into a single functional block which computes "Timeseries E" directly from "Timeseries A," "Timeseries B," and "Timeseries D" (i.e., E=A+B+D). Alternatively, both "Timeseries C" and "Timeseries E" can be computed in the same functional block to reduce the number of independent operations required to process the DAG.

In some embodiments, DAG optimizer 918 combines DAGs or steps of a DAG in response to a determination that multiple DAGs or steps of a DAG will use similar or shared inputs (e.g., one or more of the same input timeseries). This allows the inputs to be retrieved and loaded once rather than performing two separate operations that both load the same inputs. In some embodiments, DAG optimizer 918 schedules timeseries operators 906 to nodes where data is resident in memory in order to further reduce the amount of data required to be loaded from the timeseries database 928.

Timeseries processing engine 904 is shown to include a directed acyclic graph (DAG) generator 920. DAG generator 920 can be configured to generate one or more DAGs for each raw data timeseries. Each DAG may define a workflow or sequence of operations which can be performed by timeseries operators 906 on the raw data timeseries. When new samples of the raw data timeseries are received, workflow manager 922 can retrieve the corresponding DAG and use the DAG to determine how the raw data timeseries should be processed. In some embodiments, the DAGs are declarative views which represent the sequence of operations applied to each raw data timeseries. The DAGs may be designed for timeseries rather than structured query language (SQL).

In some embodiments, DAGs apply over windows of time. For example, the timeseries processing operations defined by a DAG may include a data aggregation operation that aggregates raw data samples having timestamps within a given time window. The start time and end time of the time window may be defined by the DAG and the timeseries to which the DAG is applied. The DAG may define the duration of the time window over which the data aggregation operation will be performed. For example, the DAG may define the aggregation operation as an hourly aggregation (i.e., to produce an hourly data rollup timeseries), a daily aggregation (i.e., to produce a daily data rollup timeseries), a weekly aggregation (i.e., to produce a weekly data rollup timeseries), or any other aggregation duration. The position of the time window (e.g., a specific day, a specific week, etc.) over which the aggregation is performed may be defined by the timestamps of the data samples of timeseries provided as an input to the DAG.

In operation, sample aggregator 908 can use the DAG to identify the duration of the time window (e.g., an hour, a day, a week, etc.) over which the data aggregation operation will be performed. Sample aggregator 908 can use the timestamps of the data samples in the timeseries provided as an input to the DAG to identify the location of the time window (i.e., the start time and the end time). Sample aggregator 908 can set the start time and end time of the time window such that the time window has the identified duration and includes the timestamps of the data samples. In some embodiments, the time windows are fixed, having predefined start times and end times (e.g., the beginning and end of each hour, day, week, etc.). In other embodiments, the time windows may be sliding time windows, having start times and end times that depend on the timestamps of the data samples in the input timeseries.

Figure 10:
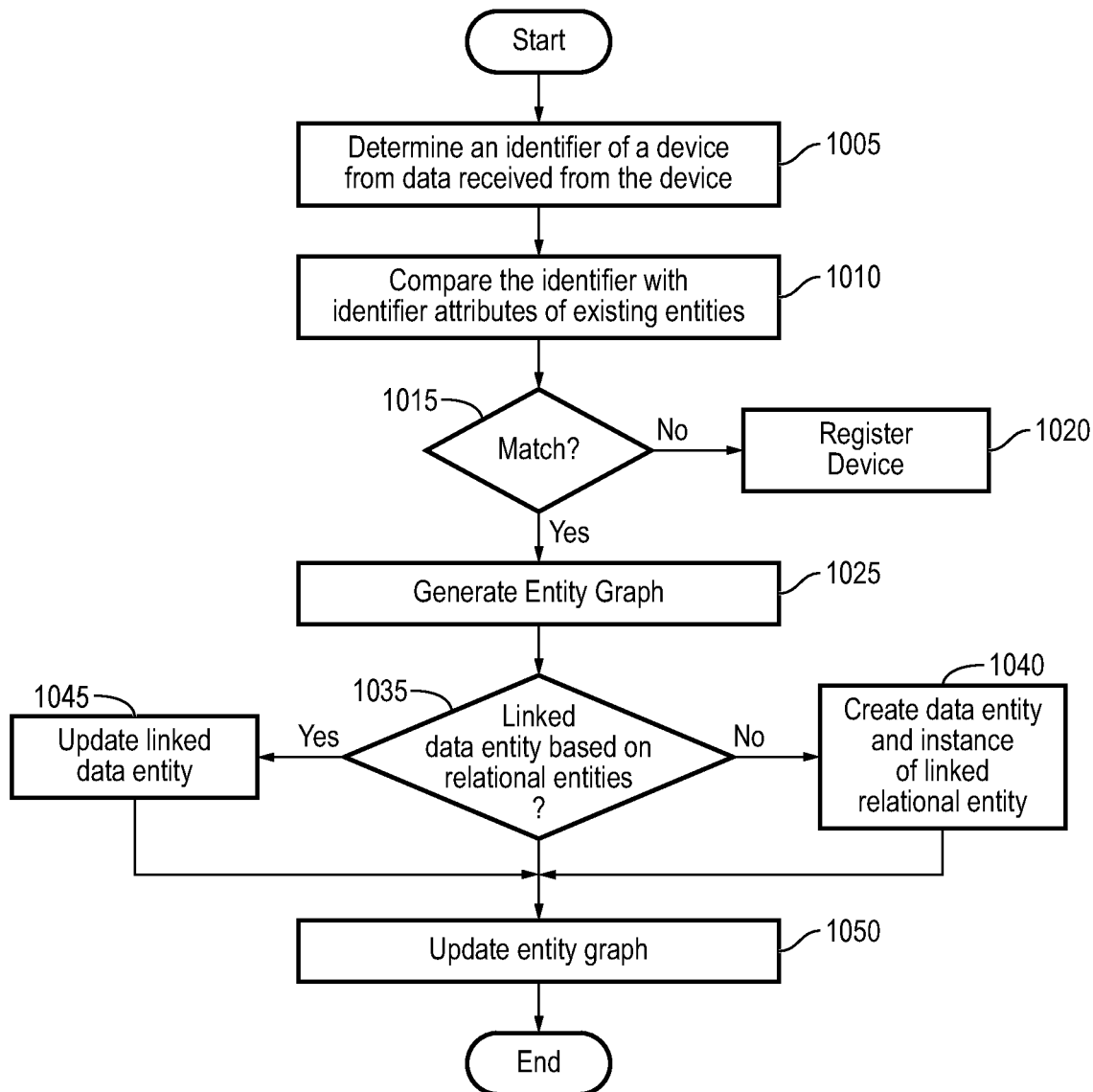
FIG. 10 is a flow diagram of a process or method for updating/creating an attribute of a related entity based on data received from a device of a building management subsystem, according to an exemplary embodiment.

FIG. 10 shows a flow diagram of a process or method for updating/creating a data entity based on data received from a device of a building subsystem, according to some embodiments. Referring to FIG. 10, the process starts, and when timeseries data (e.g., raw or input timeseries data) that has been generated for a device of a building subsystem (e.g., by the data collector) is received, the transformation service 708 may determine an identifier of the device from the received timeseries data at block 1005. At block 1010, the transformation service 708 may compare an identity static attribute from the data with identity static attributes of registered object entities to locate a data container for the device. If a match does not exist from the comparison at block 1015, the transformation service 708 may invoke the registration service to register the device at block 1020. If a match exists from the comparison at block 1015, the transformation service 708 may generate an entity graph or retrieve entity data for the device at block 1025. From the entity graph or entity data, transformation service 708 may determine if a corresponding data entity exists based on the relational objects (e.g., isLinked) for the device to update a dynamic attribute from the data at block 1025. If not, management service 706 may create a data entity for the dynamic attribute and an instance of a corresponding relational object (e.g., isLinked) to define the relationship between the dynamic attribute and created data entity at block 1040. If the corresponding data entity exists, management service 706 may update the data entity corresponding to the dynamic attribute from the data at block 1045. Then, transformation service 708 may update or regenerate the entity graph or entity data at block 1050, and the process may end.

Figure 11:
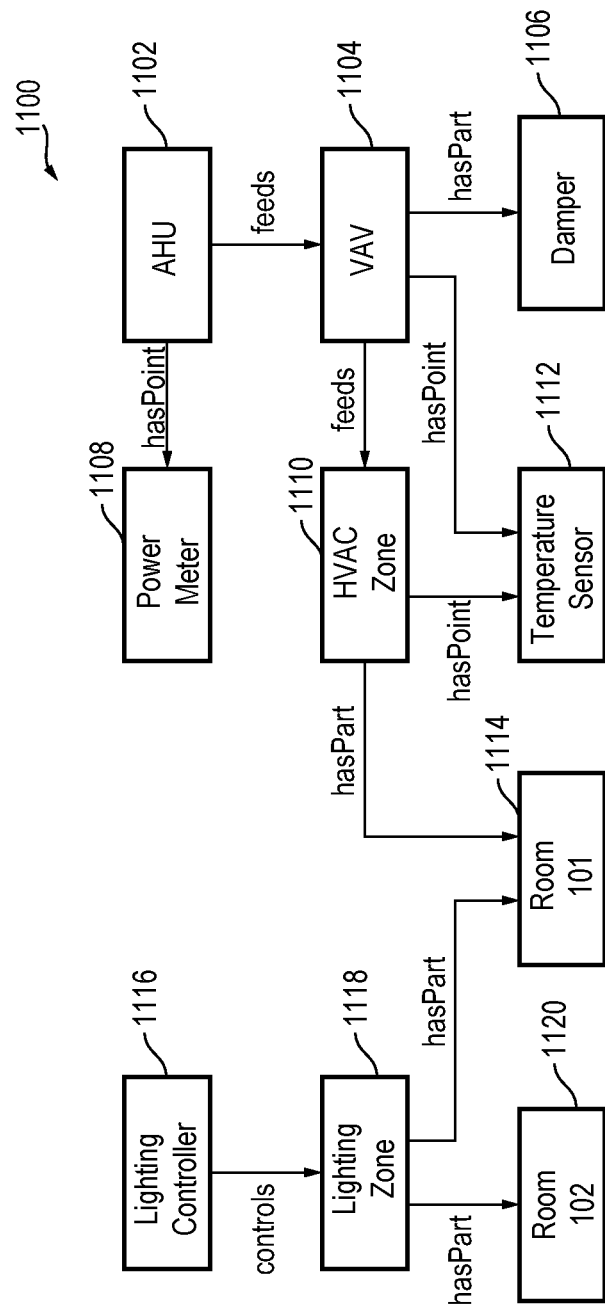
FIG. 11 is an example entity graph of entity data, according to an exemplary embodiment.

FIG. 11 is an example entity graph of entity data according to an embodiment of the present disclosure. The example of FIG. 11 assumes that an HVAC fault detection application has detected an abnormal temperature measurement with respect to Temperature Sensor 1112. However, Temperature Sensor 1112 itself may be operating properly, but may rely on various factors, conditions, and other systems and devices to measure the temperature properly. Accordingly, for example, the HVAC fault detection application may need to know the room 1114 in which the Temperature Sensor 1112 is located, the corresponding temperature setpoint, the status of the VAV 1104 that supplies conditioned air to the room 1114, the status of the AHU 1102 that feeds the VAV 1104, the status of the vents in the HVAC zone 1110, etc., in order to pin point the cause of the abnormal measurement. Thus, the HVAC fault detection application may require additional information from various related subsystems and devices (e.g., entity objects), as well as the zones and rooms (e.g., entity objects) that the subsystems and devices are configured to serve, to properly determine or infer the cause of the abnormal measurement.

Referring to FIG. 11, entity graph 1100 represents each of the entities (e.g., Temperature Sensor 1112 and related entities) as nodes on the entity graph 1100, and shows the relationship between the nodes (e.g., Temperature Sensor 1112 and related entities) via relational objects (e.g., feeds, hasPoint, hasPart, Controls, etc.). For example, entity graph 1100 shows that Temperature Sensor 1112 provides temperature readings (e.g., hasPoint) to the VAV 1104 and the HVAC Zone 1110. An AHU 1102 provides (e.g., feeds) the VAV 1104 with chilled and/or heated air. The AHU 1102 receives/provides power readings (e.g., hasPoint) from/to a Power Meter 1108. The VAV 1104 provides (e.g., feeds) air to HVAC Zone 1110 using (e.g., hasPart) a Damper 1106. The HVAC Zone 1110 provides the air to Room 1114. Further, Rooms 1114 and 1120 are located in (e.g., hasPart) Lighting Zone 1118, which is controlled (e.g., controls) by Lighting Controller 1116.

Accordingly, in the example of FIG. 11, in response to receiving the faulty measurement from Temperature Sensor 1112, the HVAC fault detection application and/or analytics service 624 can determine from the entity graph that the fault could be caused by some malfunction in one or more of the other related entities, and not necessarily a malfunction of the Temperature Sensor 1112. Thus, the HVAC fault detection application and/or the analytics service 624 can further investigate into the other related entities to determine or infer the most likely cause of the fault.

Agent-Entity System

Figure 12:
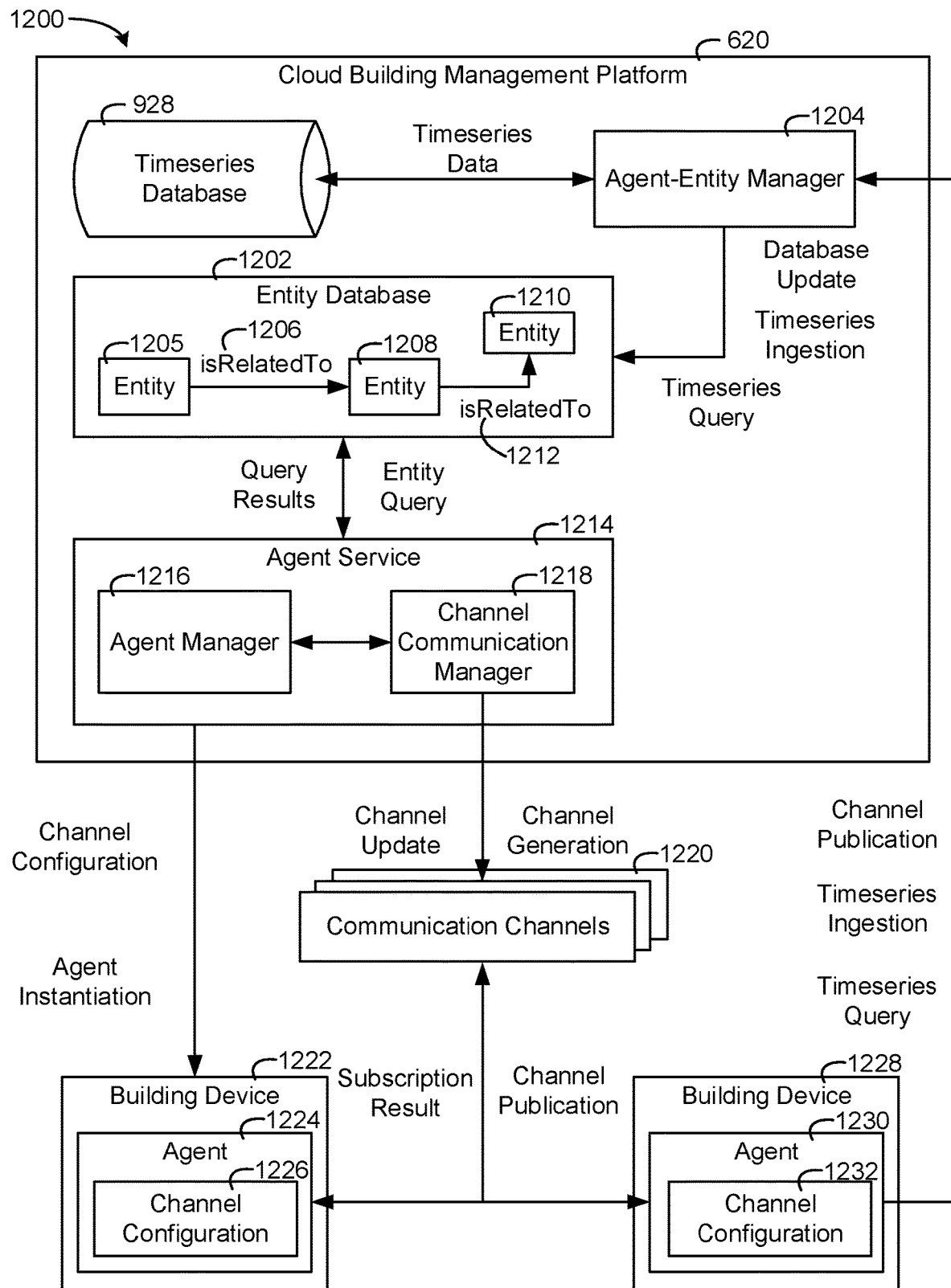
FIG. 12 is a block diagram of an agent-entity system including a cloud building management platform configured to manage an entity database and agents, according to an exemplary embodiment.

Referring now to FIG. 12, an agent-entity system 1200 including the cloud building management platform 620 configured to generate and/or manage agents of the system 1200 and/or entities of an entity database, according to an exemplary embodiment. The cloud building management platform 620 includes the timeseries database 928, an entity database 1202, an agent service 1214, and an agent-entity manager 1204.

The entity database 1202 can be the same as, or similar to, the entity graph 800 of FIG. 8 and/or the entity graph 1100 of FIG. 11. The entity database 1202 can be similar to, or the same as, the semantic models described with reference to U.S. patent application Ser. No. 16/379,646 filed Apr. 9, 2019, U.S. patent application Ser. No. 16/379,652 Apr. 9, 2019, U.S. patent application Ser. No. 16/379,661 filed Apr. 9, 2019, and U.S. patent application Ser. No. 16/379,666 filed Apr. 9, 2019, the entirety of which is incorporated by reference herein. Furthermore, the entity database 1202 may be the same as, or similar to, the space graphs described with reference to U.S. patent application Ser. No. 16/260,078 filed Jan. 28, 2019, the entirety of which is incorporated by reference herein.

The entity database 1202 is configured to store entities of various types. The entities may be the entity 1205, the entity 1208, and the entity 1210. In some embodiments, any number of entities can be stored by the entity database 1202. The entity 1205, the entity 1208, and/or the entity 1210 can be an object entity type or a data entity type. For example, the object entity type can represent physical buildings, building spaces, building floors, building subsystems, building equipment, building devices, occupants, etc. The data entities can store data for the object entities. For example, a data entity could store timeseries measurements of an object entity. In some embodiments, the data entities themselves store data. In some embodiments, the data entities are or include a handle to data storage areas of the timeseries database 928 such that timeseries data is stored in the timeseries database 928 and linked to an object entity of the entity database 1202 via the handle of the data entity related to the object entity.

The entities of the entity database 1202 can be related via relationships. For example, a relationship 1206 ("isRelatedTo") between entity 1205 and 1208 can indicate that the entity 1205 is related in a particular manner to the entity 1208. Similarly, the relationship 1212 ("isRelatedTo") indicates that the entity 1208 is related to the entity 1210. The relationship can be based on an ontology indicating that one entity is a data entity for an object entity, indicating that equipment represented by a first entity serves a space of a second entity, etc.

The agent service 1214 is configured to generate, instantiate, and/or manage agents 1224 and 1230 (or any other number of agents) and/or communication channels 1220 by which the agents 1224 and/or 1230 communicate. The agent service 1214 includes an agent manager 1216 and a channel communication manager 1218. In some embodiments, the agent manager 1216 can be configured to query entity database 1202 and/or receive information from the entity database 1202 in response to the query. In some embodiments, the agent manager 1216 queries the entity database 1202 periodically. The agent manager 1216 can receive information identifying entities of the entity database 1202 and identify, whether an agent exists for each object entity of the entity database 1202 based on the query results. In response to identifying that an object entity of the entity database 1202 exists for which no corresponding agent has been instantiated, the agent manager 1216 can instantiate an agent for the object entity.

The agents 1224 and/or 1230 can be goal-reward based intelligence modules. The agents 1224 and/or 1230 can include a set of rules defining a reward and a set of rules defining a goal. For example, a goal for a thermostat agent could be to cause an ambient temperature of a zone to be a setpoint temperature while using the least amount of energy. The rewards can be rewards for causing the ambient temperature to be the setpoint temperature and/or causing a low amount of energy to be used to achieve the desired temperature. The agent can generate and/or manipulate control operations overtime to maximize the rewards such that an optimal control decisions are implemented to control the temperature and reduce energy usage.

The agents 1224 and/or 1230 can utilize, and/or be updated based on, decision tree learning algorithms, association rule learning algorithms, artificial neural networks algorithms, deep learning algorithms, inductive logic programming algorithms, support vector machines algorithms, clustering algorithms, Bayesian network algorithms, reinforcement learning algorithms, representation learning algorithms, similarity and metric learning algorithms, sparse dictionary learning algorithms, and/or genetic algorithms. In some embodiments, a machine learning module may provide generated machine learning algorithms to one or more software agents. In some embodiments, the agents themselves include the machine learning module.

The agents 1224 and 1230 are implemented by the building device 1222 and the building device 1228 respectively. The building devices 1222 and/or 1228 can be thermostats, controllers, VAVs, AHUs, boilers, chillers, sensors, actuators, etc. The building devices 1222 and/or 1228 can be any building device described with reference to FIGS. 1-5. The building devices 1222 and the building device 1228 can be one or more physical computing devices of a building. The building devices 1222 and 1228 can include processing circuits, processors, and/or memory devices to implement the agents 1224 and/or the agent 1230, for example, processing circuits, processors, and/or memories similar to the processing circuit 606, the processor 608, and/or the memory 610 as described with reference to FIG. 6.

The agent manager 1216 can be configured to maintain real time data relating to which agents are currently active, and which agents are not currently active. The agent manager 1216 may further maintain real time data relating to which entities of the entity database 1202 a particular agent is currently associated with. In one embodiment, the agent manager 1216 may generate a location based agent. The location based agent may have defined parameters and permissions associated with a given location with a BMS and/or facility. For example, the executive suite may require additional permissions than a normal conference room.

In some embodiments, the agent manager 1216 is configured to generate a function-based agent. The function based agent may have defined parameters and permissions associated with a given function or series of functions associated with a BMS. For example, the agent manager 514 may generate a function-based agent such as an "energy management agent." The energy management agent may be defined to monitor and/or evaluate energy related data associated with a BMS. For example, the energy management agent may monitor and evaluate energy related data such as kWh, peak demand, etc. Other function-based agents may include chiller management agents, HVAC management agents, lighting management agents, etc.

In some embodiments, the function based agents are configured by the agent manager 514 to generate context specific reports for related functions. In some examples, the function-based agents may evaluate the user, type of available data, location, etc. and generate dynamic reports. In other examples, the user can define what parameters/data is requested in the reports. In still further examples, a user may be able to modify the dynamically generated reports over time by indicating which data is and is not required and/or desired by the user. Further, the user can provide feedback to the function-based agent to provide additional guidance related to the frequency with which the reports should be generated (i.e. daily, weekly, monthly, etc.). While the function-based agent or the location based agent may generate reports, a report generating agent may also be generated to produce reports. In one embodiment, the report generating agent 912 may be able to generate reports across multiple locations and/or functions.

In some embodiments, the agent manager 1216 may generate equipment agents for various building equipment (e.g., BMS devices) such as those described with reference to FIGS. 1-5. Each equipment agent may be associated with a specific device within the BMS, such that equipment agent for the specific device is a digital twin or shadow of the specific device. For example, a VAV may have an associated VAV agent, a sensor may have an associated sensor agent, an AHU may have an associated AHU agent, a chiller may have an associated chiller agent, an RTU may have an associated RTU agent, and/or the like. Thus, an associated equipment agent is a software representation of the associated equipment, and may have the same states and controls of the associated equipment. For example, a corresponding equipment agent may have access to the same inputs and outputs as those of the associated equipment. Further, the corresponding equipment agent may be able to control and/or monitor various parameters of the associated equipment. However, in some embodiments, an equipment agent is not limited to representing a single device or equipment, for example, an equipment agent may represent a logical group of devices or equipment (e.g., all AHUs, all VAVs, all temperature sensors, all thermostats, or the like).

In some embodiments, the agent manager 1216 may generate space agents for various spaces (e.g., building, floor, room, zone, and/or the like) of a corresponding building. However, in some embodiments, a space agent is not limited to representing a single space (e.g., building, floor, room, zone, and/or the like), for example, a space agent may represent a logical group of spaces (e.g., all meeting rooms on floor 5, all restrooms in the building, or the like). In some embodiments, each space has its own programmable optimization state (e.g., optimized for comfort, optimized for cost, or the like), and the space agent for each space represents the programmable optimization state for the space. In some embodiments, the space agent may monitor and control an environmental condition of the associated space based on the programmable optimization state for the space. For example, in some embodiments, space agents own the temperature setpoint for their respective space, and can calculate the effective temperature setpoint for their respective space based on the optimization state of the space. However, the present disclosure is not limited thereto, and it should be appreciated that space agents may be used to control and/or monitor other environmental conditions of their particular space, such as humidity, particulate count, occupancy time (actual and/or expected), lighting, audio/visual, fire safety, electrical, security, access control, and/or the like, for example.

In some embodiments, space agents may monitor the conditions and parameters of the space, as well as the health of the various equipment that serve the space. For example, the space agent may monitor the current temperature, humidity level, size, location, number of windows, number of occupants, occupancy patterns, and/or the like of the space. Further, the space agent may monitor the health or status of sensors, lighting devices, blinds or shades, VAV units, AHU, and/or other building equipment that serve the space. In some embodiments, the space agent may be a parent of all of the agents associated with the space. In some embodiments, space agents may have a hierarchal order such that a space agent of a higher order may override controls of each of the space agents (and/or other agents) of a lower order. For example, a building agent may be the parent of all of the floor agents in the building, each of the floor agents may be a parent of all of the room agents associated with a particular floor, each of the room agents may be a parent of all equipment agents that serve a particular room, and/or the like. In some embodiments, the parent agents may communicate with each of the corresponding child agents by exchanging messages via channels that the parent agents and/or child agents are subscribed to.

In some embodiments, the agent manager 1216 is configured to generate control agents. Control agents may be similar to function-based agents, but are configured to provide commands or logic to the other agents to optimize or override various control functions. For example, in some embodiments, control agents include optimization algorithms that are used by the space agents to optimize a space for a given optimization state. In some embodiments, the control agents communicate with the space agents to optimize or override controls of the equipment serving the particular space, and the space agents communicate with the equipment agents to provide controls to the equipment agents for controlling the equipment serving the particular space. Accordingly, each of the space agents and equipment agents are informed of the optimization or override commands, without the control agents having to determine the equipment and corresponding equipment agents that service a particular space. However, the present disclosure is not limited thereto, and in other embodiments, the control agents can communicate with the space agents and the equipment agents concurrently (or simultaneously) via a corresponding channel, which can reduce latencies in the communication chain. In some embodiments, control agents can include, for example, global data sharing agents, temporary occupancy override agents, scheduled exception agents, flow setpoint reset agents, optimal start/stop agents, reheat valve control agents, unoccupied mode night setback agents, chiller sequencing agents, and the like.

As briefly discussed above, the various agents described herein are used to simulate a building and/or system, and communicate with each other by publishing messages via the communication channels 1220 which can be generated by and/or otherwise managed by the channel communication manager 1218. The use of agents and agent-based communication can provide multiple advantages over current BMS systems. Agent-based communication systems described herein can facilitate speed and efficiency improvements over other systems. For example, communication channels can be automatically created in response to a set of conditions, and may be dynamically modified according to changing events or conditions.

For example, the channel communication manager 1218 can be configured to query the entity database 1202. The channel communication manager 1218 can identify, based on the result of the query, whether an object entity exists for which a communication channel 1220 should be generated. For example, the channel communication manager 1218 can be configured to store a predefined list of particular types of entity types. If an entity exits within the entity database 1202 that is an entity of the list of entity types, the channel communication manager 1218 can generate a corresponding communication channel. For example, the list may indicate that for any building entity, floor entity, and/or space entity, a corresponding communication channel should be generated.

In this regard, space communication channels representing physical spaces can be generated. The channel communication manager 1218 can be configured to identify relationships to the space entities for which the space communication channels are generated. For example, a thermostat entity may have a relationship to a zone entity in the entity database 1202. The channel communication manager 1218 can generate a communication channel for the zone and configure a thermostat agent associated with the thermostat entity to publish messages to and/or subscribe to messages from, the zone communication channel by identifying the relationship between the thermostat entity and the zone entity. The channel communication manager 1218 can configure the agents 1224 and/or 1230 to publish and/or subscribe to the communication channels 1220 by deploying channel configuration 1226 and/or 1232 to the agent 1224 and/or the agent 1230 respectively, the channel configurations 1226 and/or 1232 identifying publication and/or subscription rules for particular communication channels of the communication channels 1220 causing the respective agents 1224 and/or 1230 to publish particular types of data to particular communication channels and/or subscribe to particular communication channels.

In some embodiments, communication channels may be generated according to a particular pattern of object entities and/or relationships. The patterns can be stored as rules. In response to identifying if a particular rule is fulfilled by the entities and relationships of the entity database 1202, the channel communication manager 1218 can be configured to generate a communication channel for the particular rule. For example, a rule may define a temperature control communication channel for control information to be communicated on for a particular set of equipment. The rule may indicate that if a thermostat entity is related to a VAV entity by a "controls" relationship and both the thermostat entity and the VAV entity are related to a zone entity by "isLocatedIn" relationships, a control communication channel should be generated.

In some embodiments, message passing via the communication channels 1220 is implemented via a Redis Pub/Sub system. In Redis Pub/Sub semantics, an agent or function may publish messages on any authorized channel arbitrarily simply by calling the PUBLISH command and specifying the name of the channel. Furthermore, abstraction provides agents with no (direct) control over which channels they communicate on, in some embodiments. However, exceptions can be configured using a link property of a configuration of an agent, in some embodiments. In some embodiments, all messages and agent outputs are published on all the channels on which the agent is authorized to publish to, according to the semantics described above. A similar process may be used to decide which messages an agent should receive.

In some embodiments, the conditions for generating the communication channels 1220 may be defined by the agents 1224 and/or 1230, for example according to building management system controls, occupancy within spaces, and the like. In this regard, the agents 1124 and/or 1230 can perform some and/or all of the operations of the channel communication manager 1218 and/or can generate the channel configurations 1226 and/or 1232. For example, the agent 1230 can be configured to query the entity database 1202 to identify whether an entity associated with the agent 1230 is related to a second entity for which a communication channel exists. In response to identifying such a relationship, the agent 1230 can be configured to update the channel configuration 1232 to communicate (e.g., publish to or subscribe to) on the identified communication channel.

By registering an agent to a particular space within a defined building space hierarchy, messages can be automatically communicated upstream to parent agents (e.g., parent spaces) and/or downstream to child agents (e.g., child spaces, equipment, and/or the like). Furthermore, ad hoc generation of communication channels enables communication to be dynamically managed for a particular purpose. Accordingly, for example, messages that are sent, received, archived, and/or retrieved over a communication channel can be limited to the purpose (e.g., by limiting the devices that may publish messages, or the types of messages from each device) and dynamically modified. The communication channel may in effect perform similar to a "filtered" channel, simplifying analysis of published information, requiring less data to be searched by subscribers to the communication channel (e.g., a building controller), and fewer computer processor cycles.

The channel communication manager 1218 can be configured to generate a communication channel associated with a space, equipment, control function, and/or the like, and manage registration of agents to the communication channel. In this regard, when an agent is registered to a communication channel, the agent may receive and/or publish messages over the communication channel as described herein. For example, an agent associated with a computing device may be registered to a communication channel associated with a physical location zone when the geolocation overlaps with a portion of the physical location zone. In another example, the channel communication manager 1218 can be configured to create a communication channel associated with a physical location zone in response to an occupancy level, as described herein.

In some embodiments, the channel communication manager 1218 can be configured to register an agent associated with a BMS device during commissioning of the BMS device. For example, if a new BMS device is added and mapped to a building space (e.g., a zone, room, or floor in a building), the channel communication manager 1218 can be configured to automatically register the agent associated with the BMS device to a corresponding communication channel for the space.

In some embodiments, the channel communication manager 1218 can be configured to create and/or manage a communication channel based on attributes associated with one or more agents. For example, employees of a business can each be associated with a computing device, whereby an agent associated with the computing device includes one or more attribute values indicating a job title, experience level, health information, etc. The channel communication manager 1218 may be configured to create and/or manage a communication channel, for example to ensure the safety of the employees, mitigate business risks, and the like.

In some implementations, the channel communication manager 1218 can be configured to perform security related tasks for a communication channel. In some embodiments, the channel communication manager 1218 can be configured to perform an authentication process prior to or during registration of an agent to a communication channel. Any suitable authentication process may be used, including password, tokenization, biometric, and/or multi-factor systems. In some embodiments, the authentication process may vary depending upon a level of access or risk associated with registration of an agent to a communication channel.

In some embodiments, the channel communication manager 1218 is configured to perform an authorization process to determine whether a particular agent has subscription access and/or a level of subscription access. For example, an agent associated with a temperature sensor may not be authorized to subscribe to messages from the communication channel, even though the agent associated with the temperature sensor is authorized to publish messages on the communication channel (e.g., relating to temperature measurements). In contrast, an agent associated with a thermostat may be authorized to publish messages as well as to subscribe to messages on the communication channel, for example to receive messages with information relating to a control setpoint. In either example, authorization may or may not be limited, e.g., to all messages of the channel, to building control messages of the channel, to temperature-related messages of the channel, and/or the like.

As another example implementation, an agent associated with a computing device of an independent contractor may have only limited subscription access to messages published over a channel (e.g., to receive security alerts). In contrast, an agent associated with a computing device of a system level administrator or top-level executive may be authorized to receive all messages published over a channel.

In some embodiments, the channel communication manager 1218 is configured to perform an authorization process to determine whether a particular agent has publication access and/or a level of publication access. Publication access may be selectively configured based on the type of device, for example to limit the number of messages published over a channel and the corresponding data on the channel. For example, an agent associated with a building device may not have publication authorization or limited publication authorization based on a particular control circuit and inputs therein.

In some embodiments, the channel communication manager 1218 is configured to store authentication and/or authorization information as one or more attributes of an agent. In some embodiments, the channel communication manager 1218 may be configured to interact with other devices or systems described herein to facilitate authentication and/or authorization. In some embodiments, authentication and/or authorization processes are handled by other devices or systems described herein, and not by the channel communication manager 1218. For example, in some embodiments, authentication and/or authorization processes may be handled by one or more agents.

In some embodiments, the channel communication manager 1218 is configured to store published messages of a communication channel. In some embodiments, an agent can be configured to retrieve stored messages. For example, in some embodiments an agent may be configured with an attribute relating to whether the agent has an "active" status, e.g., whether the agent is actively receiving and/or publishing messages to the channel. For example, an agent with subscription to a communication channel may be "inactive," such that the agent does not actively receive published messages. In this regard, the agent can subsequently retrieve received messages from a database, as described herein.

The agent-entity manager 1204 can be configured to ingest information into the timeseries database 928 and/or into the entity database 1202. For example, the agent 1230 may publish timeseries data on a communication channel 1220 monitored by the agent-entity manager 1204. The agent-entity manager 1204 can cause the timeseries data to be ingested into the timeseries database 928 and/or into the entity database 1202. In some embodiments, the agent-entity manager 1204 identifies an entity assigned to store the timeseries data for the agent 1230 based on an author identifier of the publication (identifying the agent 1230).

Furthermore, the agent-entity manager 1204 can, in some embodiments, be configured to query the entity database 1202 and/or the timeseries database 928 for timeseries data. For example, the agent 1230 may require specific timeseries data of an entity of the entity database 1202 to perform a particular analysis. The agent-entity manager 1204 can query the entity database 1202 and/or the timeseries database 928 based on a query request of the agent 1230 and provide the results to the agent 1230.

In some embodiments, rather than, or in addition to, operating through the agent-entity manager 1204 to query the entity database 1202 and/or ingest data into the entity database 1202, the agent 1230 may have direct access to the entity database 1202. In this regard, the agent 1230 can identify a particular entity to ingest data into and cause the data to be ingested into the particular entity. Furthermore, the agent 1230 can be configured to directly query the entity database 1202 to retrieve data required for the agent 1230 to operate.

Figure 13:
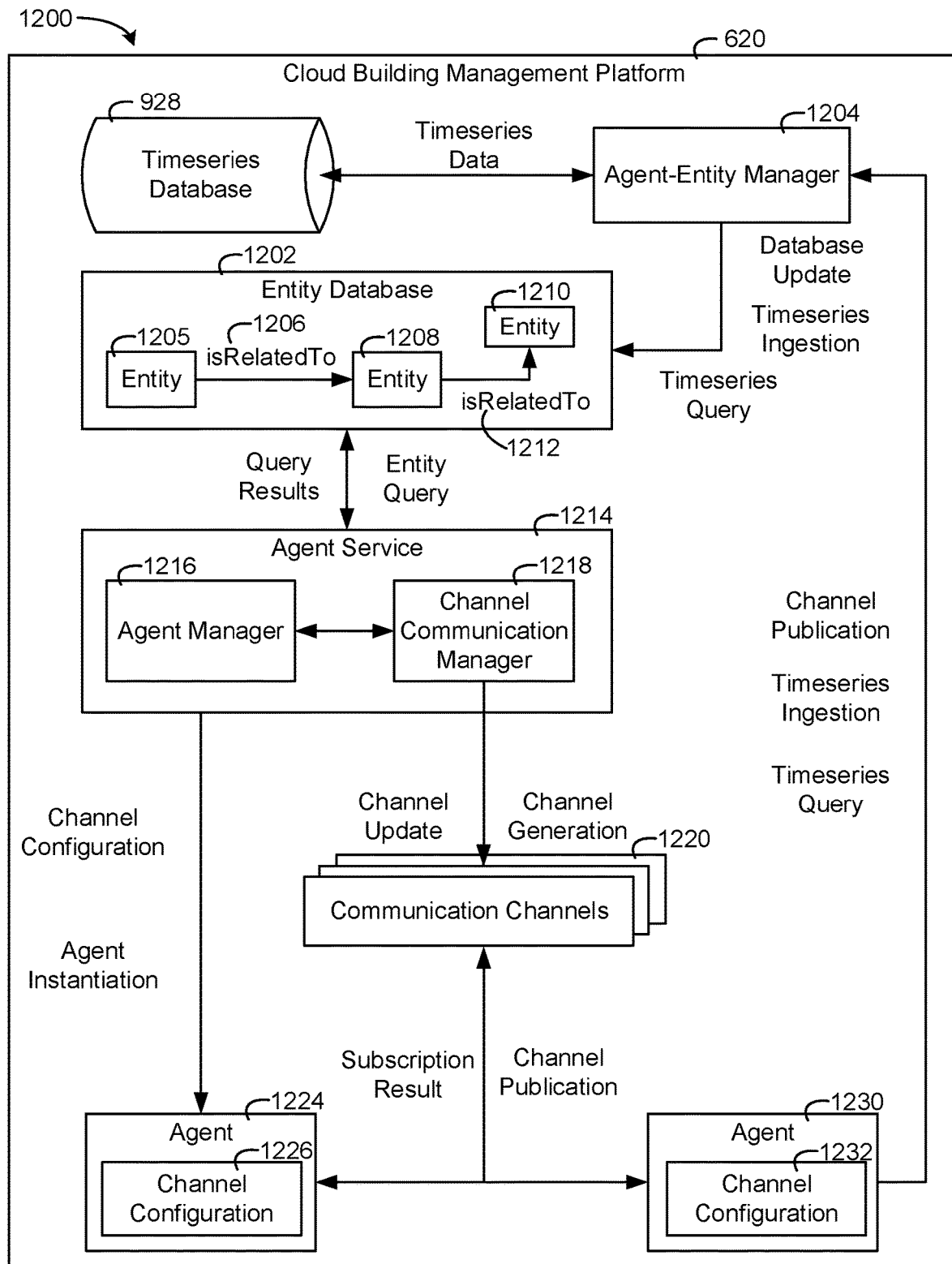
FIG. 13 is a block diagram of the agent-entity system of FIG. 12 where the cloud building management platform is configured to implement the agents, according to an exemplary embodiment.

Referring now to FIG. 13, the agent-entity system 1200 is shown where the agents 1224 and 1230 are implemented by the cloud building management platform 620. As compared to FIG. 12, in FIG. 13 rather than implementing the agents 1224 and 1230 on the building devices 1222 and/or 1228, the agents 1224 and 1230 are implemented on the cloud building management platform 620. However, the agents 1224 and/or 1230, though implemented within the cloud building management platform 620, can be related to the building devices 1222 and/or 1228.

In this regard, even if the building devices 1222 and/or 1228 do not include the data and/or processing resources to implement the agents 1224 and/or 1230, the agents can still be deployed remotely in the cloud building management platform 620. In some embodiments, since the agents are remote and cannot make direct manipulations to control settings and/or operating parameters, the agents 1224 and/or 1230 can implement the manipulations by sending control messages to the building devices 1222 and/or 1228 via a network (e.g., the network 546 as described with reference to FIG. 5). In some embodiments, the local and remote deployment of FIGS. 12-13 can be combined such that some agents are run locally within a building devices and other agents are run remotely.

Figure 14:
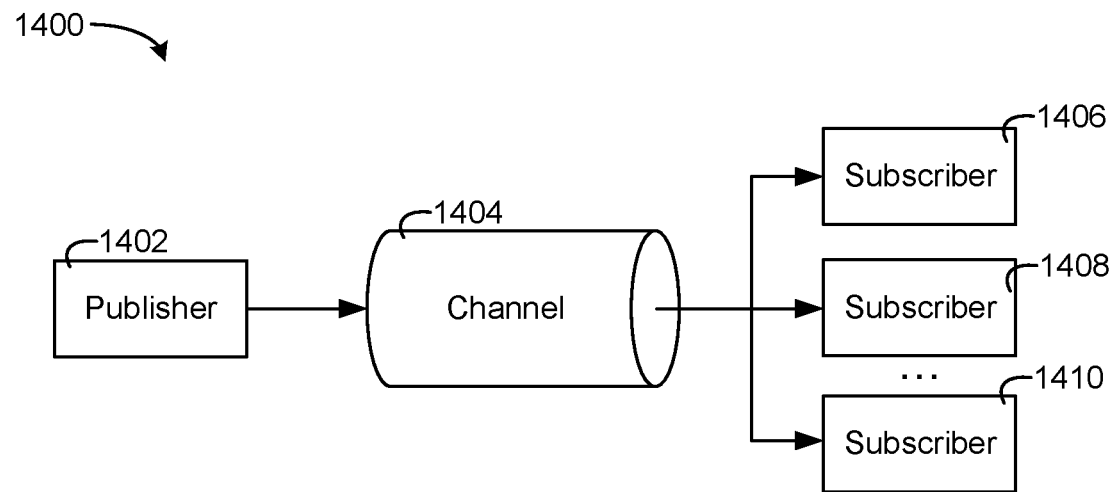
FIG. 14 is a block diagram of a publish-subscribe messaging pattern of agents of the agent-entity system of FIGS. 12-13 where a single publisher publishes messages to multiple subscribers of a single channel, according to an exemplary embodiment.
Figure 15:
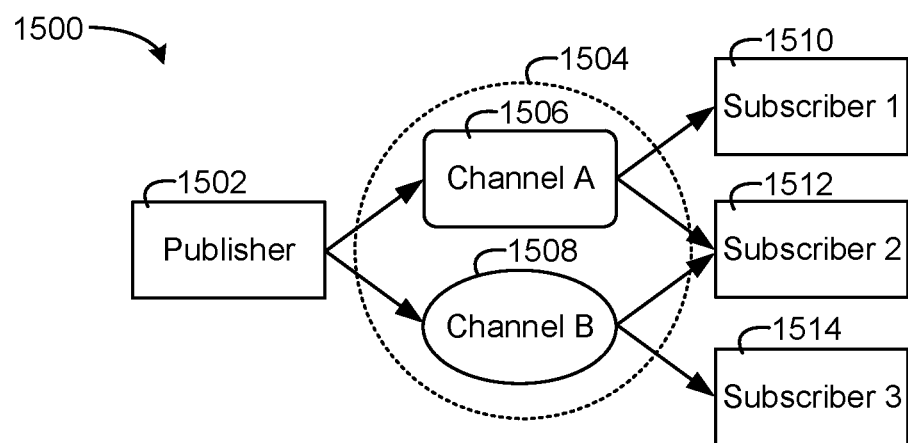
FIG. 15 is a block diagram of a publish-subscribe messaging patterns of agents of the agent-entity system of FIGS. 12-13 where a single publisher publishes messages to multiple channels and various subscribers receive the messages via channels that the subscribers are subscribed to, according to an exemplary embodiment.

Referring now to FIGS. 14 and 15, various block diagrams illustrating a number of publish-subscribe messaging configurations between publishers and subscribers are shown, according to various exemplary embodiments. In FIG. 14, a first messaging pattern 1400 illustrates a stand messaging scheme. A publisher 1402 publishes a message onto a channel 1404, which is then transmitted to subscribers 1406, 1408, and 1410 that are subscribed to the channel 1404, as discussed above.

In FIG. 15, a second messaging pattern 1500 illustrates a publisher 1502 publishing a message, which is then received by a communication infrastructure system 1254. The communication infrastructure system 1504 may be configured to parse the message for a specific aspect, such as a topic, an associated space, associated equipment, etc. The communication infrastructure system 1504 can then determine which channel 1506 and/or 1508 the message should be transmitted to, and provides the message to subscribers of that channel. In other embodiments, the publisher 1502 can publish messages to each of the channels 1506 and 1508, which is then transmitted to subscribers 1510, 1512, and 1514 that are subscribed to the channels 1506 and 1508. As shown in FIG. 15, subscriber 1 1510 is only subscribed to channel A 1506, subscriber 2 1512 is subscribed to both channels A and B 1506 and 1508, and subscriber 3 1514 is only subscribed to channel B 1508. Example communication infrastructures may utilize decoupling and asynchronous delivery, as well as multiway delivery. This can allow for high throughput within the communication infrastructure. By using a message and channel based communication infrastructure, a scalable, persistent and anonymous communication scheme may be created.

Figure 16:
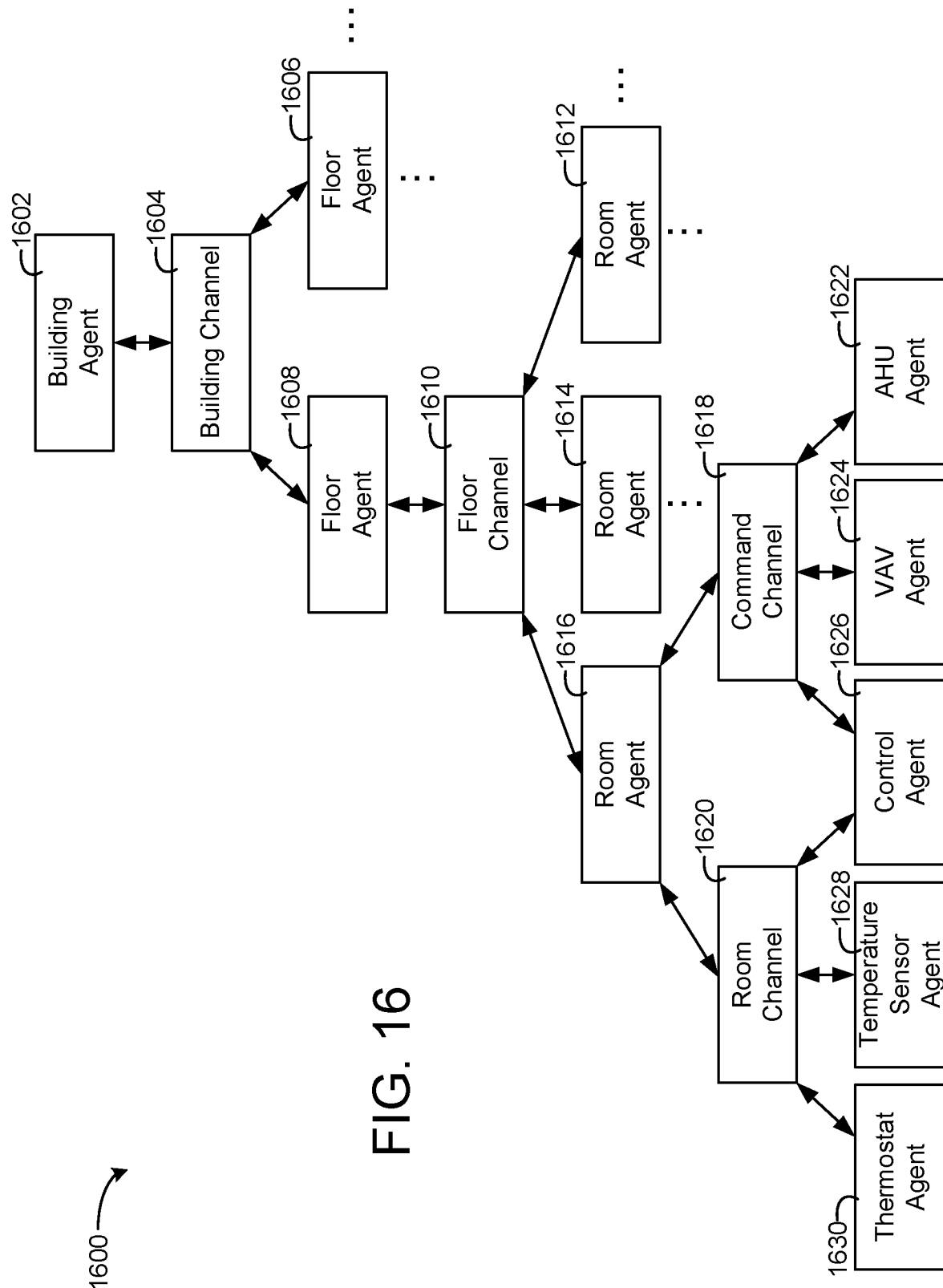
FIG. 16 is an example channel hierarchal structure for the agent-entity system of FIGS. 12-13, according to an exemplary embodiment.

Referring now to FIG. 16, an example channel hierarchal structure 1600 is shown, according to one exemplary embodiment. In some embodiments, space agents may be generated to represent every space in a building. For example, as shown in FIG. 16, a building agent 1602 may represent the entire building, floor agents 1606, 1608, etc., may represent each respective floor in the building, and room agents 1612, 1614, 1616, etc., may represent each room on each respective floor in the building. In some embodiments, the building agent 1602 may monitor, manage, or control each of the agents that serves the building, the floor agents 1606, 1608, etc., may monitor, manage, or control each of the agents that serves a corresponding floor, and the room agents 1612, 1614, 1616, etc., may monitor, manage, or control each of the agents that serves a corresponding room. Thus, in some embodiments, each of the space agents may have one or more associated communication channels, so that each of the space agents can communicate with other agents via their respective communication channels.

For example, a building channel 1604 may be generated for the building agent 1602, a floor channel 1610, etc., may be generated for each of the floor agents 1606, 1608, etc., and a room channel 1620, etc., may be generated for each of the room agents 1612, 1614, 1616, etc. In some embodiments, the building agent 1302 may communicate with each of the floor agents 1606, 1608, etc., via the building channel 1604, and each of the floor agents 1606, 1608, etc., may communicate with each of the room agents 1612, 1614, 1616, etc., on their respective floors via their respective floor channels 1610, etc. Thus, in this example, the building agent 1602 and each of the floor agents 1606, 1608, etc., may be registered on the building channel 1604 to publish and/or subscribe to messages received on the building channel 1604, and each of the floor agents 1606, 1608, etc., and their respective room agents 1612, 1614, 1616, etc., may be registered on their respective floor channels 1610, etc., to publish and/or subscribe to messages received on their respective floor channels 1610, etc.

Similarly, in some embodiments, each of the room agents 1612, 1614, 1616, etc., may communicate with other agents (e.g., thermostat agent 1630, temperature sensor agent 1628, control agent 1626, and/or the like) that serve their corresponding room via a corresponding room channel 1620, etc. Thus, in this example, each of the room agents 1612, 1614, 1616, etc., and their respective other agents (e.g., thermostat agent 1630, temperature sensor agent 1628, control agent 1626, and/or the like) that serve their corresponding room may be registered on their respective room channels 1620, etc., to publish and/or subscribe to messages received on their respective room channels 1620, etc. Thus, in this example, messages that are published from parent agents can be transmitted downstream to child agents, and messages that are published from the child agents can be transmitted upstream to the parent agents as needed or desired.

For example, if the building is in an emergency state, the building agent 1602 can publish an emergency message on the building channel 1604, each of the floor agents 1606, 1608, etc., can receive the emergency message on the building channel 1604 and republish the emergency message on their respective floor channels 1610, etc., each of the room agents 1612, 1614, 1616, etc., can receive the emergency message on their respective floor channels 1610, etc., and republish the emergency message on their respective room channels (and/or other channels) 1620, etc., and each of the agents that serve their respective rooms can receive the emergency message on their respective room channels (and/or other channels) 1620, etc. Then, each of the agents can implement emergency procedures and transmit messages that the emergency procedures have been implemented upstream via their respective channels in a similar manner, so that the building agent 1602 can receive the messages via the building channel 1604. However, the present disclosure is not limited thereto, and in other embodiments, each of the child agents may also be registered to publish and/or subscribe to messages on each of their respective parent agents, grandparent agents, etc., so that messages published on the higher channels can be received concurrently (or simultaneously) by each of the child agents, grandchild agents, etc.

In some embodiments, other channels may also be generated for each of the space agents (or other agents) as needed or desired. For example, as shown in FIG. 16, the room agent 1612 also has a corresponding command channel 1618 to control the control agent 1626, VAV agent 1624, and AHU agent 1622 via the command channel 1618. In this case, when the room agent 1616 publishes a message, each of the room channel 1620 and the command channel 1618 receives the message to monitor, manage, or control the other agents that are subscribed to those channels. However, the present disclosure is not limited thereto, and it should be appreciated that any number of channels and type of channels as discussed above may be generated for the space agents and/or other agents as desired or required. For example, in other embodiments, the building agent 1602 and/or the floor agents 1606, 1608, etc., may also have a corresponding command channel to monitor and/or control various equipment or devices that serve the entire building (e.g., elevators, building access control devices, and/or the like) or floor.

Figure 17:
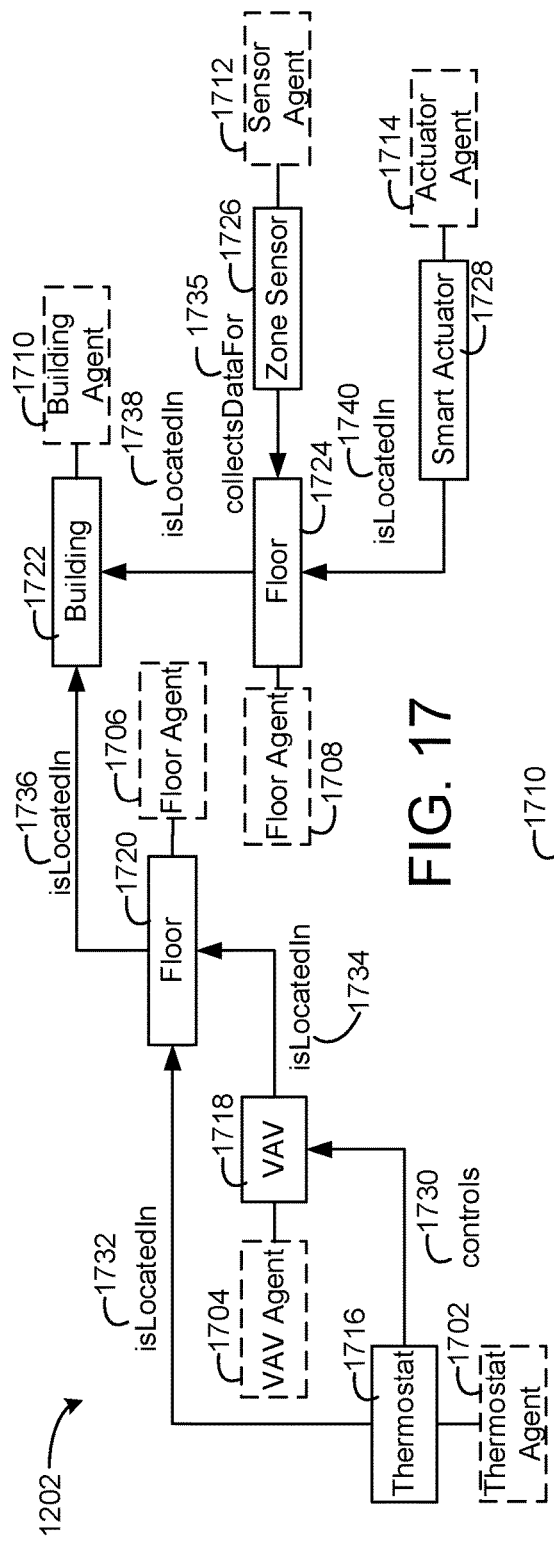
FIG. 17 is a block diagram of an entity database with multiple entities and relationships that can be stored by the agent-entity system of FIGS. 12-13, according to an exemplary embodiment.

Referring now to FIG. 17, the entity database 1202 is shown in greater detail including entities and relationships, according to an exemplary embodiment. The entities 1716-1728 represent a building and equipment and spaces of the building. The entities 1716-1728 can be based on an ontology defining particular entity types (building, floor, room, zone, thermostat, actuator, etc.). More particularly, the thermostat entity 1716 represents a particular physical thermostat, the variable air volume (VAV) entity 1718 represents a physical VAV, the floor entity 1720 represents a physical floor of a physical building, the building entity 1722 represents the physical building, the floor entity 1724 represents another floor of the physical building, the zone sensor entity 1726 represents a physical zone sensor device, and the smart actuator entity 1728 represents a physical smart actuator device.

Each of the entities 1716-1728 are associated with one of the agents 1702-1714. The agents 1702-1714 can be each generated for the entities 1716-1728 by the agent manager 1216 and the agents 1702-1714 can be the same as, or similar to, the agents 1224 and/or 1230. The agents 1702-1714 in FIG. 17 may be actual entities within the entity database 1202 or are not necessarily stored within the entity database 1202. In some embodiments, an agent identifier for each of the agents 1702-1714 and a relationship to the corresponding entity is stored in the entity database 1202. However, in some embodiments, the agents 1702-1714 are stored within and/or operate within, the entity database 1202.

The entities 1716-1728 of the entity database 1202 are related by relationships 1730-1740. The relationships 1730-1740 can be based on an ontology defining particular relationship types (e.g., isLocatedIn, controls, collcts-DataFor, etc.). For example, the thermostat entity 1716 isLocatedIn (relationship 1732) floor entity 1720 indicating that the physical thermostat represented by the thermostat entity 1716 is located on the physical floor represented by the floor entity 1720.

The thermostat entity 1716 controls (relationship 1730) the VAV entity 1718 indicating that the physical thermostat represented by the thermostat entity 1716 operates to control temperature by operating a physical VAV represented by the VAV entity 1718 by generating control decisions for the VAV. The VAV entity 1718 isLocatedIn (relationship 1734) the floor entity 1720 indicating that the physical VAV represented by the VAV entity 1718 is physically located on the physical floor represented by the floor entity 1720.

The floor entity 1720 isLocatedIn (relationship 1736) the building entity 1722 indicating that the physical floor represented by the floor entity 1720 is a floor of the physical building represented by the building entity 1722. Similarly, the floor entity 1724 isLocatedIn (relationship 1738) the building entity 1722 indicating that the physical floor is another floor of the physical building represented by the building entity 1722. The zone sensor entity 1726 collectsDataFor (relationship 1735) the floor entity 1724 indicating that the measurements of the physical zone sensor represented by the zone sensor entity 1726 collects data for the physical floor represented by the floor entity 1724. Furthermore, the smart actuator entity 1728 isLocatedIn (relationship 1740) the floor entity 1724 indicating that the physical smart actuator represented by the smart actuator entity 1728 is located on the physical floor represented by the floor entity 1724.

Figure 18:
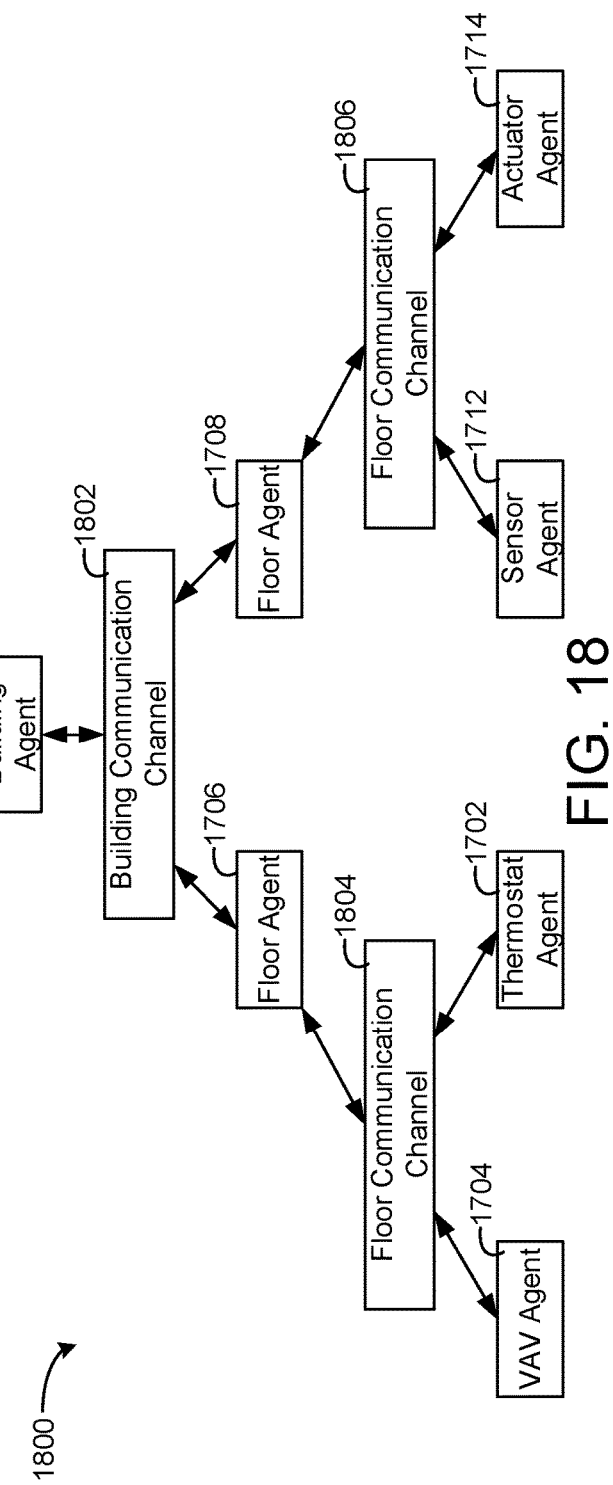
FIG. 18 is a block diagram of an agent channel hierarchical structure based on the entity database of FIG. 17, according to an exemplary embodiment.

Referring now to FIG. 18, an agent channel hierarchical structure 1800 is shown based on the entities 1716-1728 of the entity database 1202 and the relationships between the entities 1716-1728, the relationships 1730-1740, according to an exemplary embodiment. In some embodiments, the agent service 1214 can be configured to generate the agent channel hierarchical structure 1800 by generating agents (e.g., performed by the agent manager 1216) and generating communication channels for the agents to communicate on (e.g., performed by the channel communication manager 1218). In some embodiments, the agent service 1214 generates the agents and/or communication channels based on the information of the entity database 1202, e.g., based on the entities, entity types, and/or relationships between the entities.

The agent service 1214 can be configured to search or otherwise analyze some and/or all of the entities and/or relationships of the entity database 1202. The agent service 1214 can be configured to determine, for each entity of the entity database 1202, whether a corresponding agent exists and, if one does not exist, generate and instantiate an agent. In this regard, the agent service 1214 can be configured to generate agent-entity pairs, e.g., as illustrated in FIG. 17. For example, the thermostat agent 1702 may be paired with the thermostat entity 1716. Similarly, the building agent 1710 can be paired with the building entity 1722.

In some embodiments, the agent service 1214 can be configured to store a set of predefined agent templates. For example, the agent service 1214 may store a thermostat agent template that includes software and/or code for operating the thermostat and learning for collected data overtime to improve the performance of the thermostat. Similarly, the agent service 1214 can be configured to store a building agent. The building agent can include software and/or code for operating a high level building control algorithm, for example, a building energy savings algorithm, a building emergency response algorithm, etc. The building agent can further include machine learning models for updating the algorithms over time.

The agent service 1214 can be configured to identify entities of the entity database 1202 corresponding to an agent template and instantiate the agent template for the identified agent. For example, the agent service 1214 can identify for the smart actuator entity 1728 that the agent service 1214 stores a smart actuator agent template. The agent service 1214 can instantiate the smart actuator agent template as the actuator agent 1714. The agent service 1214 can identify, for each entity, the type of the entity, and select a corresponding agent type to be instantiated. In some embodiments, the agent service 1214 can parse the text of the entity to identify the type, e.g., the VAV entity 1718 can be identified as a VAV by analyzing the text "VAV" stored in the VAV entity 1718. In some embodiments, each of the entities may have a relationship to a type entity. The type entity may be "Thermostat Type." Any entity which has a relationship "isATypeOf" to the thermostat type entity can be identified as having the thermostat type and thus, the agent service 1214 can identify a particular entity associated with a relationship "isATypeOf" to the thermostat type entity to identify that a thermostat agent should be generated for the particular entity.

In addition to generating the "agent-entity" pairs, the agent service 1214 can generate the communication channels by which the agents 1702-1714 communicate. The agent service 1214 can be configured to generate the communication channels 1801-1806. The agent service 1214 can be configured to generate the communication channels 1801-1806 based on the entities and relationships of the entity database 1202. For example, the agent service 1214 can be configured to generate a communication channel by identifying a particular entity of a particular type within the entity database 1202 and subscribe agents to the communication channel based on entities associated with the agents that are related to the particular entity via relationships.

For example, the agent service 1214 can store a list of entity types that should have a corresponding communication channel. For example, the entity types may be all space types, e.g., buildings, floors, rooms, zones, etc. In response to identifying an entity of the entity database 1202 that is one of the stored types, the agent service 1214 can be configured to generate an instantiate a communication channel. For example, the agent service 1214 can identify the building entity 1722 is a building type entity. In response to the identification, the agent service 1214 can generate the building communication channel 1802.

Furthermore, the agent service 1214 can subscribe the agents 1704-1714 as publishers and/or subscribers to the generated communication channels 1802-1806 based on the relationships of the entity database 1202. For example, the floor entity 1720 isLocatedIn (relationship 1736) the building entity 1722. Since the floor entity 1720 is related to the building entity 1722, the agent service 1214 can be configured to cause the floor agent 1706 to subscribe to, and/or publish on, the building communication channel 1802 generated based on the building entity 1722. Similarly, the floor entity 1724 isLocatedIn (relationship 1738). The agent service 1214 can identify the relationship 1738 and, in response to the identification, cause the floor agent 1708 associated with the floor entity 1724 to be subscribe to and/or publish on, the building communication channel 1802.

Figure 19:
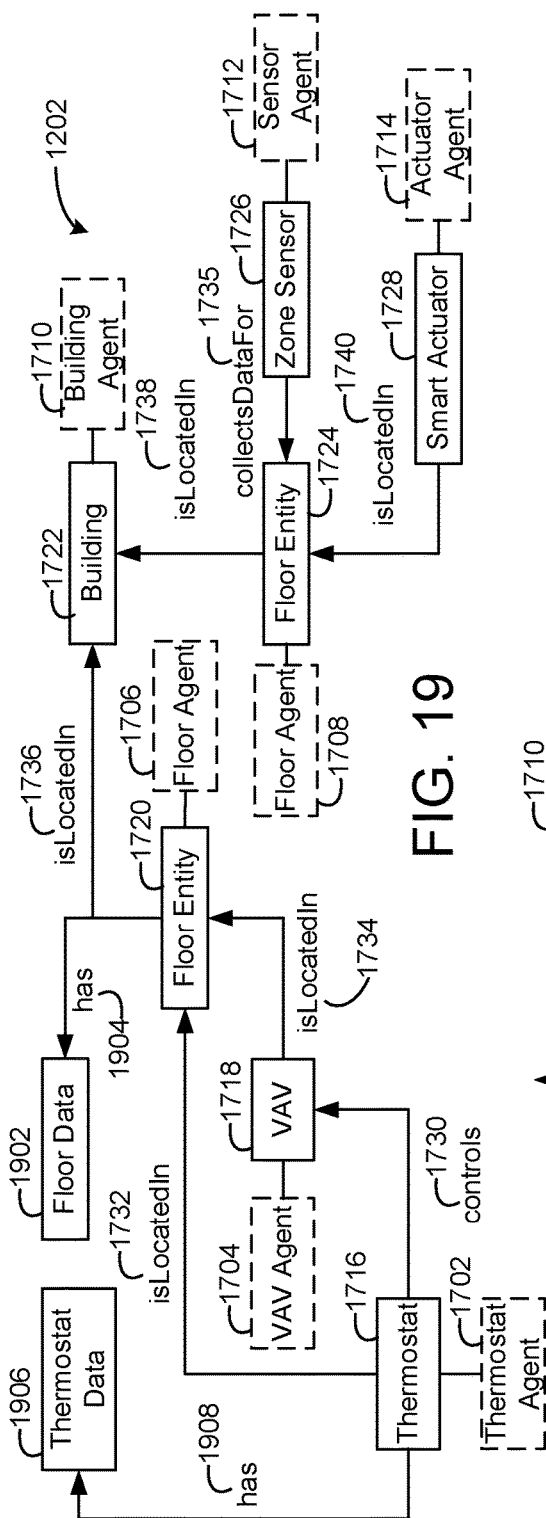
FIG. 19 is the entity database of FIG. 17 including a data entity where timeseries can be ingested, according to an exemplary embodiment.
Figure 20:
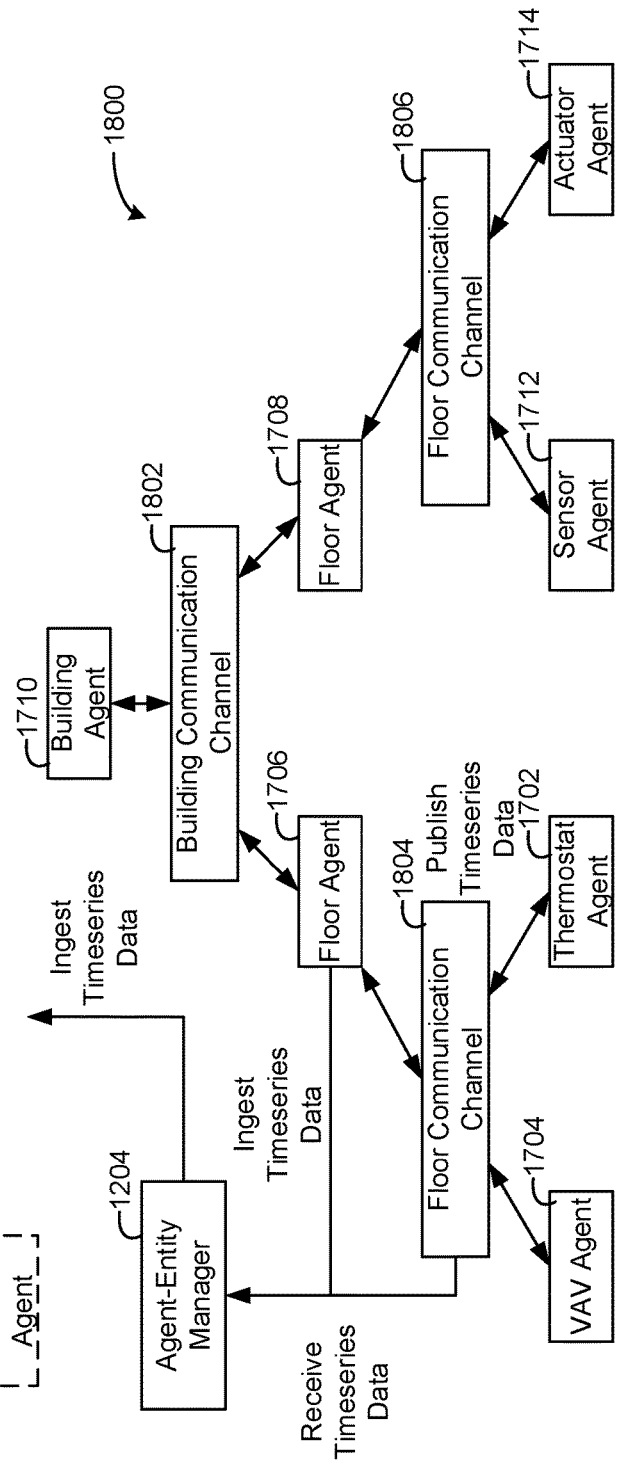
FIG. 20 is the agent channel hierarchical structure of FIG. 18 where an agent publishes timeseries data on an communication channel and the timeseries data is ingested into the data entity of the entity database of FIG. 19, according to an exemplary embodiment.

Referring now to FIG. 19-20, data is shown to be published on a communication channel and ingested into the entity database 1202, according to an exemplary embodiment. Referring particularly to FIG. 20, the thermostat agent 1702 publishes timeseries data onto the floor communication channel 1804. The timeseries data can be data of a physical thermostat that the thermostat agent 1702 operates on, and/or otherwise operates for. The timeseries data could be temperature measurements. In some embodiments, the timeseries data could be VAV control commands. In this regard, other agents subscribed to the floor communication channel 1804 can receive the published timeseries data and operate based upon the timeseries data. For example, the VAV agent 1704 could control a physical VAV based on the published timeseries data.

Furthermore, the published timeseries data can be ingested into the entity database 1202. In some embodiments, another agent subscribed to the floor communication channel 1804 is configured to ingest all timeseries data into the entity database 1202. For example, the floor agent 1706 can receive the published timeseries data and cause (e.g., by communicating with the agent-entity manager 1204) the timeseries data to be ingested. In some embodiments, the agent-entity manager 1204 is subscribed to the floor communication channel 1804 and causes the data to be ingested into the entity database 1202.

Referring more particularly to FIG. 19, the entity database 1202 includes a thermostat data entity 1906. The thermostat data entity 1906 is configured to store timeseries data associated with the thermostat entity 1716. For example, the thermostat data entity 1906 can be a timeseries data store for a particular data point. Furthermore, in some embodiments the thermostat data entity 1906 is a handle to a data storage location within the timeseries database 928.

The agent-entity manager 1204 and/or the floor agent 1706 can identify, based on the published timeseries data, a particular target entity within the entity database 1202. For example, the agent-entity manager 1204 and/or the floor agent 1706 can identify the thermostat entity 1716 as the target entity since the published timeseries data is published by the thermostat agent 1702 associated with the thermostat entity 1716. The publication can include an author identifier identifying the agent publishing the message, the corresponding entity can be identified by comparing a string of the entity to the author identifier. The agent-entity manager 1204 and/or the floor agent 1706 can identify the target entity in this manner with the author identifier.

The agent-entity manager 1204 and/or the floor agent 1706 can identify the thermostat data entity 1906 to ingest the published timeseries data into by analyzing the relationships of the thermostat entity 1716 to identify a data entity related to the thermostat entity 1716. For example, the has relationship 1908 relates the thermostat entity 1716 (an object entity) to the thermostat data entity 1906 (a data entity). Based on the relationship 1908, the agent-entity manager 1204 can ingest the published timeseries data into the thermostat data entity 1906.

In some embodiments, rather than ingesting published data published on a communication channel, the agent-entity manager 1204 and/or the floor agent 1706 can ingest timeseries data that was not published on a communication channel. For example, the floor agent 1706 can generate control decisions for a particular floor of a building. While the floor agent 1706 may publish the control decisions on the building communication channel 1802 and/or the floor communication channel 1804, the floor agent 1706 may also ingest the control decisions into the entity database 1202. Similarly, the floor agent 1706 may provide the control decisions to the agent-entity manager 1204 and cause the agent-entity manager 1204 to ingest the data into the entity database 1202.

The agent-entity manager 1204 and/or the floor agent 1706 can be configured to identify a data entity to ingest timeseries data generated by the floor agent 1706. In some embodiments, the timeseries data is occupancy data or occupancy counts for a particular floor. For example, the floor agent 1706 may collect occupancy detections from multiple different thermostats on the floor communication channel 1804 and generate a floor occupancy timeseries. The agent-entity manager 1204 and/or the floor agent 1706 can identify the floor data entity 1902 to ingest the timeseries data into by identifying a data entity (the floor data entity 1902) configured to store the timeseries data based on the "has" relationship 1904 between the floor entity 1720 related to the floor agent 1706 and the floor data entity 1902.

Figure 21:
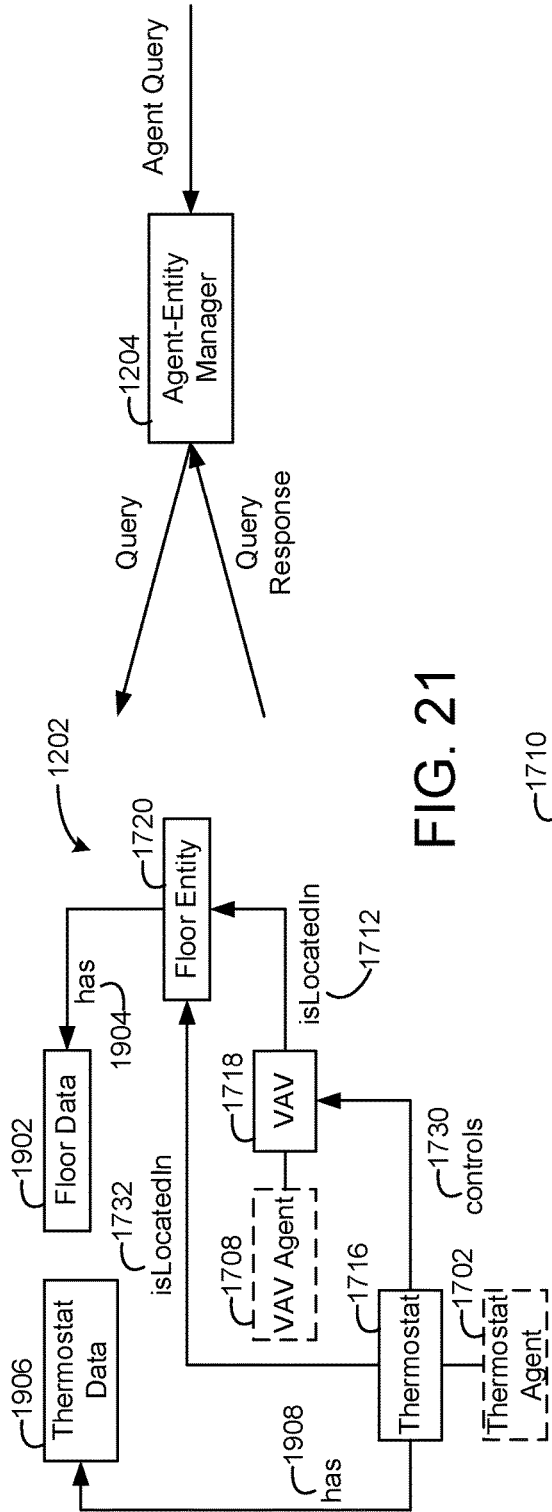
FIG. 21 is the entity database of FIG. 17 where an agent-entity manager queries the timeseries database based on a query received from an agent, according to an exemplary embodiment.
Figure 22:
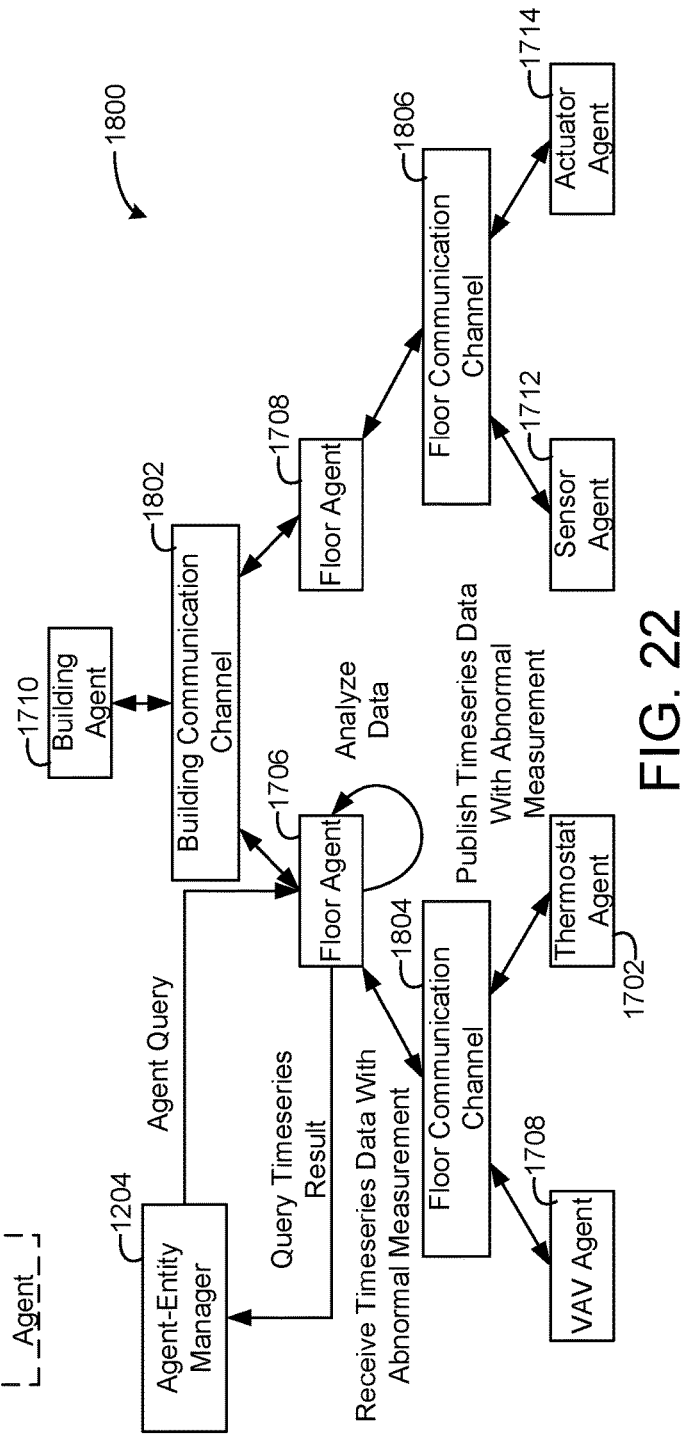
FIG. 22 is the agent channel hierarchical structure of FIG. 18 where an agent generates a query for the entity database of FIG. 21 to identify data to be analyzed to detect an abnormal timeseries data measurement, according to an exemplary embodiment.

Referring now to FIGS. 21-22, an agent is shown querying the entity database 1202 to retrieve information to analyze, according to an exemplary embodiment. In FIG. 21, the agent-entity manager 1204 queries the entity database 1202 based on an agent query received from one of the agents 1702-1714. For example, the agent may require timeseries data to be used in performing an analysis algorithm, performing a building control algorithm, etc. The agent-entity manager 1204 can retrieve the timeseries data requested by the agent query and return the result to the requesting agent.

In FIG. 22, the floor agent 1706 is shown generating an agent query. The floor agent 1706 can receive a publication on the floor communication channel 1804. The publication can be timeseries data collected (or generated) by the thermostat agent 1702 and published by the thermostat agent 1702 to the floor communication channel 1804. The published timeseries data may include an abnormal data measurement. In some embodiments, the floor agent 1706 receives the timeseries data with no indication of the abnormal measurement. The floor agent 1706 may run one or more analysis algorithms for analyzing timeseries data and detecting an abnormal data value in the timeseries data.

However, the floor agent 1706 may require additional timeseries data to perform the analysis. For example, the data of a first thermostat can be compared to data of a thermostat to determine whether the first thermostat is deviating in performance from the second thermostat. In this regard, the floor agent 1706 may generate an agent query to cause the agent-entity manager 1204 to retrieve the requested data (query the entity database 1202). Based on both the published timeseries data and the resulting timeseries query data, the floor agent 1706 can run one or more analysis algorithms, implement one or more control updates, and/or generate one or more alarms based on the analysis.

Figure 23:
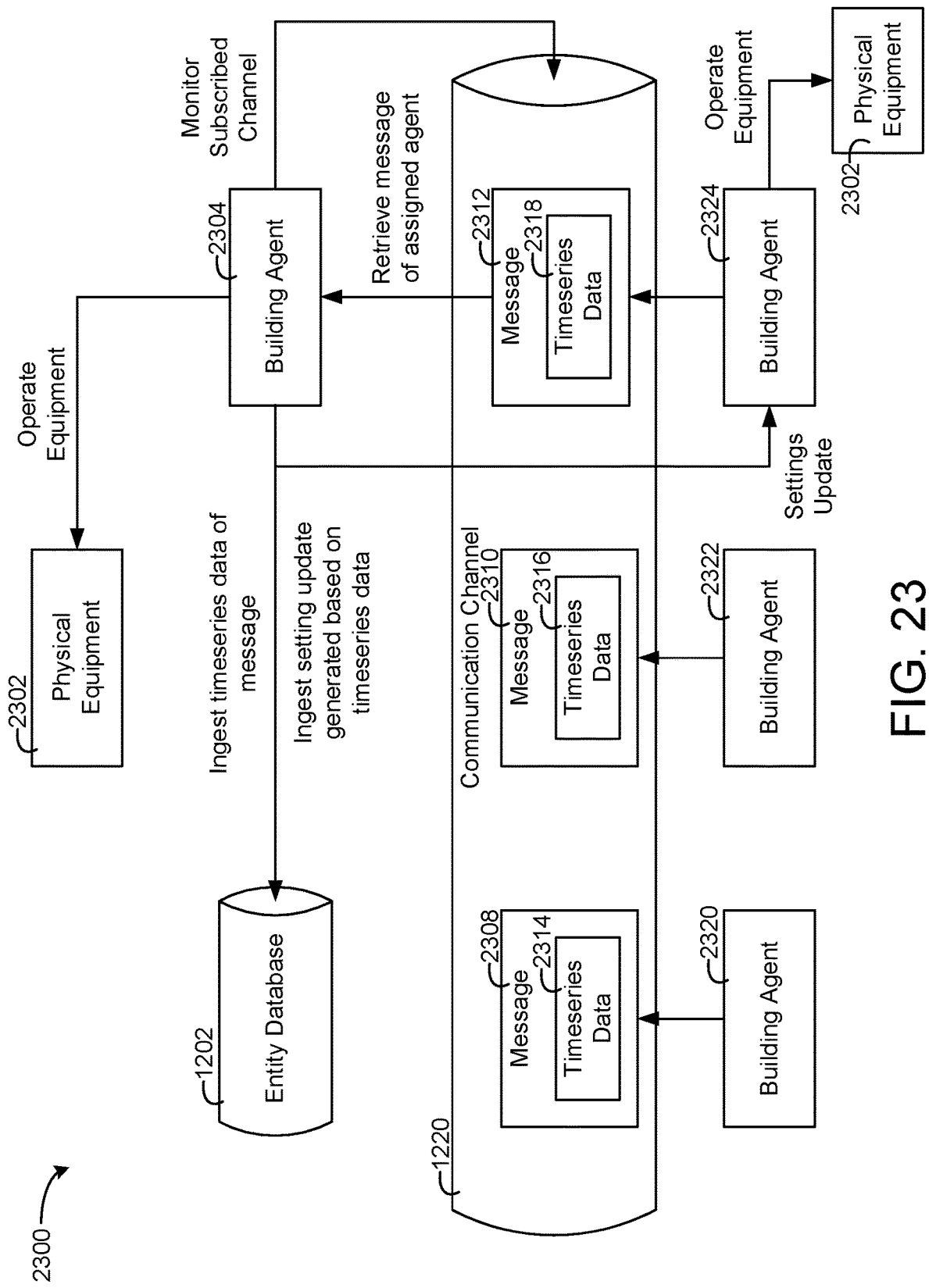
FIG. 23 is a block diagram of system where a building agent monitors a communication channel for messages of another building agent and ingests timeseries data of the message into the entity database of FIG. 18 and operates physical building equipment based on the timeseries data, according to an exemplary embodiment.

Referring now to FIG. 23, a block diagram of a system 2300 where a building entity ingests timeseries data and/or settings updates for entities is shown, according to an exemplary embodiment. The system 2300 includes a communication channel 1220 which may be the same as and/or similar to the communication channels 1802-1806 as described with reference to FIGS. 18, 20, and 22. Furthermore, the building agents 2304 and 2320-2324 can be configured to subscribe to and/or publish messages on the communication channel 1220. The building agents 2304 and 2320-2324 can be the same as or similar to the agents described with reference to FIGS. 12-22.

The building agents 2320-2324 can be configured to publish messages 2308-2312 respectively on the communication channel 1220. The messages may each include timeseries data 2314-2318 generated by, or collected by, the building agents 2320-2324. The building agent 2304 can be configured to subscribe to messages of the communication channel 1220. The building agent 2304 can be configured to handle data for a particular one of the building agents 2320-2324. For example, the building agent 2304 can be assigned to handled data for the building agent 2324. In this regard, the building agent 2304 can monitor the messages of the communication channel 1220 until a message is published by the building agent 2324 (the message 2312).

In response to identifying the message 2312 published by the building agent 2324, the building agent 2304 can be configured to retrieve the message. Based on the timeseries data 2318 of the message 2312, the building agent 2304 can ingest the timeseries data into the entity database 1202. The building agent 2304 can perform the ingestion according to the timeseries ingestion described with reference to FIGS. 19-20. Furthermore, the building agent 2304 can generate one or more settings or configuration updates for the building agent 2324. These settings and/or configuration updates can further be ingested into the entity database 1202.

Based on the settings updates, the building agent 2304 can operate physical equipment 2302. Furthermore, in some embodiments, rather than directly operating the physical equipment 2303, the building agent 2304 can publish the settings updates on the communication channel 1220. The building agent 2324 can receive the settings updates and/or operate the physical equipment 2302 based on the settings updates. The physical equipment 2303 can be configured to control one or more environmental conditions of a building and can be thermostats, air conditioners, AHUs, VAVs, and/or any other piece of equipment described with reference to FIGS. 1-5.

As an example, the building agent 2324 could be an agent for a thermostat, i.e., the physical equipment 2302 may be the thermostat. The building agent 2304 may be a space agent configured to control a particular floor of a building where the thermostat is located. The space agent can be configured to generate high level control decisions for the floor of the building while thermostat agents or other controllers perform low level implementation of the high level control decisions. Part of the high level control decisions may be generating settings updates for the thermostats. In this regard, the floor agent may receive and ingest timeseries data of thermostat on the floor into the entity database. Furthermore, based on the timeseries data of the thermostats, the building agent 2304 can generate settings updates for all and/or some of the thermostats. In this regard, the floor agent can ingest the settings updates into the entity database 1202 and/or send the settings updates to the thermostat agents. In some embodiments, the thermostat agent queries the entity database 1202 and receives the settings updates and operates the thermostat based on the settings updates.

For example, the timeseries data collected by the floor agent may be total equipment runtime. Based on the equipment runtime indicated by the timeseries data, the building agent 2304 can identify the energy usage caused by each thermostat and/or collectively for the floor. The floor agent may include one or more goals for reducing the energy usage of the floor to a particular amount and can generate one or more settings for each of the thermostat agents. The settings updates may indicate an energy usage amount for each thermostat. The floor thermostat can ingest the energy usage amounts into the entity database 1202 and/or deploy the energy usage amounts to each of the thermostat which in turn may operate physical equipment to meet the goal identified by the floor agent. In some embodiments, each thermostat entity can query the entity database 1202 to retrieve the energy usage amounts for the respective thermostat.

Figure 24:
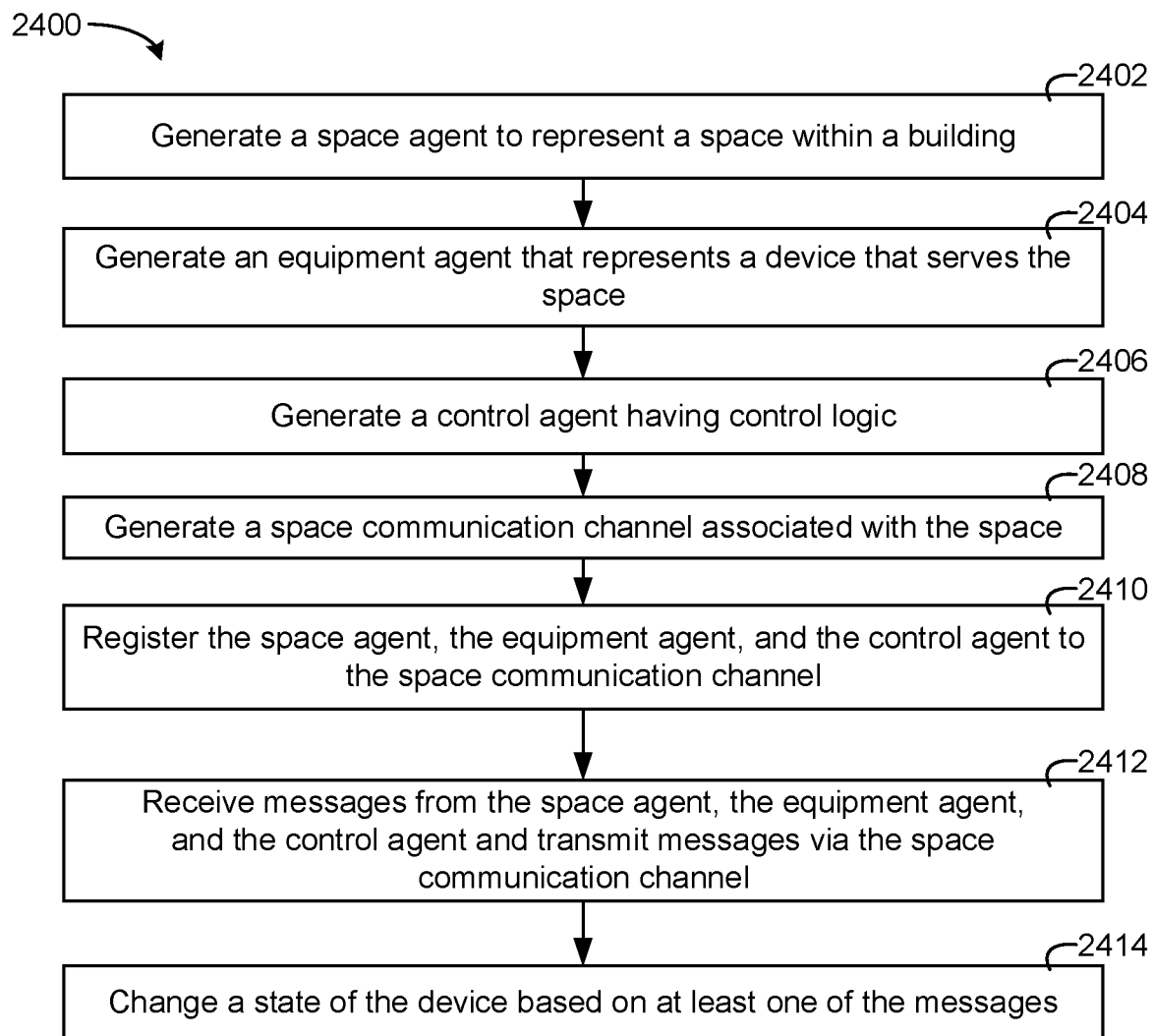
FIG. 24 is a flow diagram of a process of generating agents for the entities of the entity database of FIG. 18, generating communication channels for the agents to communicate on, and control physical devices by the agents based on the communicated data that can be performed by the agent-entity system of FIGS. 12-13, according to an exemplary embodiment.

Referring now to FIG. 24, a flow diagram illustration a process 2400 for a building management system simulation is shown, according to an exemplary embodiment. In some embodiments, the cloud building management platform 620 is configured to perform some and/or all of the steps of the process 2400. Furthermore, in some embodiments, components of the cloud building management platform 620 can be configured to perform some and/or all of the steps of the process 2400, e.g., the agent-entity manager 1204 and/or the agent service 1214. In some embodiments, the agents described with reference to FIGS. 12-23 are configured to perform some and/or all of the process 2400. Any other computing system and/or device described herein can be configured to perform the process 2400.

In step 2402, the process 2400 starts and a space agent is generated by the agent service 1214 to represent a space within a building. In some embodiments, the space may be the building, floor, room, zone, and/or the like. In some embodiments, the space agent is configured to maintain an environmental condition (e.g., temperature setpoint, schedule, occupancy status, and/or the like) of the space based on an optimization state (e.g., optimized for costs, optimized for comfort, and/or the like) of the space.

In step 2404, an equipment agent is generated by the agent service 1214 to represent a device that serves the space. In some embodiments, the device may be, for example, a BMS device, such as a thermostat, temperature sensor, AHU, VAV, and/or the like. In other embodiments, the device may be any suitable device, such as an audio visual device, blinds or shades, digital clock, and/or the like. In some embodiments, the equipment agent controls and/or monitors the device, such that the equipment agent has the same input/output functions of the device. In some embodiments, the device is located within the space, whereas in other embodiments, the device is located outside the space but configured to serve the space.

In step 2406, a control agent is generated by the agent service 1214. In some embodiments, the control agent has control functions that override or optimize various control functions. In some embodiments, the control agent may be, for example, a global data sharing agent, a temporary occupancy override agent, a scheduled exception agent, a flow setpoint reset agent, an optimal start/stop agent, a reheat valve control agent, an unoccupied mode night setback agent, a chiller sequencing agent, and/or the like. In some embodiments, the control functions (or control logic) may correspond to the optimization state of the space. In some embodiments, the control functions override the optimization state of the space. For example, if the optimization state of the space is to conserve energy at a certain time of day, the control function may override the optimization state for occupant comfort during the certain time of day when the space is still occupied.

In step 2408, a space communication channel associated with the space may be generated by the agent service 1214. In some embodiments, each of the space agent, equipment agent, and control agent may be registered on the space communication channel in step 2410. In some embodiments, each of the space agent, equipment agent, and control agent may be configured to publish and/or subscribe to messages received on the space communication channel.

In step 2412, published messages may be received from the space agent, the equipment agent, and/or the control agent and transmitted to at least one of the space agent, the equipment agent, or the control agent via the space communication channel. In step 2414, a state of the device may be changed based on at least one of the messages in step 2412. For example, if the device is a VAV and the message relates to a changed temperature setpoint, the VAV may open a damper to change its state based on the temperature setpoint.

In some embodiments, the space may be a room within a building, and a floor agent may be generated by the agent service 1214 to represent a floor within the building on which the room is located. In some embodiments, the agent service 1214 may generate a building agent to represent the building. In some embodiments, the agent service 1214 may generate a floor communication channel associated with the floor and a building communication channel associated with the building. In some embodiments, the building agent and the floor agent may be registered on the building communication channel to exchange messages. In some embodiments, the floor agent and the room agent may be registered on the room communication channel to exchange messages. In some embodiments, the building agent may override controls of the other agents (e.g., floor agent, room agent, equipment agent, and/or control agent) by publishing messages over the building communication channel, and the floor agent may override controls of the other agents by publishing messages on the floor communication channel.

Figure 25:
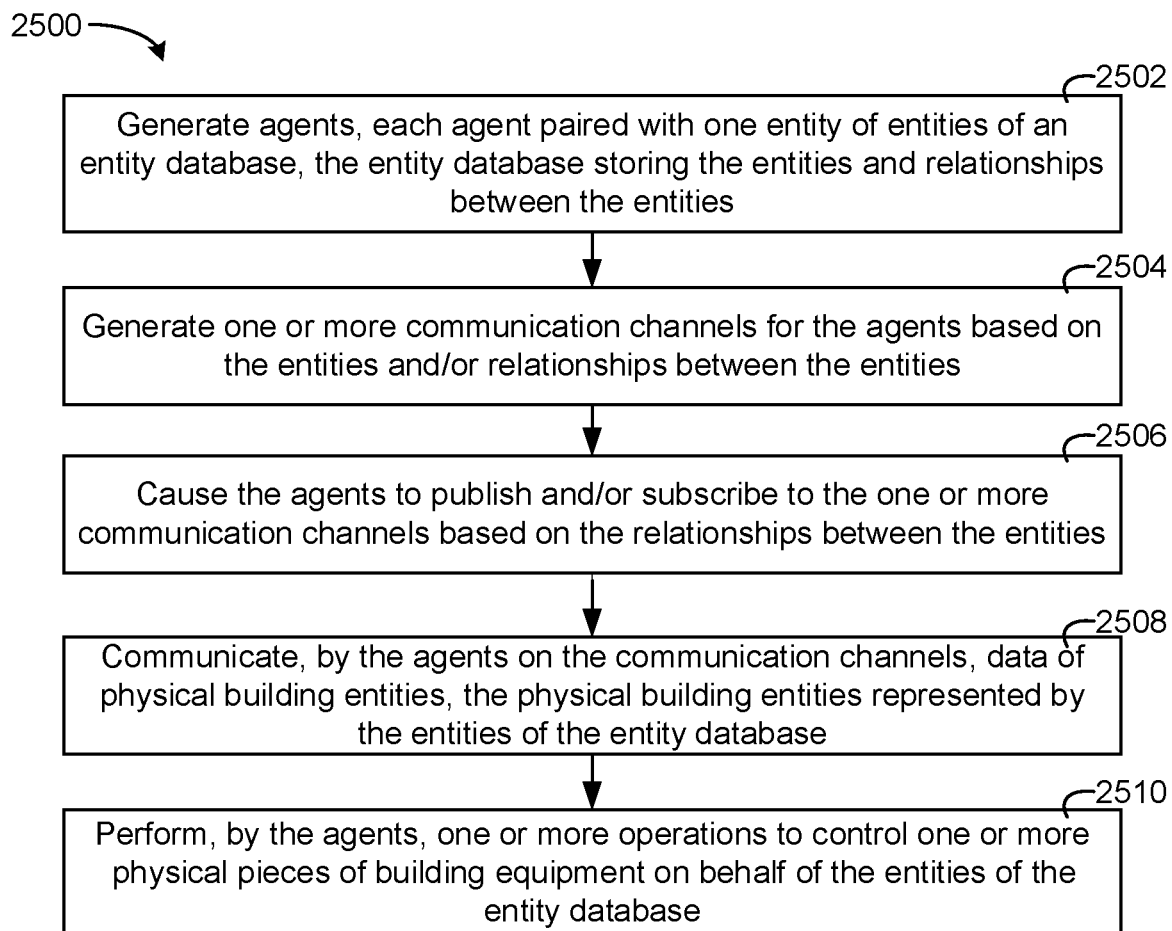
FIG. 25 is a flow diagram of a process of generating pairs between entities of the entity database of FIG. 18 and agents corresponding to each of the entities that can be performed by the agent-entity system of FIGS. 12-13, according to an exemplary embodiment.

Referring now to FIG. 25, a process 2500 of generating agent-entity pairs for operating physical devices is shown, according to an exemplary embodiment. In some embodiments, the cloud building management platform 620 is configured to perform some and/or all of the steps of the process 2500. Furthermore, in some embodiments, components of the cloud building management platform 620 can be configured to perform some and/or all of the steps of the process 2500, e.g., the agent-entity manager 1204 and/or the agent service 1214. In some embodiments, the agents described with reference to FIGS. 12-23 are configured to perform some and/or all of the process 2500. Any other computing system and/or device described herein can be configured to perform the process 2500.

In step 2502, the agent service 1214 generates agents where each agent is paired with an entity of an entity database, the entity database storing the entities and relationships between the entities. For example, the agent service 1214 can identify entities of particular types within the entity database 1202. For example, entities representing spaces, buildings, equipment, etc. For each of the entities, a corresponding agent can be generated by the agent service 1214 such that each agent is paired with one of the entities.

In step 2504, the agent service 1214 generates one or more communication channels for the agents generated in the step 2502 to communicate on based on the entities of the entity database and/or the relationships between the entities. For example, some entities and/or patterns between the entities identified by the relationships between the entities, the agent service 1214 can generate corresponding communication channels. For example, for a building entity, the agent service 1214 can identify that a corresponding communication channel should be generated. Certain types of entities, e.g., entities representing buildings, floors rooms, etc. can be stored in a list by the agent service 1214. In response to detecting an entity of a type of the types store din the list, the agent service 1214 can generate a corresponding communication channel.

In some embodiments, the agent service 1214 identifies a pattern of entities and relationships. Based on an identification of the pattern, the agent service 1214 can generate an agent corresponding to the pattern. For example, a zone sensor entity and a smart actuator entity may each include a relationship to a space entity indicating that a physical sensor and a physical actuator are located in the same physical space. Furthermore, the smart actuator entity may have a relationship to the zone sensor entity indicating that the physical smart actuator operates based on measurements of the physical zone sensor. In this regard, a control communication channel for agents responsible for operating the sensor and actuator can be generated.

In step 2506, the agent service 1214 causes the agents generated in the step 2502 to be configured as publishers and/or subscribers to the communication channels generated in the step 2504. In some embodiments, the agent service 1214 can identify relationships of the entity database 1202 indicative of a subscription and/or publish configuration. For example, referring to FIG. 18, the sensor agent 1712 and the actuator agent 1714 can be subscribed to and/or configured to publish on, the floor communication channel 1806. The agent service 1214 can identify the communication configuration by analyzing the entity database 1202, i.e., by identifying that the smart actuator entity 1728 has a relationship 1740 (isLocatedIn) to the floor entity 1724 (the entity for which the channel 1806 is generated). A similar relationship 1735 (collectsDataFor) can be identified to cause the sensor agent 1712 to be configured to subscribe to and/or publish on the floor communication channel 1806.

In step 2508, the agents generated in the step 2502 can communicate on the communication channels generated in the step 2504 based on the publication and/or subscription configurations generated in the step 2506. The agents, each based on their respective subscription and/or publication configurations, can publish data to the communication channels and/or receive data of the communication channels they are subscribed to. In some embodiments, the data of each of the agents may be data of physical entities (e.g., building equipment). For example, a thermostat agent may publish data collected by, and/or generated by, a physical thermostat. Furthermore, the data communication can be agent generated information, e.g., operating settings updates, control commands, equipment performance predictions, analytics data, etc. In some embodiments, rather than representing physical equipment, the agents can represent physical spaces, control algorithms, etc. For example, a particular space may have an agent analyzing occupant activities in the space (e.g., temperature setpoint requests, occupancy times, etc.) and can identify a comfort schedule for the space which the space agent can publish to a corresponding space communication channel.

In step 2510, the agents can perform one or more operations to control physical pieces of building equipment on behalf of the entities represented by the agents. The agents can operate based on data of the agents received via the communication channels from other agents. For example, a sensor agent may receive sensor data for a physical sensor, cleanse and/or improve the sensor data, and publish the sensor data on a space communication channel. An environmental controller agent subscribed to the space communication channel can receive the published sensor data and perform one or more control settings updates to control an environmental space based on the sensor data.

Figure 26:
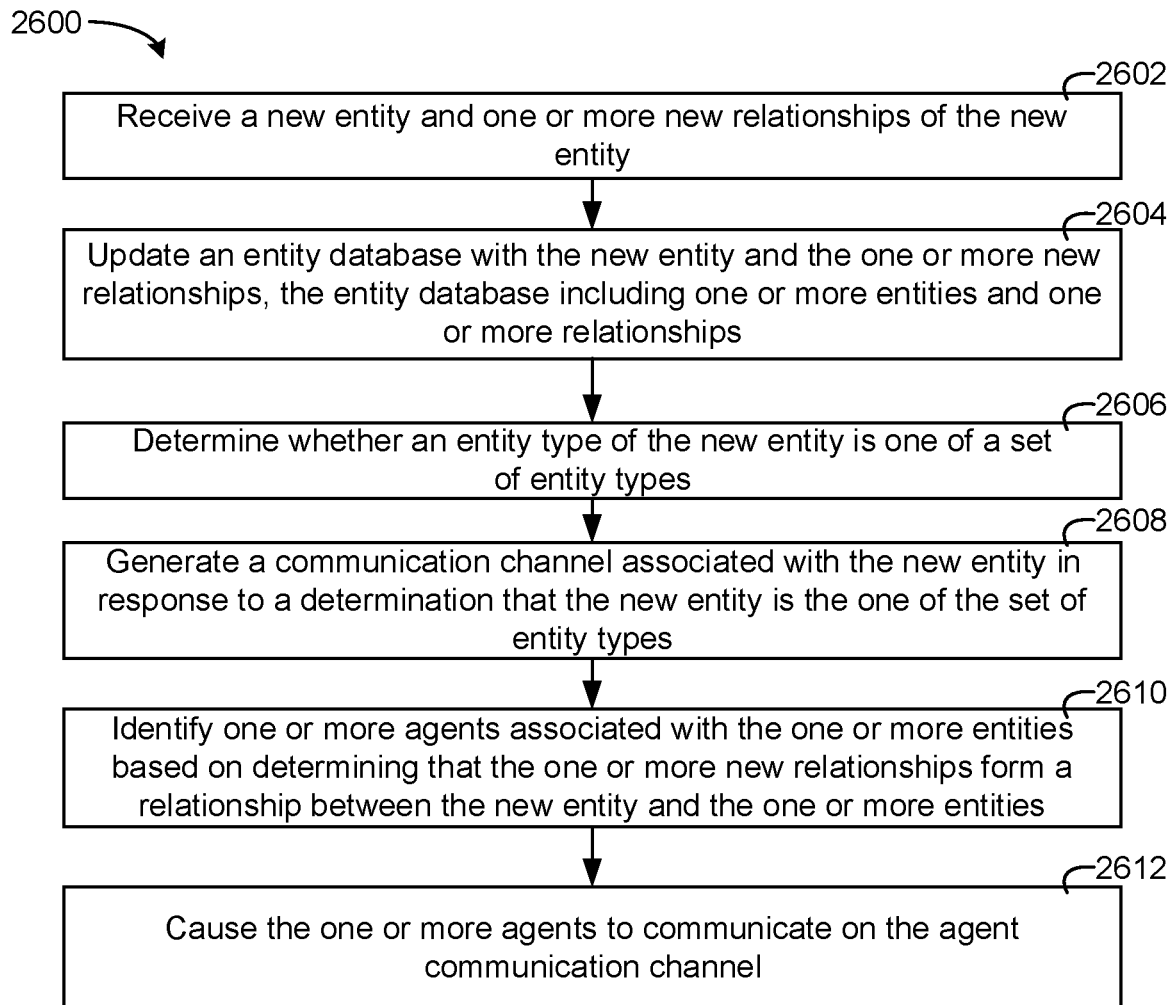
FIG. 26 is a flow diagram of a process of receiving a new entity for the entity database of FIG. 18 and generating a communication channel based on the new entity that can be performed by the agent-entity system of FIGS. 12-13, according to an exemplary embodiment.

Referring now to FIG. 26, a process 2600 of generating an agent communication channel based on an entity update is shown, according to an exemplary embodiment. In some embodiments, the cloud building management platform 620 is configured to perform some and/or all of the steps of the process 2600. Furthermore, in some embodiments, components of the cloud building management platform 620 can be configured to perform some and/or all of the steps of the process 2600, e.g., the agent-entity manager 1204 and/or the agent service 1214. In some embodiments, the agents described with reference to FIGS. 12-23 are configured to perform some and/or all of the process 2600. Any other computing system and/or device described herein can be configured to perform the process 2600.

In step 2602, the cloud building management platform 620 receives an update to the entity database 1202, the update can be a new entity and/or one or more new relationships associated with the new entity. In some embodiments, the new entity and the one or more new relationships can be defined by a user, i.e., a user may review, via a user device (e.g., the client devices 548) the entities and relationships of the entity database 1202. In some embodiments, the user may cause one or more entities and/or relationships between entities to be added to the entity database 1202 by providing input via the client devices 548. In step 2604, based on the new entity and the one or more new relationships, the cloud building management platform 620 can cause the entity database 1202 to store the new entity and/or the one or more new relationships.

In step 2606, the agent service 1214 can analyze the new entity to identify a type of the new entity and whether the type is one of a set of types. The set of types may indicate particular entity types for which communication channels should be generated. The types could be particular spaces, e.g., campuses, buildings, floors, rooms, zones, etc. In step 2608, in response to a determination that the new entity is an entity type of the set of entity types, the agent service 1214 can generate a communication channel associated with the new entity. The new communication channel can be the same as or similar to, the communication channels described with reference to FIGS. 12-23.

In step 2610, the agent service 1214 identifies one or more agents associated with one or more entities that should be configured to communication on the communication channel generated in the step 2608 by determining that the one or more new relationships form a relationship between the one or more entities and the new entity. In response to this identification, in step 2612, the agent service 1214 can configured the one or more agents to communicate on the communication channel generated in the step 2608.

Figure 27:
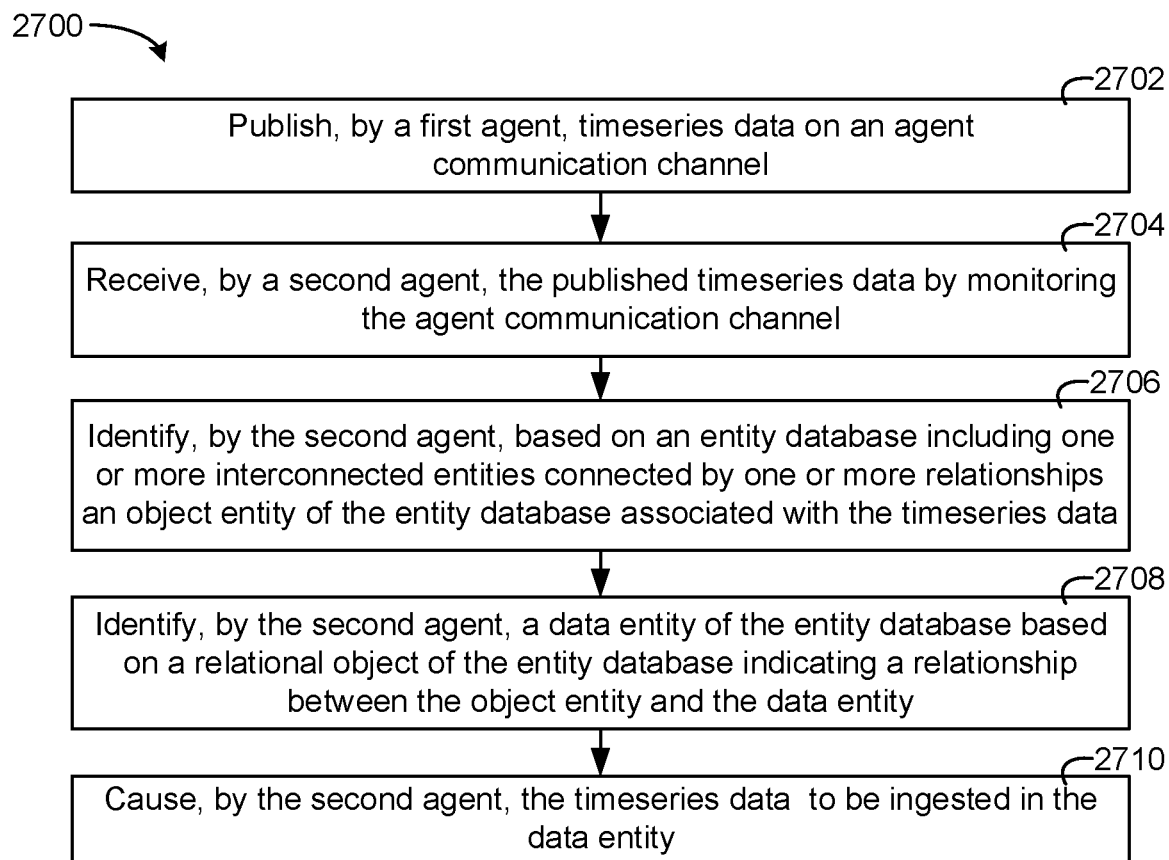
FIG. 27 is a flow diagram of a process of ingesting timeseries data into a data entity of the entity database of FIG. 18, the timeseries data published by agents on a communications channel, where the process can be performed by the agent-entity system of FIGS. 12-13, according to an exemplary embodiment.

Referring now to FIG. 27, a process 2700 of ingesting timeseries data into an entity database by an agent is shown, according to an exemplary embodiment. In some embodiments, the cloud building management platform 620 is configured to perform some and/or all of the steps of the process 2700. Furthermore, in some embodiments, components of the cloud building management platform 620 can be configured to perform some and/or all of the steps of the process 2700, e.g., the agent-entity manager 1204 and/or the agent service 1214. In some embodiments, the agents described with reference to FIGS. 12-23 are configured to perform some and/or all of the process 2700. Any other computing system and/or device described herein can be configured to perform the process 2700.

In the process 2700, some of the steps are performed by a first agent while other steps are performed by a second agent. In some embodiments, the process 2700 is performed by a single agent such that a single agent publishes timeseries data and ingests the timeseries data into an entity database. In some embodiments, an agent publishes timeseries data to a communication channel and the agent-entity manager 1204 monitors the communication channel and ingests the timeseries data into the entity database.

In step 2702, a first agent can publish timeseries data on an agent communication channel. The timeseries data can be environmental measurement data at points in time, fault timeseries identifying fault presence over time, control timeseries indicating control settings over time, etc. The first agent can be associated with a first piece of building equipment and can be configured to receive the timeseries data from the first piece of physical building equipment. In some embodiments, the first agent itself generates the timeseries data. The agent represents physical spaces in some embodiments and the timeseries data of the physical space can be based on agent generated information and/or other timeseries data received from other agents associated with physical equipment of the space. For example, the timeseries data published by the agent can first be generated from other timeseries data, e.g., the agent can perform the timeseries processing operations described with reference to FIG. 9 and elsewhere herein.

The first agent may include and/or store communication configuration identifying the agent to publish and/or subscribe to various communication channels. In some embodiments, the configuration indicates that certain types of data should be published on certain communication channels. The first agent can, based on the stored communication configuration, publish the timeseries data on the agent communication channel.

In step 2704, a second agent monitoring the agent communication channel receive the published timeseries data. The second agent can be configured to perform various control operations based on the published timeseries data, perform various analytics based on the timeseries data. In some embodiments, the second agent stores a communication configuration causing the second agent to be subscribed to the agent communication channel. The communication configuration can cause the second agent to publish and/or subscribe to one or multiple different communication channels. In some embodiments, based on the timeseries data, the second agent generates one or more settings updates for the first agent to operate based on.

In step 2706, the second agent identifies, based on an entity database including one or more interconnected entities connected by one or more relationships, an object entity of the entity database associated with the timeseries data. The second agent can identify a particular object entity of the entity database associated with the first entity that originally published the timeseries data. In step 2708, based on the identified entity, the second entity can identify a data entity linked to the object entity by a relationship. The object entity may be a type of entity representing physical equipment (e.g., a space entity, a building entity, an equipment entity) while the data entity may represent a data point (e.g., a temperature data point, a settings data point, etc.). Since the data entity is related to the object entity, the second agent can determine to ingest the timeseries data in the data entity.

In step 2710, the second agent can ingest the timeseries data into the data entity. In this regard, a copy of the original timeseries data can be saved within the entity database. In some embodiments, other data is ingested into to the data entity, or another data entity related to the object entity. For example, the second agent may perform timeseries processing to generate additional timeseries data based on the published timeseries data of the step 2702 can cause the additional timeseries data to be ingested into the entity database. In some embodiments, the second agent generates operating settings (e.g., temperature setpoints, valve positions, energy usage targets, etc.) for the first agent and communications the operating settings back to the first agent and/or ingests the operating settings into the entity database.

Figure 28:
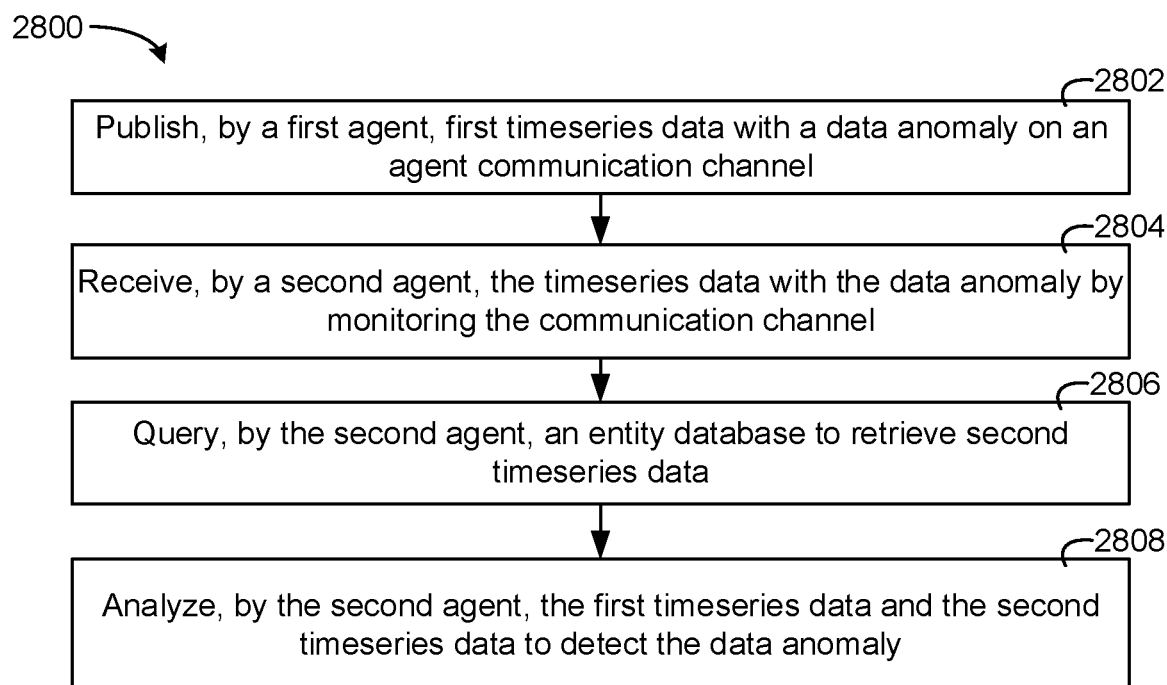
FIG. 28 is a flow diagram of a process of querying the entity database of FIG. 18 to extract information to be used to analyze timeseries data that can be performed by the agent-entity system of FIGS. 12-13, according to an exemplary embodiment.

Referring now to FIG. 28, a process 2800 of performing timeseries data analysis is shown, according to an exemplary embodiment. In some embodiments, the cloud building management platform 620 is configured to perform some and/or all of the steps of the process 2800. Furthermore, in some embodiments, components of the cloud building management platform 620 can be configured to perform some and/or all of the steps of the process 2800, e.g., the agent-entity manager 1204 and/or the agent service 1214. In some embodiments, the agents described with reference to FIGS. 12-23 are configured to perform some and/or all of the process 2800. Any other computing system and/or device described herein can be configured to perform the process 2800.

In the process 2800, some of the steps are performed by a first agent while other steps are performed by a second agent. In some embodiments, the process 2800 is performed by a single agent such that a single agent publishes timeseries data and analyzes the timeseries data to detect a data anomaly. In some embodiments, an agent publishes timeseries data to a communication channel and the agent-entity manager 1204 monitors the communication channel and analyzes the timeseries data to detect the data anomaly.

In step 2802, a first agent publishes timeseries data including a data anomaly on an agent communications channel. The step 2802 may be the same as, or similar to, the step 2702 as described with reference to FIG. 27. The timeseries data can include a data anomaly, i.e., one or more data points that indicate an underlying fault and/or abnormal operation of the first agent and/or physical equipment associated with the first agent. A second agent can be assigned to analyze the timeseries data to detect the data anomaly and generate one or more resolutions to the data anomaly, e.g., cause the first agent to reset, recalibrate the first agent and/o the equipment associated with the first agent, generate a fault report for review by a user and/or service repair individual, etc.

In step 2804, the second agent receives the timeseries data published on by first agent in the step 2802. The second agent can be subscribed to the communication channel. The step 2804 can be the same as or similar to the step 2704. In step 2806, the second agent can query an entity database to retrieve second timeseries data. In some embodiments, the second agent can identify the data anomaly within the first timeseries data. However, the second agent may require additional timeseries data to perform the analysis. For example, the second agent may require historical data of the first agent. Furthermore, the second agent may require timeseries data of similar agents in order to compare the performance of the first agent to another agent. In this regard, the second agent can generate a query for timeseries data for a first entity associated with the first agent and/or for a second entity of the same type as the first entity.

In step 2808, the second agent analyzes the first timeseries data received in the step 2804 and the second timeseries data. The analysis can be a timeseries analysis configured to compare differences between the first timeseries data and the second timeseries data to identify normal data value ranges and abnormal data measurements, i.e., the data anomaly. In some embodiments, when the second timeseries data is historical data of the first agent, the analysis can identify whether the performance of the agent and/or the equipment associated with the first agent is drifting from a normal performance level to an abnormal performance level.

Figure 29:
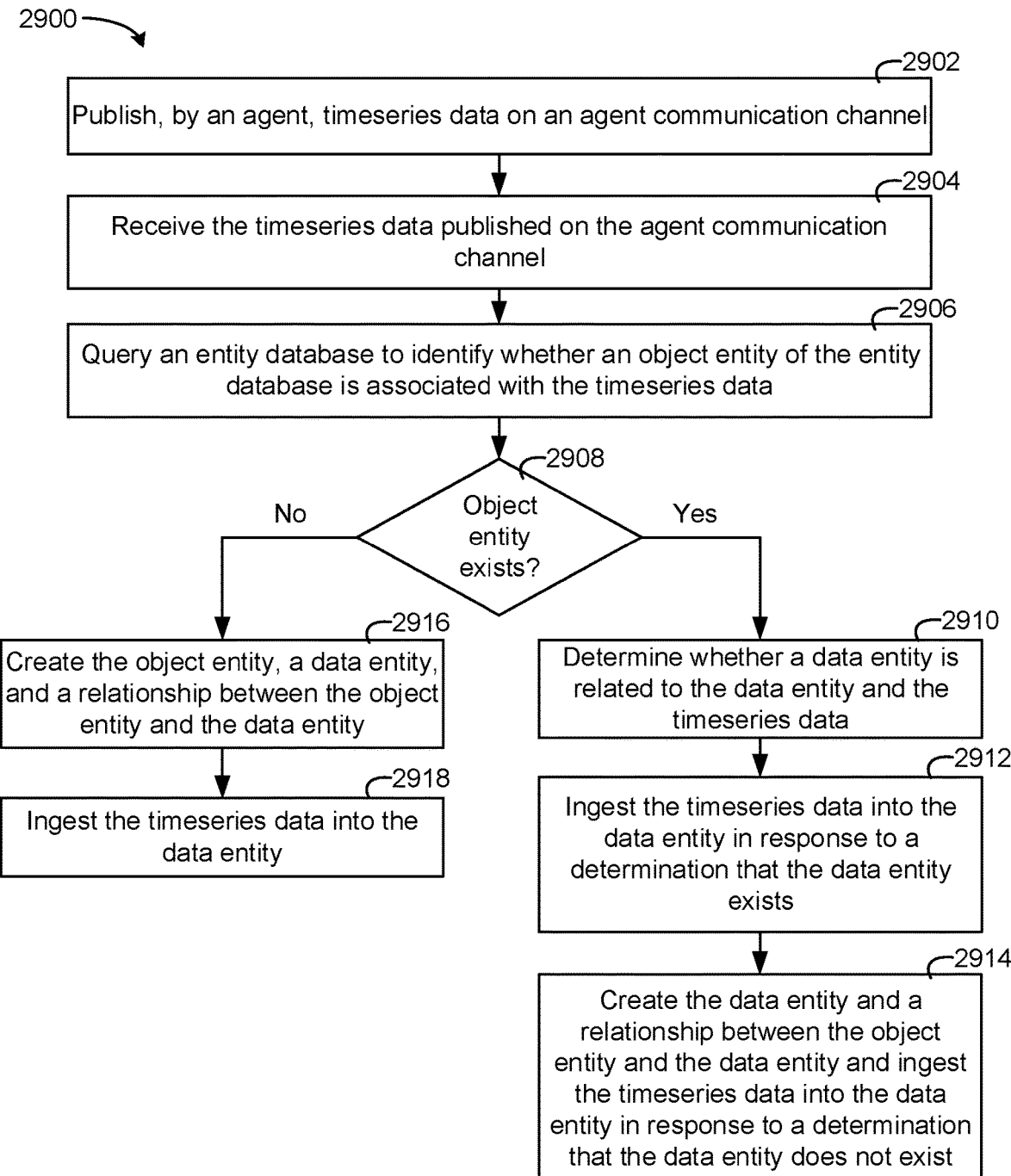
FIG. 29 is a flow diagram of a process of ingesting timeseries into the entity database of FIG. 18 and generating new data entities that can be performed by the agent-entity system of FIGS. 12-13, according to an exemplary embodiment.

Referring now to FIG. 29, a process 2900 of generating new entities and ingesting timeseries data into an entity database based on publications by an agent is shown, according to an exemplary embodiment. In some embodiments, the cloud building management platform 620 is configured to perform some and/or all of the steps of the process 2900. Furthermore, in some embodiments, components of the cloud building management platform 620 can be configured to perform some and/or all of the steps of the process 2900, e.g., the agent-entity manager 1204 and/or the agent service 1214. In some embodiments, the agents described with reference to FIGS. 12-23 are configured to perform some and/or all of the process 2900. Any other computing system and/or device described herein can be configured to perform the process 2900.

In the process 2900, some of the steps are performed by a first agent while other steps are performed by a second agent. In some embodiments, the process 2900 is performed by a single agent such that a single agent publishes timeseries data, causes new entities to be generated and added to an entity database, and causes the timeseries data to be ingested into the entity database. In some embodiments, an agent publishes timeseries data to a communication channel and the agent-entity manager 1204 monitors the communication channel, adds new entities to the entity database, and ingests the data into the entity database.

In step 2902, an agent publishes timeseries data on an agent communication channel. The step 2902 may be the same as, or similar to, the steps 2702 and/or 2704 as described with reference to FIGS. 27 and 28. In step 2904, the timeseries data published on the agent communication channel is received. Another agent, or the agent-entity manager 1204 can be subscribed to the agent communication channel and can receive the timeseries data. The step 2904 can be the same as, or similar to, the steps 2704 and/or 2804 as described with reference to FIGS. 27 and 28.

In step 2906, an entity database is queried to determine whether an entity of the entity database is associated with the timeseries data published and received in the steps 2902 and 2904. The query can be generated to identify entities associated with the agent that published the data in the step 2902. In some embodiments, a second agent generates the query and queries the entity database 1202 to identify whether an entity exists associated with the agent. The query may specify a type for the entity, i.e., an object entity. In some embodiments, the agent-entity manager 104 queries the entity database 1202 instead of, or on behalf of the second or first agent.

In step 2908, based on the result of the query, an agent and/or the agent-entity manager 104 can determine whether to proceed to steps 2916-2918 or steps 2910-2914. If the object entity does not exist for the agent of the step 2902, the process 2900 proceeds to create the object entity, a data entity, and a relationship between the object entity and the data entity in the step 2916. The object entity can be generated to be a type corresponding to the agent of the step 2902. For example, if the agent is a building agent, the object entity generated can be a building entity. Similarly, if the agent is a thermostat agent, the object entity generated can be a thermostat agent. Once the object entity and the data entity are generated, in step 2918, the timeseries data can be ingested into the data entity.

The process 2900 can proceed to step 2910 is the object entity does exist. In step 2910, a determination can be made whether a data entity is related to the object entity. For example, the entity database may include a relationship between the object entity and a data entity. If no such relationship exists, the object entity may not be associated with any data entity. In response to a determination that the data entity exists, the timeseries data can be ingested into the data entity in step 2912. However, if the data entity does not exist, the data entity can be generated along with a relationship to the object entity and the timeseries data is ingested into the data entity in the step 2914.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method of agent management for a building, the method comprising:
generating, by one or more processing circuits, a plurality of agents, each agent of the plurality of agents paired with one entity of a plurality of entities of an entity database, wherein the entity database comprises a plurality of relationships between the plurality of entities, wherein the plurality of entities represent physical building entities of the building comprising building equipment or building spaces;
generating a plurality of agent communication channels corresponding to the plurality of entities;
causing the plurality of agents to publish or subscribe to the plurality of agent communication channels based on the entities with which the agents are paired and the relationships between the plurality of entities;
communicating, by the one or more processing circuits via the plurality of agents, data of the physical building entities via the plurality of agent communication channels; and
performing, by the one or more processing circuits via the plurality of agents, one or more operations for the plurality of entities based on the data.

2. The method of claim 1, further comprising:
identifying, by the one or more processing circuits, one or more agents of the plurality of agents associated with each agent communication channel of the plurality of agent communication channels based on the plurality of entities and the plurality of relationships;
instantiating, by the one or more processing circuits, the plurality of agent communication channels; and
causing, by the one or more processing circuits, the plurality of agents to communicate on the plurality of agent communication channels.

3. The method of claim 1, further comprising:
generating, by the one or more processing circuits, a channel configuration for each of the plurality of agents causing each of the plurality of agents to perform at least one of publishing information to one or more agent communication channels of the plurality of agent communication channels or subscribing to the one or more agent communication channels; and
communicating, by the one or more processing circuits, the channel configuration of each of the plurality of agents to each of the plurality of agents.

4. The method of claim 1, wherein the plurality of agents comprise a first agent and a second agent, wherein the first agent is associated with a first entity of the plurality of entities and the second agent is associated with a second entity of the plurality of entities.

5. The method of claim 4, further comprising:
generating, by the one or more processing circuits, an agent communication channel for a third entity of the plurality of entities; and
identifying, by the one or more processing circuits, the first agent and the second agent by identifying a first relationship between the first entity and the third entity and a second relationship between the second entity and the third entity based on the plurality of relationships.

6. The method of claim 5, further comprising generating, by the one or more processing circuits, the agent communication channel for the third entity of the plurality of entities by determining that an entity type of the third entity is a particular entity type of a plurality of different entity types.

7. The method of claim 6, wherein the particular entity type is a space type defining at least one of a room, a zone, or the building.

8. A building management system of a building comprising one or more memory devices configured to store instructions thereon, that, when executed by one or more processors, cause the one or more processors to:
generate a plurality of agents, each agent of the plurality of agents paired with one entity of a plurality of entities of an entity database, wherein the entity database comprises a plurality of relationships between the plurality of entities, wherein the plurality of entities represent physical building entities of the building comprising building equipment or building spaces;
generate a plurality of agent communication channels corresponding to the plurality of entities;
cause the plurality of agents to publish or subscribe to the plurality of agent communication channels based on the entities with which the agents are paired and the relationships between the plurality of entities;
communicate, by the plurality of agents, data of the physical building entities via the plurality of agent communication channels; and
perform, by the plurality of agents, one or more operations for the plurality of entities based on the data.

9. The building management system of claim 8, wherein the instructions cause the one or more processors to:
query, by a first agent of the plurality of agents, the entity database to identify a communication channel associated with the first agent;
update, by the first agent, one or more communication configurations of the first agent causing the first agent to communicate on the communication channel; and
communicate, by the first agent, on the communication channel.

10. The building management system of claim 8, wherein the instructions cause the one or more processors to:
identify one or more agents of the plurality of agents associated with each agent communication channel of the plurality of agent communication channels based on the plurality of entities and the plurality of relationships;
instantiate the plurality of agent communication channels; and
cause the plurality of agents to communicate on the plurality of agent communication channels.

11. The building management system of claim 8, wherein the instructions cause the one or more processors to:
generate a channel configuration for each of the plurality of agents causing each of the plurality of agents to perform at least one of publishing information to one or more agent communication channels of the plurality of agent communication channels or subscribing to the one or more agent communication channels; and communicate the channel configuration of each of the plurality of agents to each of the plurality of agents.

12. The building management system of claim 8, wherein the building management system further comprises a plurality of devices, wherein each of the plurality of devices is configured to run one of the plurality of agents, wherein the plurality of devices are at least one of a sensor, an actuator, or a controller.

13. The building management system of claim 8, wherein the instructions cause the one or more processors to run each of the plurality of agents.

14. The building management system of claim 8, wherein the instructions cause the one or more processors to:
receive an update to the entity database, the update comprising a new entity and an entity type for the new entity;
identify whether the entity type of the new entity is a particular entity type of a plurality of entity types; and
instantiate a second agent communication channel associated with the new entity in response to a determination that the entity type of the new entity is the particular entity type.

15. The building management system of claim 14, wherein the update to the entity database comprises one or more new relationships to one or more existing entities of the entity database, wherein each of the one or more existing entities are associated with an existing agent;
wherein the instructions cause the one or more processors to:
identify the one or more existing entities based on the one or more new relationships;
identify the existing agent associated with each of the one or more existing entities; and
cause the existing agent associated with each of the one or more existing entities to communicate on the second agent communication channel.

16. The building management system of claim 8, wherein the plurality of agents comprise a first agent and a second agent, wherein the first agent is associated with a first entity of the plurality of entities and the second agent is associated with a second entity of the plurality of entities.

17. The building management system of claim 16, wherein the instructions cause the one or more processors to:
generate an agent communication channel for a third entity of the plurality of entities; and
identify the first agent and the second agent by identifying a first relationship between the first entity and the third entity and a second relationship between the second entity and the third entity based on the plurality of relationships.

18. The building management system of claim 17, wherein the instructions cause the one or more processors to generate the agent communication channel for the third entity of the plurality of entities by determining that an entity type of the third entity is a particular entity type of a plurality of different entity types.

19. The building management system of claim 18, wherein the particular entity type is a space type defining at least one of a room, a zone, or the building.

20. An information management system comprising:
one or more memory devices configured to store instructions; and
one or more processors configured to execute the instructions to:
generate a plurality of agents, each agent of the plurality of agents paired with one entity of a plurality of entities of an entity database, wherein the entity database comprises a plurality of relationships between the plurality of entities, wherein the plurality of entities represent physical entities;
generate a plurality of agent communication channels corresponding to the plurality of entities;
cause the plurality of agents to publish or subscribe to the plurality of agent communication channels based on the entities with which the agents are paired and the relationships between the plurality of entities;
communicate, by the plurality of agents, data of the physical entities via the plurality of agent communication channels; and
perform, by the plurality of agents, one or more operations for the plurality of entities based on the data.

* * * * *